(12) United States Patent
McCall et al.

(10) Patent No.: US 6,456,939 B1
(45) Date of Patent: Sep. 24, 2002

(54) MICRO INERTIAL MEASUREMENT UNIT

(76) Inventors: Hiram McCall, 9131 Mason Ave., Chatsworth, CA (US) 91311; Ching-Fang Lin, 9131 Mason Ave., Chatsworth, CA (US) 91311

( * ) Notice: Subject to any disclaimer, the term of this patent is extended or adjusted under 35 U.S.C. 154(b) by 0 days.

(21) Appl. No.: 09/477,151

(22) Filed: Jan. 4, 2000

(51) Int. Cl.[7] .......................... G01C 21/26; G01C 21/30
(52) U.S. Cl. .................... 701/220; 701/221; 73/514.01; 73/514.04; 356/462
(58) Field of Search .................................. 701/220, 221, 701/225; 73/514.01, 514.02, 514.04; 356/462

(56) References Cited

U.S. PATENT DOCUMENTS 5,033,854 A * 7/1991 Matthews et al. .......... 356/462
5,400,142 A * 3/1995 Lavin ........................ 356/350

* cited by examiner

Primary Examiner—Gertrude Arthur
(74) Attorney, Agent, or Firm—Raymond Y. Chan; David and Raymond Patent Group

(57) ABSTRACT

A micro inertial measurement unit, which is adapted to apply to output signals proportional to rotation and translational motion of a carrier, respectively from angular rate sensors and acceleration sensors, is employed with MEMS rate and acceleration sensors. Compared with a conventional IMU, the processing method utilizes a feedforward open-loop signal processing scheme to obtain highly accurate motion measurements by means of signal digitizing, temperature control and compensation, sensor error and misalignment calibrations, attitude updating, and damping control loops, and dramatically shrinks the size of mechanical and electronic hardware and power consumption, meanwhile, obtains highly accurate motion measurements.

99 Claims, 26 Drawing Sheets

MICRO INERTIAL MEASUREMENT UNIT

BACKGROUND OF THE PRESENT INVENTION

1. Field of the Present Invention

The present invention relates to motion measurement, and more particularly to a motion inertial measurement unit in micro size that can produce highly accurate, digital angular increments, velocity increments, position, velocity, attitude, and heading measurements of a carrier under dynamic environments.

2. Description of Related Arts

Generally, an inertial measurement unit (IMU) is employed to determine the motion of a carrier. In principle, an inertial measurement unit relies on three orthogonally mounted inertial angular rate producers and three orthogonally mounted acceleration producers to obtain three-axis angular rate and acceleration measurement signals. The three orthogonally mounted inertial angular rate producers and three orthogonally mounted acceleration producers with additional supporting mechanical structure and electronic devices are conventionally called an Inertial Measurement Unit (IMU). The conventional IMUs may be cataloged into Platform IMU and Strapdown IMU.

In the platform IMU, angular rate producers and acceleration producers are installed on a stabilized platform. Attitude measurements can be directly picked off from the platform structure. But attitude rate measurements can not be directly obtained from the platform. Moreover, there are highly accurate feedback control loops associated with the platform.

Compared with the platform IMU, in the strapdown IMU, angular rate producers and acceleration producers are directly strapped down with the carrier and move with the carrier. The output signals of the strapdown rate producers and acceleration producers are expressed in the carrier body frame. The attitude and attitude rate measurements can be obtained by means of a series of computations.

A conventional IMU uses a variety of inertial angular rate producers and acceleration producers. Conventional inertial angular rate producers include iron spinning wheel gyros and optical gyros, such as Floated Integrating Gyros (FIG), Dynamically Tuned Gyros (DTG), Ring Laser Gyros (RLG), Fiber-Optic Gyros (FOG), Electrostatic Gyros (ESG), Josephson Junction Gyros (JJG), Hemisperical Resonating Gyros (HRG), etc. Conventional acceleration producers include Pulsed Integrating Pendulous Accelerometer (PIPA), Pendulous Integrating Gyro Accelerometer (PIGA), etc.

The processing method, mechanical supporting structures, and electronic circuitry of conventional IMUs vary with the type of gyros and accelerometers employed in the IMUs. Because conventional gyros and accelerometers have a large size, high power consumption, and moving mass, complex feedback control loops are required to obtain stable motion measurements. For example, dynamic-tuned gyros and accelerometers need force-rebalance loops to create a moving mass idle position. There are often pulse modulation force-rebalance circuits associated with dynamic-tuned gyros and accelerometer based IMUs. Therefore, conventional IMUs commonly have the following features:

High cost,

Large bulk (volume, mass, large weight),

High power consumption,

Limited lifetime, and

Long turn-on time.

These present deficiencies of conventional IMUs prohibit them from use in the emerging commercial applications, such as phased array antennas for mobile communications, automotive navigation, and handheld equipment.

New horizons are opening up for inertial sensor device technologies. MEMS (MicroElectronicMechanicalSystem) inertial sensors offer tremendous cost, size, and reliability improvements for guidance, navigation, and control systems, compared with conventional inertial sensors.

MEMS, or, as stated more simply, micromachines, are considered as the next logical step in the silicon revolution. It is believed that this coming step will be different, and more important than simply packing more transistors onto silicon. The hallmark of the next thirty years of the silicon revolution will be the incorporation of new types of functionality onto the chip structures, which will enable the chip to, not only think, but to sense, act, and communicate as well.

Prolific MEMS angular rate sensor approaches have been developed to meet the need for inexpensive yet reliable angular rate sensors in fields ranging from automotive to consumer electronics. Single input axis MEMS angular rate sensors are based on either translational resonance, such as tuning forks, or structural mode resonance, such as vibrating rings. Moreover, dual input axis MEMS angular rate sensors may be based on angular resonance of a rotating rigid rotor suspended by torsional springs. Current MEMS angular rate sensors are primarily based on an electronically-driven tuning fork method.

More accurate MEMS accelerometers a re the force rebalance type that use closed-loop capacitive sensing and electrostatic forcing. Draper's micromechnical accelerometer is a typical example, where the accelerometer is a monolithic silicon structure consisting of a torsional pendulum with capacitive readout and electrostatic torquer. Analog Device's MEMS accelerometer has an integrated polysilicon capacitive structure fabricated with on-chip BiMOS process to include a precision voltage reference, local oscillators, amplifiers, demodulators, force rebalance loop and self-test functions.

Although the MEMS angular rate sensors and MEMS accelerometers are available commercially and have achieved micro chip-size and low power consumption, however, there is not yet available high performance, small size, and low power consumption IMUs.

SUMMARY OF THE PRESENT INVENTION

A main objective of the present invention is to provide a micro inertial measurement unit, which can produce digital highly accurate angular increment and velocity increment measurements of a carrier from voltage signals output from the specific angular rate and acceleration producers thereof, so as to obtain highly accurate, position, velocity, attitude, and heading measurements of the carrier under dynamic environments.

Another objective of the present invention is to provide a micro inertial measurement unit (IMU) which successfully incorporates the MEMS technology.

Another objective of the present invention is to provide a micro inertial measurement unit, wherein output signals of angular rate producer and acceleration producer are exploited, and are preferably emerging MEMS (MicroElectronicMechanicalSystem) angular rate sensor arrays and acceleration sensor arrays. These outputs are proportional to rotation and translational motion of the carrier, respectively. Compared with a conventional IMU, the present invention utilizes a feedforward open-loop signal processing scheme to obtain highly accurate motion measurements by means of signal integration, digitizing, temperature control and compensation, sensor error and misalignment calibrations, and dramatically shrinks the size of mechanical and electronic hardware and power consumption, meanwhile, obtains highly accurate motion measurements.

Although the present invention can use existing angular rate devices and acceleration devices, the present invention specifically selects MEMS angular rate devices and acceleration devices to assemble a micro IMU, wherein the micro IMU has the following unique features:

(1) Attitude Heading Reference System (AHRS) Capable Core Sensor Module.
(2) Miniaturized (Length/Width/Height) and Light Weight.
(3) High Performance and Low Cost.
(4) Low Power Dissipation.
(5) Shock resistant and vibration tolerant.
(6) Dramatic Improvement In Reliability (microelectromechanical systems—MEMS).

Another objective of the present invention is to provide a micro IMU rendering into an integrated micro land navigator that has the following unique features:

(1) Miniature, light weight, low power, and low cost.
(2) AHRS, odometer, integrated GPS chipset and flux valve.
(3) Integration filter for sensor data fusion and zero velocity updating.
(4) Typical applications: automobiles, railway vehicles, miniature land vehicles, robots, unmanned ground vehicles, personal navigators, and military land vehicles.

Another objective of the present invention is for the micro IMU to function as aircraft inertial avionics, which has the following unique features:

(1) Rate Gyro
(2) Vertical Gyro
(3) Directional Gyro
(4) AHRS
(5) Inertial Navigation System
(6) Fully-Coupled GPS/MEMS IMU Integrated System
(7) Fully-Coupled GPS/IMU/Radar Altimeter Integrated System
(8) Universal vehicle navigation and control box.
(9) North Finding Module.

Another objective of the present invention is to provide a micro IMU to function as a Spaceborne MEMS IMU Attitude Determination System and a Spaceborne Fully-Coupled GPS/MEMS IMU Integrated system for orbit determination, attitude control, payload pointing, and formation flight, that have the following unique features:

(1) Shock resistant and vibration tolerant
(2) High anti-jamming
(3) High dynamic performance
(4) Broad operating range of temperatures
(5) High resolution
(6) Compact, low power and light weight unit
(7) Flexible hardware and software architecture Another objective of the present invention is to provide a micro IMU to form a marine INS with embedded GPS, which has the following unique features:

(1) Micro MEMS IMU AHRS with Embedded GPS
(2) Built-in CDU (Control Display Unit)
(3) Optional DGPS (Differential GPS)
(4) Flexible Hardware and Software System Architecture
(5) Low Cost, Light Weight, High Reliability Another objective of the present invention is to provide a micro IMU to be used in a micro pointing and stabilization mechanism that has the following unique features:

(1) Micro MEMS IMU AHRS utilized for platform stabilization.
(2) MEMS IMU integrated with the electrical and mechanical design of the pointing and stabilization mechanism.
(3) Vehicle motion, vibration, and other interference rejected by a stabilized platform.
(4) Variable pointing angle for tracker implementations.
(5) Typical applications include miniature antenna pointing and tracking control, laser beam pointing for optical communications, telescopic pointing for imaging, airborne laser pointing control for targeting, vehicle control and guidance.

DETAIL DESCRIPTION OF THE PREFERRED EMBODIMENT

Currently, MEMS exploits the existing microelectronics infrastructure to create complex machines with micron feature sizes. These machines can have many functions, including sensing, communication, and actuation. Extensive applications for these devices exist in a wide variety of commercial systems.

The difficulties for building a micro IMU is the achievement of the following hallmark using existing low cost and low accuracy angular rate sensors and accelerometers:

Low cost,

Micro size

Lightweight

Low power consumption

No wear/extended lifetime

Instant turn-on

Large dynamic range

High sensitivity

High stability

High accuracy

To achieve the high degree of performance mentioned above, a number of problems need to be addressed:

(1) Micro-size angular rate sensors and accelerometers need to be obtained. Currently, the best candidate angular rate sensor and accelerometer to meet the micro size are MEMS angular rate sensors and MEMS accelerometers.

(2) Associated mechanical structures need to be designed.

(3) Associated electronic circuitry needs to be designed.

(4) Associated thermal requirements design need to be met to compensate MEMS sensor's thermal effects.

(5) The size and power of the associated electronic circuitry need to be shrunk.

The micro inertial measurement unit of the present invention is preferred to employ with the angular rate producer, such as MEMS angular rate device array or gyro array, that provides three-axis angular rate measurement signals of a carrier, and the acceleration producer, such as MEMS acceleration device array or accelerometer array, that provides three-axis acceleration measurement signals of the carrier, wherein the motion measurements of the carrier, such as attitude and heading angles, are achieved by means of processing procedures of the three-axis angular rate measurement signals from the angular rate producer and the three-axis acceleration measurement signals from the acceleration producer.

In the present invention, output signals of the angular rate producer and acceleration producer are processed to obtain digital highly accurate angular rate increment and velocity increment measurements of the carrier, and are further processed to obtain highly accurate position, velocity, attitude and heading measurements of the carrier under dynamic environments.

Figure 1:
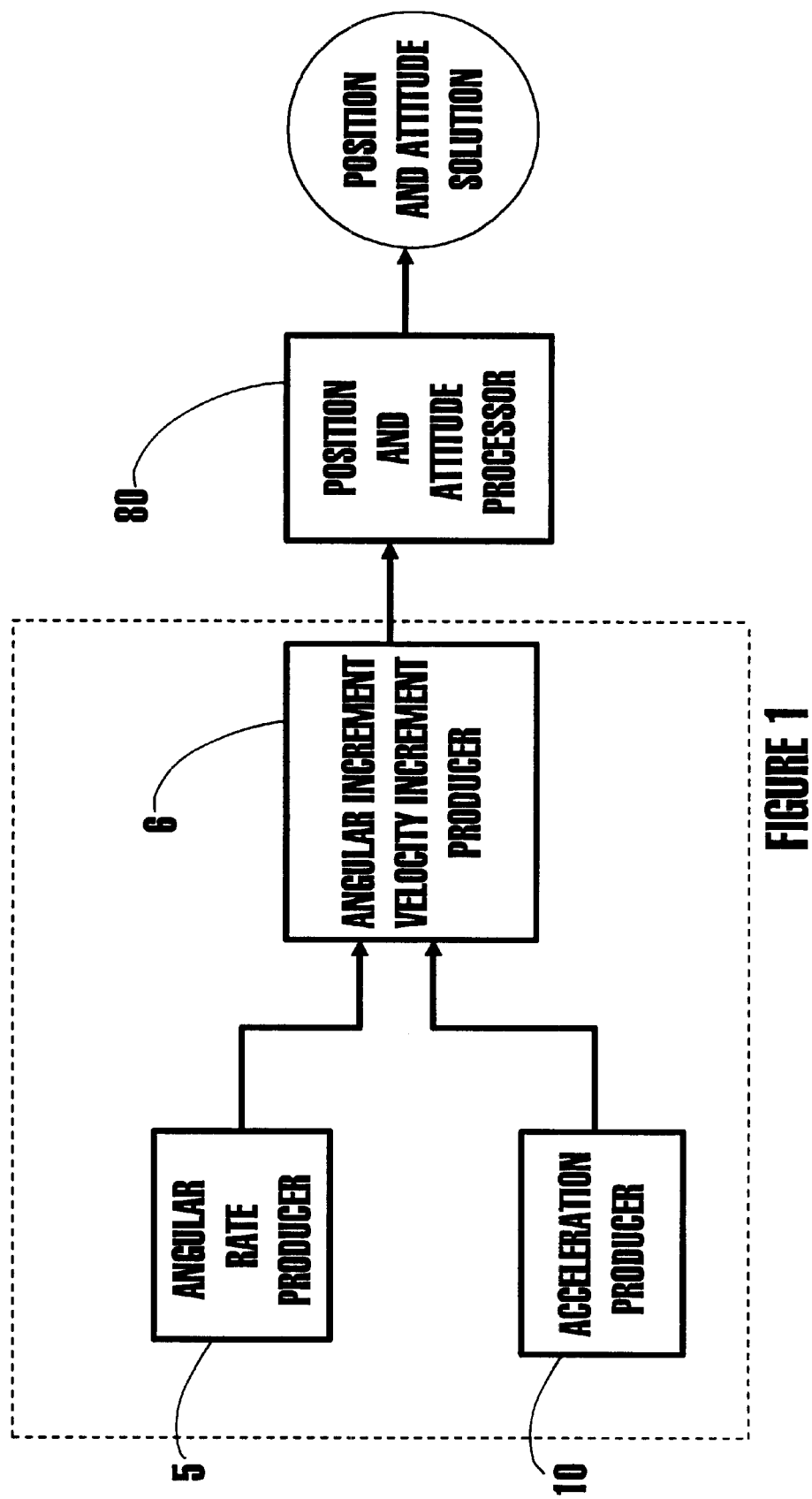
FIG. 1 is a block diagram illustrating the processing module for a micro inertial measurement unit according to a preferred embodiment of the present invention.

Referring to FIG. 1, the micro inertial measurement unit of the present invention comprises an angular rate producer 5 for producing three-axis (X axis, Y axis and Z axis) angular rate signals; an acceleration producer 10 for producing three-axis (X-axis, Y axis and Z axis) acceleration signals; and an angular increment and velocity increment producer 6 for converting the three-axis angular rate signals into digital angular increments and for converting the input three-axis acceleration signals into digital velocity increments.

Moreover, a position and attitude processor 80 is adapted to further connect with the micro IMU of the present invention to compute position, attitude and heading angle measurements using the three-axis digital angular increments and three-axis velocity increments to provide a user with a rich motion measurement to meet diverse needs.

The position, attitude and heading processor 80 further comprises two optional running modules:

(1) Attitude and Heading Module 81, producing attitude and heading angle only; and (2) Position, Velocity, Attitude, and Heading Module 82, producing position, velocity, and attitude angles.

In general, the angular rate producer 5 and the acceleration producer 10 are very sensitive to a variety of temperature environments. In order to improve measurement accuracy, referring to FIG. 2, the present invention further comprises a thermal controlling means for maintaining a predetermined operating temperature of the angular rate producer 5, the acceleration producer 10 and the angular increment and velocity increment producer 6. It is worth to mention that if the angular rate producer 5, the acceleration producer 10 and the angular increment and velocity increment producer 6 are operated in an environment under prefect and constant thermal control, the thermal controlling means can be omitted.

Figure 2:
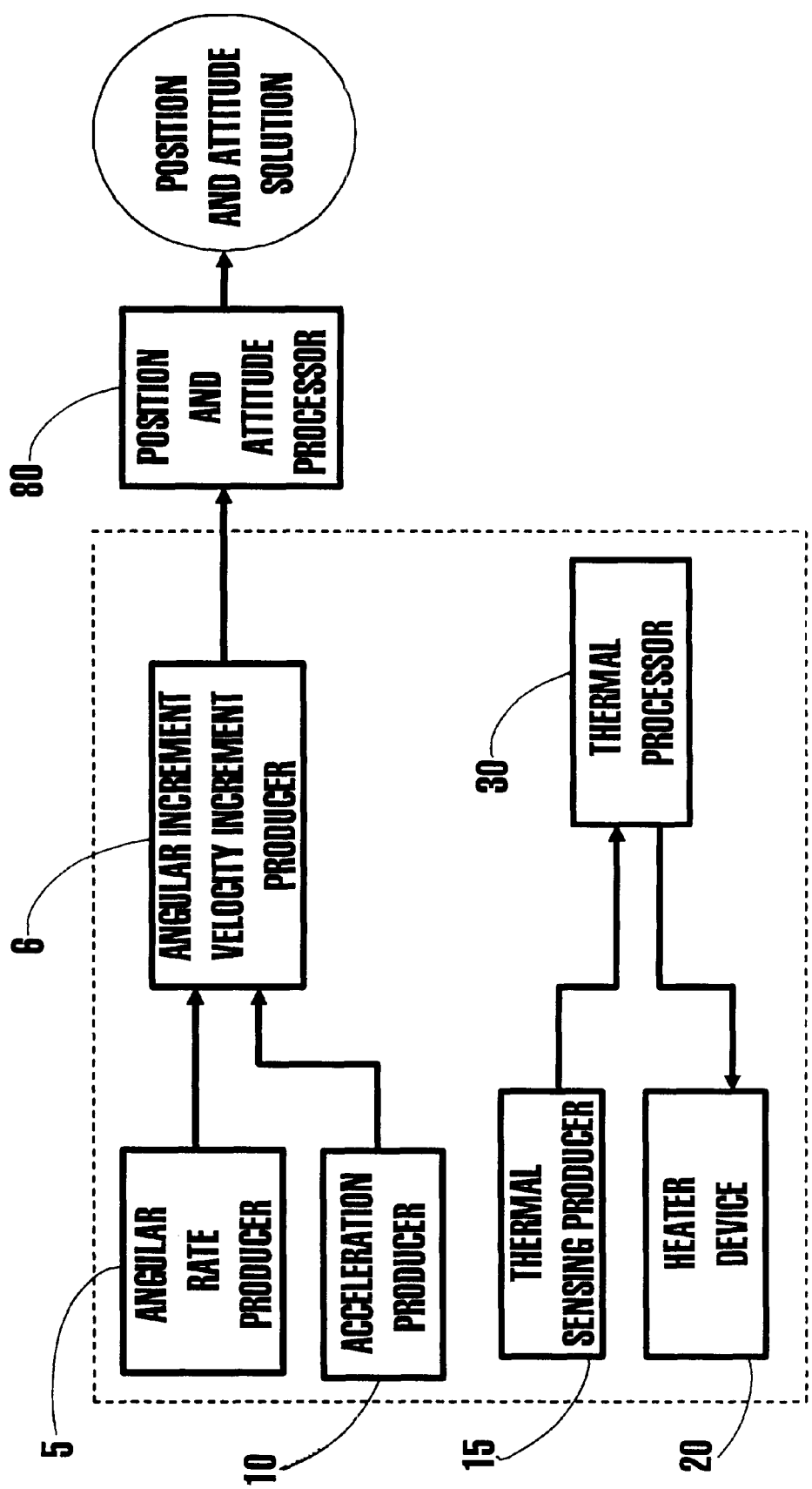
FIG. 2 is a block diagram illustrating the processing modules with thermal control processing for the micro inertial measurement unit according to the above preferred embodiment of the present invention.

According to the preferred embodiment of the present invention, as shown in FIG. 2, the thermal controlling means comprises a thermal sensing producer device 15, a heater device 20 and a thermal processor 30.

The thermal sensing producer device 15, which produces temperature signals, is processed in parallel with the angular rate producer 5 and the acceleration producer 10 for maintaining a predetermined operating temperature of the angular rate producer 5 and the acceleration producer 10 and angular increment and velocity increment producer 6 of the micro IMU, wherein the predetermined operating temperature is a constant designated temperature selected between 150° F. and 185° F., preferable 176° F. (±0.1° F.).

The temperature signals produced from the thermal sensing producer device 15 are inputted to the thermal processor 30 for computing temperature control commands using the temperature signals, a temperature scale factor, and a predetermined operating temperature of the angular rate producer 5 and the acceleration producer 10, and produce driving signals to the heater device 20 using the temperature control commands for controlling the heater device 20 to provide adequate heat for maintaining the predetermined operating temperature in the micro IMU.

Temperature characteristic parameters of the angular rate producer 5 and the acceleration producer 10 can be determined during a series of the angular rate producer and acceleration producer temperature characteristic calibrations.

Figure 3:
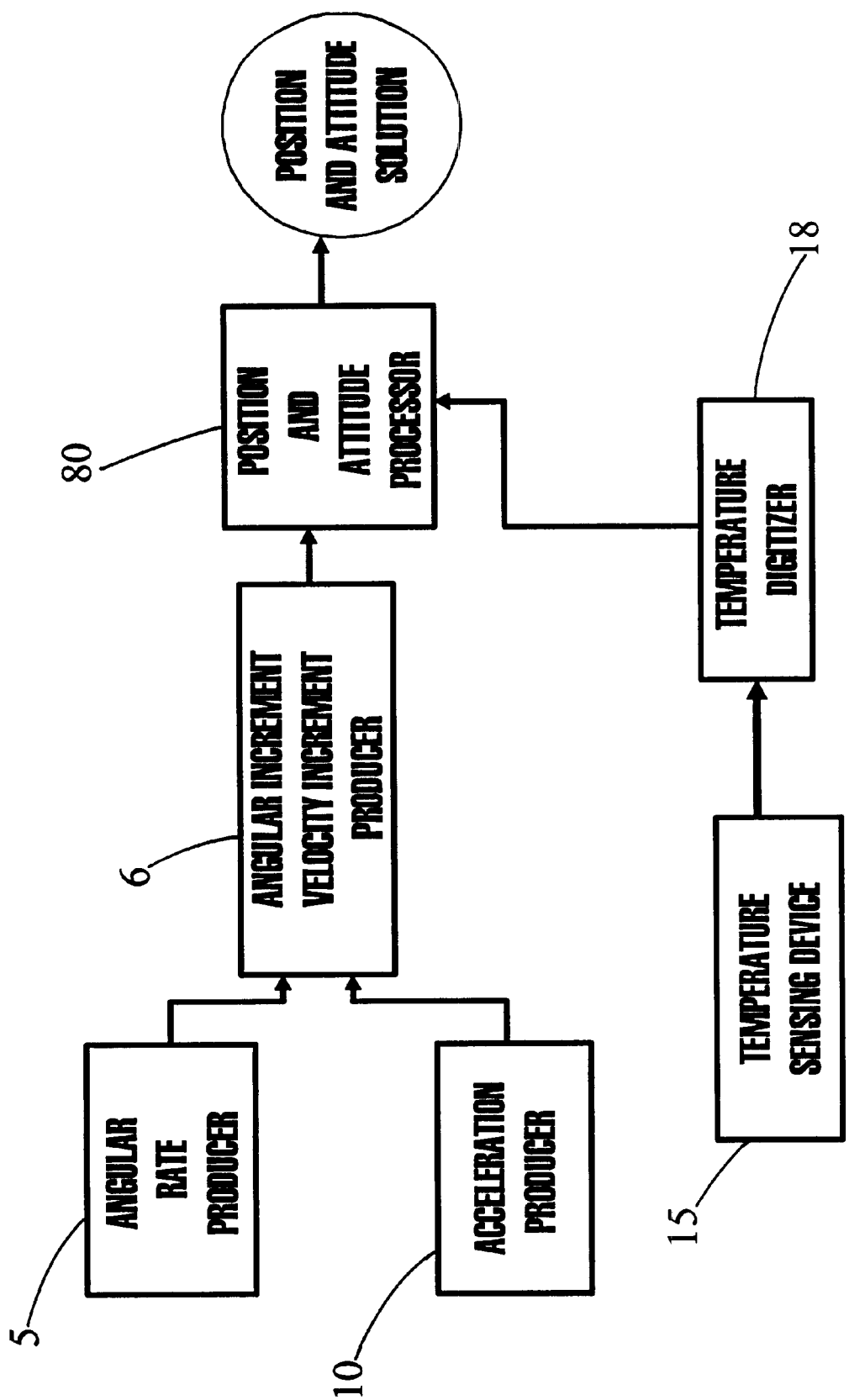
FIG. 3 is a block diagram illustrating the processing modules with thermal compensation processing for the micro inertial measurement unit according to the above preferred embodiment of the present invention.
Figure 12:
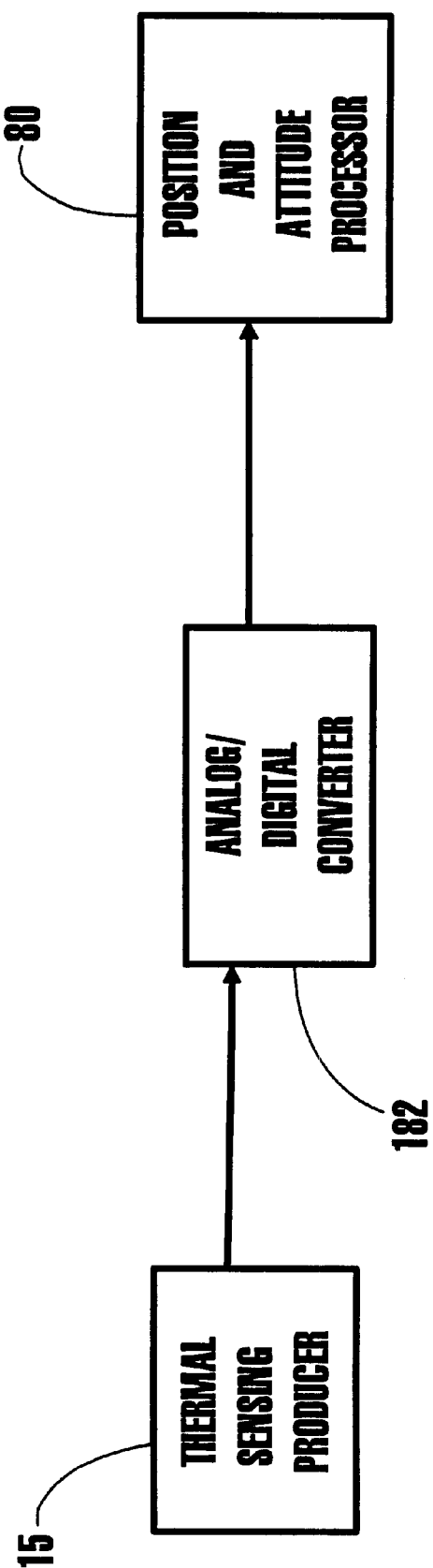
FIG. 12 is a block diagram illustrating a temperature digitizer for outputting analog voltage signals of the thermal sensing producer according to the above preferred embodiment of the present invention.

Referring to FIG. 3, when the above thermal processor 30 and the heater device 20 are not provided, in order to compensate the angular rate producer and acceleration producer measurement errors induced by a variety of temperature environments, the micro IMU of the present invention can alternatively comprise a temperature digitizer 18 for receiving the temperature signals produced from the thermal sensing producer device 15 and outputting a digital temperature value to the position, attitude, and heading processor 80. As shown in FIG. 12, the temperature digitizer 18 can be embodied to comprise an analog/digital converter 182.

Moreover, the position, attitude, and heading processor 80 is adapted for accessing temperature characteristic parameters of the angular rate producer and the acceleration producer using a current temperature of the angular rate producer and the acceleration producer from the temperature digitizer 18, and compensating the errors induced by thermal effects in the input digital angular and velocity increments and computing attitude and heading angle measurements using the three-axis digital angular increments and three-axis velocity increments in the attitude and heading processor 80.

In most applications, the output of the angular rate producer 5 and the acceleration producer 10 are analog voltage signals. The three-axis analog angular rate voltage signals produced from the angular producer 5 are directly proportional to carrier angular rates, and the three-axis analog acceleration voltage signals produced from the acceleration producer 10 are directly proportional to carrier accelerations.

Figure 5:
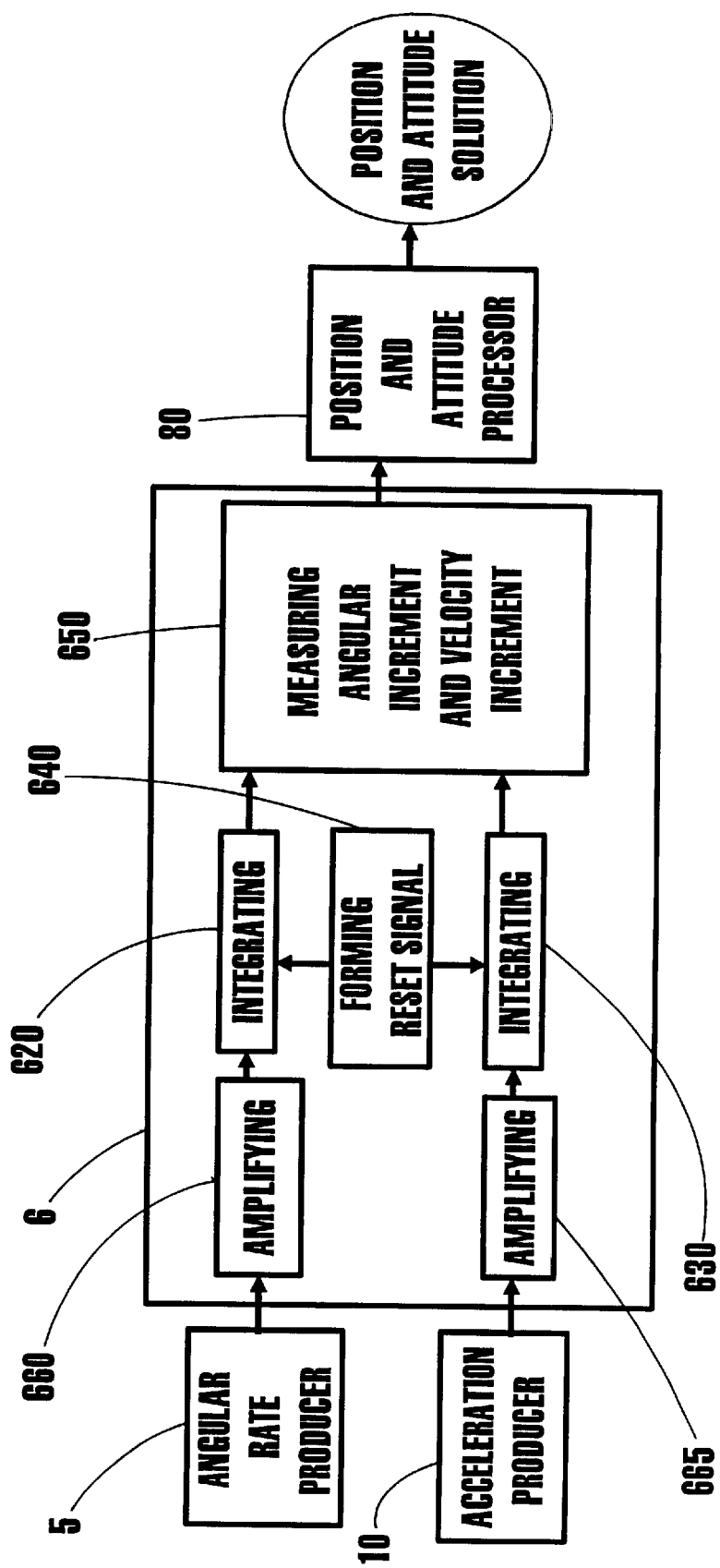
FIG. 5 is a block diagram illustrating another angular increment and velocity increment producer for outputting voltage signals of angular rate producer and acceleration producer for the micro inertial measurement unit according to the above preferred embodiment of the present invention.
Figure 6:
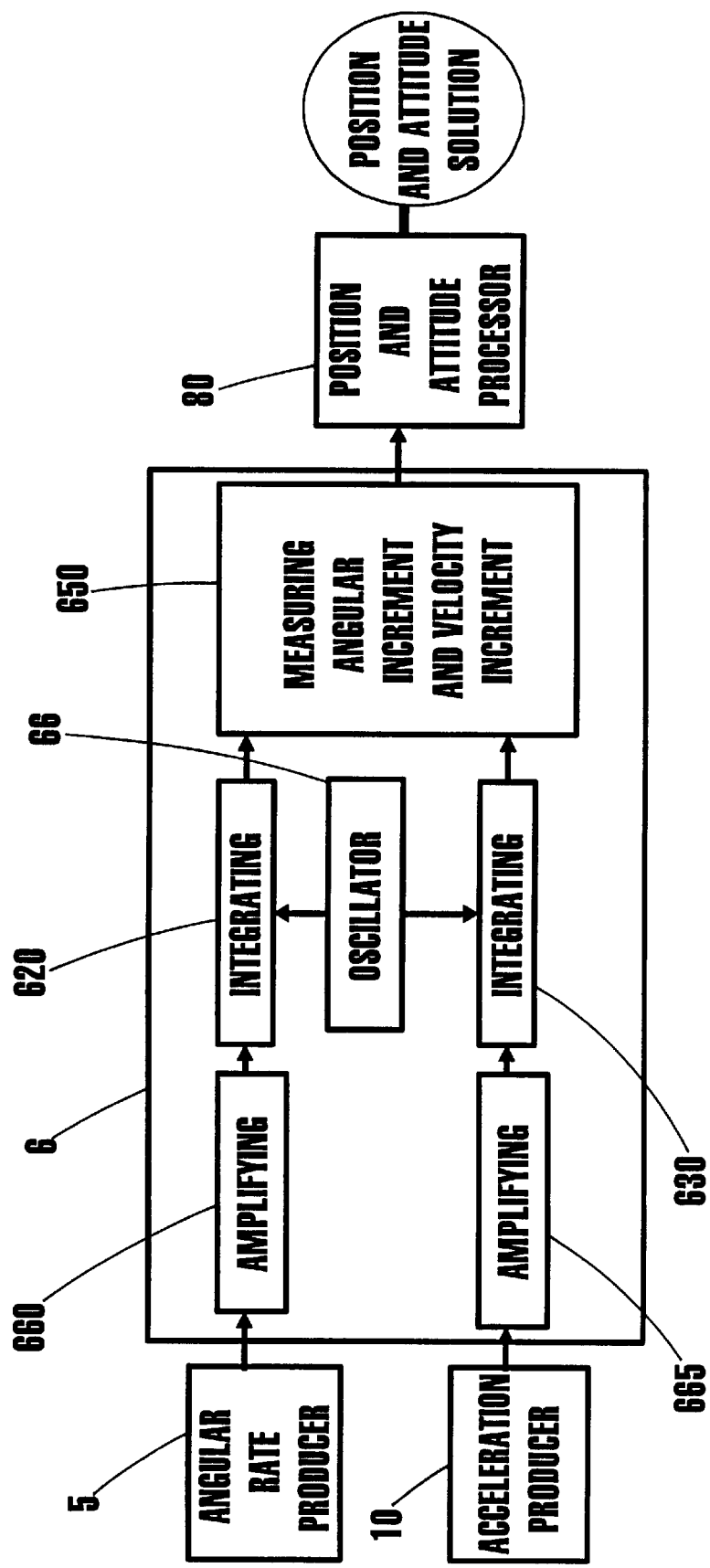
FIG. 6 is a block diagram illustrating another angular increment and velocity increment producer for outputting voltage signals of an angular rate producer and acceleration producer for the micro inertial measurement unit according to the above preferred embodiment of the present invention.

When the outputting analog voltage signals of the angular rate producer 5 and the acceleration producer 10 are too weak for the angular increment and velocity increment producer 6 to read, the angular increment and velocity increment producer 6 may employ amplifying means 660 and 665 for amplifying the analog voltage signals input from the angular rate producer 5 and the acceleration producer 10 and suppress noise signals residing within the analog voltage signals input from the angular rate producer 5 and the acceleration producer 10, as shown in FIGS. 5 and 6.

Figure 4:
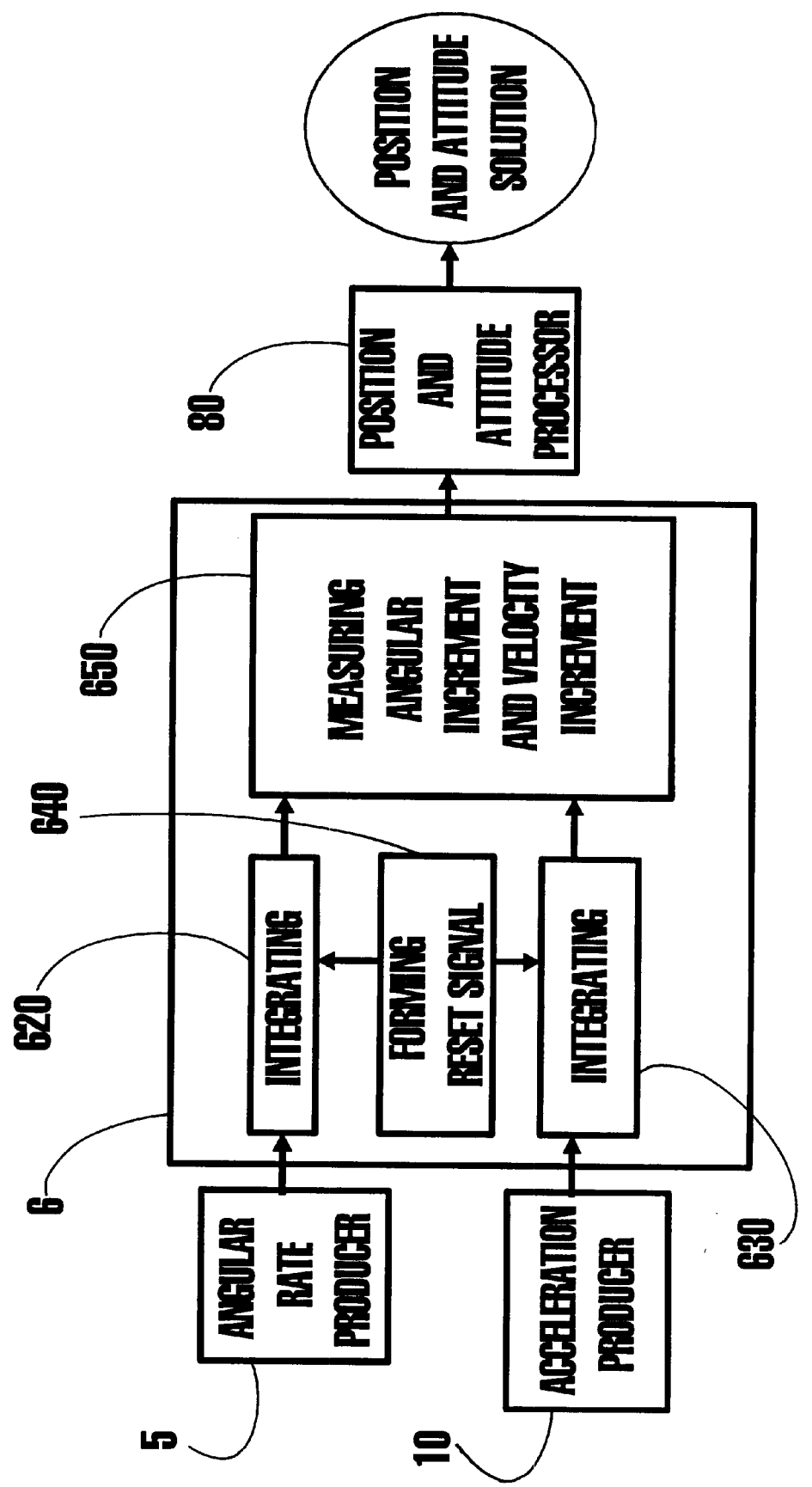
FIG. 4 is a block diagram illustrating an angular increment and velocity increment producer for outputting voltage signals of the angular rate producer and acceleration producer for the micro inertial measurement unit according to the above preferred embodiment of the present invention.

Referring to FIG. 4, the angular increment and velocity increment producer 6 comprises an angular integrating means 620, an acceleration integrating means 630, a resetting means 640, and an angular increment and velocity increment measurement means 650.

The angular integrating means 620 and the acceleration integrating means 630 are adapted for respectively integrating the three-axis analog angular rate voltage signals and the three-axis analog acceleration voltage signals for a predetermined time interval to accumulate the three-axis analog angular rate voltage signals and the three-axis analog acceleration voltage signals as an uncompensated three-axis angular increment and an uncompensated three-axis velocity increment for the predetermined time interval to achieve accumulated angular increments and accumulated velocity increments. The integration is performed to remove noise signals that are non-directly proportional to the carrier angular rate and acceleration within the three-axis analog angular rate voltage signals and the three-axis analog acceleration voltage signals, to improve signal-to-noise ratio, and to remove the high frequency signals in the three-axis analog angular rate voltage signals and the three-axis analog acceleration voltage signals. The signals are directly proportional to the carrier angular rate and acceleration within the three-axis analog angular rate voltage signals and the three-axis analog acceleration voltage signals.

The resetting means forms an angular reset voltage pulse and a velocity reset voltage pulse as an angular scale and a velocity scale which are input into the angular integrating means 620 and the acceleration integrating means 630 respectively.

The angular increment and velocity increment measurement means 650 is adapted for measuring the voltage values of the three-axis accumulated angular increments and the three-axis accumulated velocity increments with the angular reset voltage pulse and the velocity reset voltage pulse respectively to acquire angular increment counts and velocity increment counts as a digital form of the angular increment and velocity increment measurements respectively.

In order to output real three-angular increment and velocity increment values as an optional output format to substitute the voltage values of the three-axis accumulated angular increments and velocity increments, the angular increment and velocity increment measurement means 650 also scales the voltage values of the three-axis accumulated angular and velocity increments into real three-axis angular and velocity increment voltage values.

In the angular integrating means 620 and the acceleration integrating means 630, the three-axis analog angular voltage signals and the three-axis analog acceleration voltage signals are each reset to accumulate from a zero value at an initial point of every predetermined time interval.

As shown in FIG. 6, in general, the resetting means 640 can be an oscillator 66, so that the angular reset voltage pulse and the velocity reset voltage pulse are implemented by producing a timing pulse by the oscillator 66. In applications, the oscillator 66 can be built with circuits, such as Application Specific Integrated Circuits (ASIC) chip and a printed circuit board.

Figure 7:
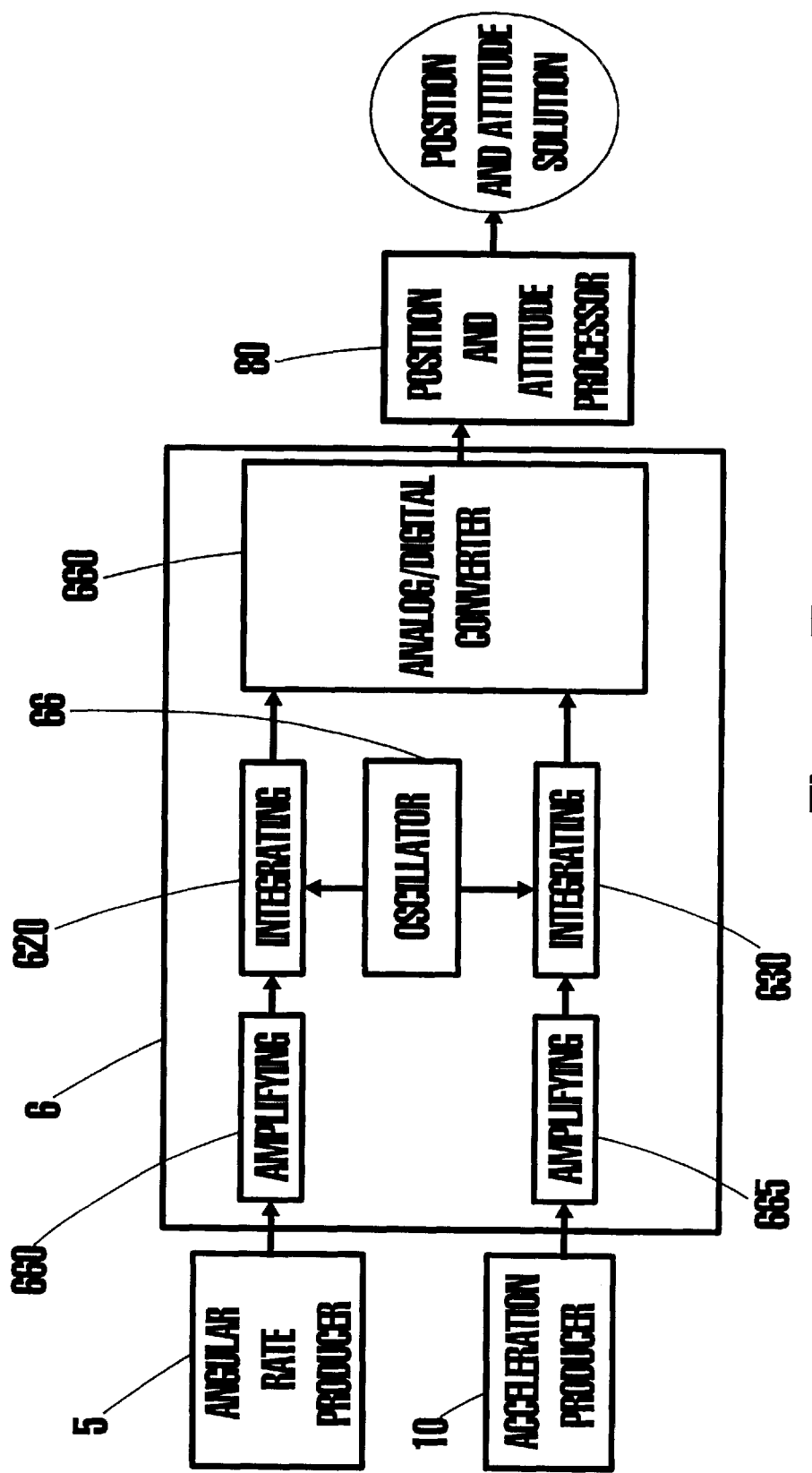
FIG. 7 is a block diagram illustrating another angular increment and velocity increment producer for outputting voltage signals of an angular rate producer and acceleration producer for the micro inertial measurement unit according to the above preferred embodiment of the present invention.

As shown in FIG. 7, the angular increment and velocity increment measurement means 650, which is adapted for measuring the voltage values of the three-axis accumulated angular and velocity increments, is embodied as an analog/digital converter 650. In other words, the analog/digital converter 650 substantially digitizes the raw three-axis angular increment and velocity increment voltage values into digital three-axis angular increment and velocity increments.

Figure 11:
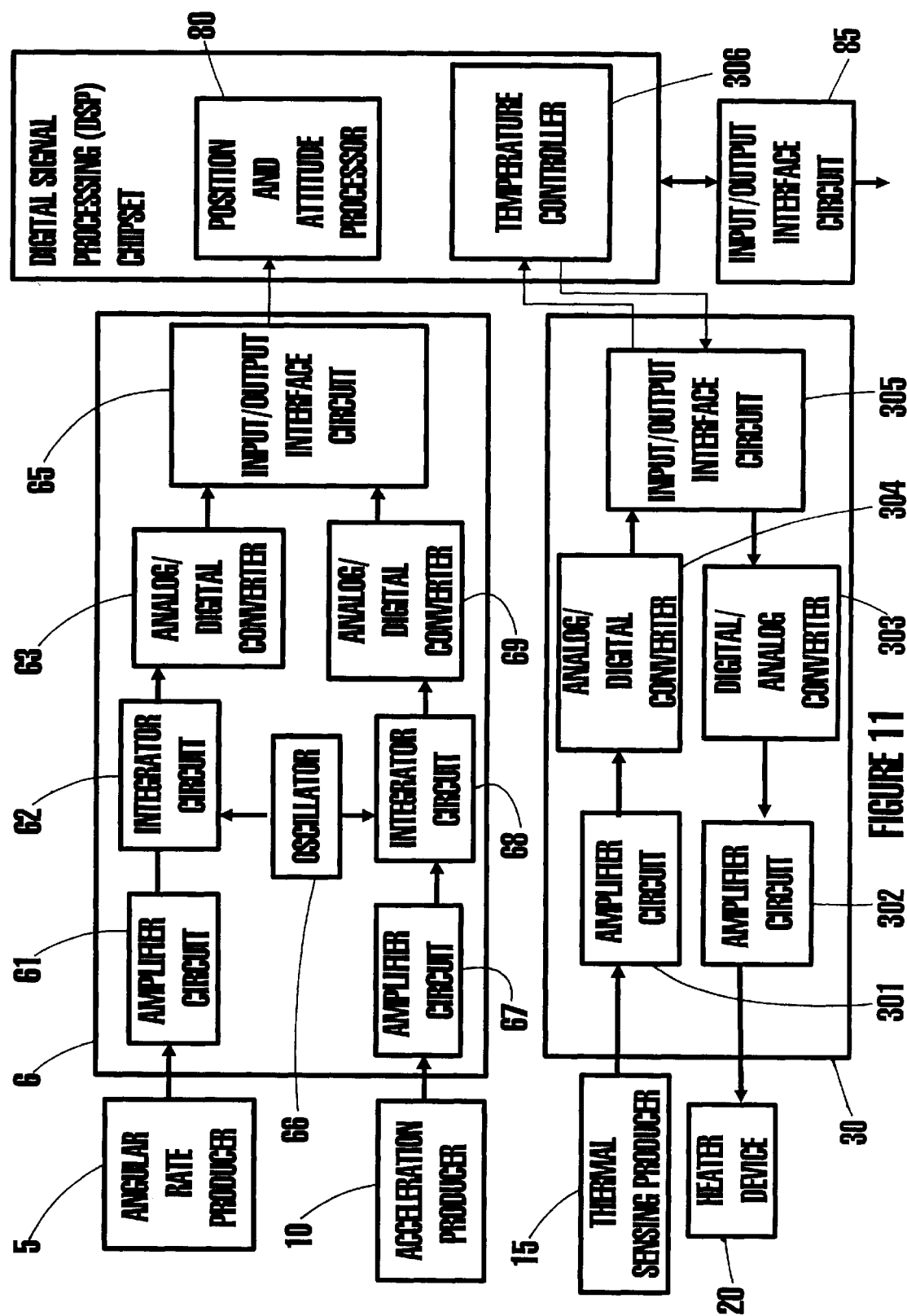
FIG. 11 is a block diagram illustrating a processing module for the micro inertial measurement unit according to the above preferred embodiment of the present invention.

Referring to FIGS. 7 and 11, the amplifying means 660 and 665 of the angular increment and velocity increment producer 6 are embodied by an angular amplifier circuit 61 and an acceleration amplifier circuit 67 respectively to amplify the three-axis analog angular rate voltage signals and the three-axis analog acceleration voltage signals to form amplified three-axis analog angular rate signals and amplified three-axis analog acceleration signals respectively.

The angular integrating means 620 and the acceleration integrating means 630 of the angular increment and velocity increment producer 6 are respectively embodied as an angular integrator circuit 62 and an acceleration integrator circuit 68 for receiving the amplified three-axis analog angular rate signals and the amplified three-axis analog acceleration signals from the angular and acceleration amplifier circuits 61, 67 which are integrated to form the accumulated angular increments and the accumulated velocity increments respectively.

The analog/digital converter 650 of the angular increment and velocity increment producer 6 further includes an angular analog/digital converter 63, a velocity analog/digital converter 69 and an input/output interface circuit 65.

The accumulated angular increments output from the angular integrator circuit 62 and the accumulated velocity increments output from the acceleration integrator circuit are input into the angular analog/digital converter 63 and the velocity analog/digital converter 69 respectively.

The accumulated angular increments are digitized by the angular analog/digital converter 63 by measuring the accumulated angular increments with the angular reset voltage pulse to form digital angular measurements of voltage in terms of the angular increment counts which are output to the input/output interface circuit 65 to generate digital three-axis angular increment voltage values.

The accumulated velocity increments are digitized by the velocity analog/digital converter 69 by measuring the accumulated velocity increments with the velocity reset voltage pulse to form digital velocity measurements of voltage in terms of the velocity increment counts which are output to the input/output interface circuit 65 to generate digital three-axis velocity increment voltage values.

Figure 8:
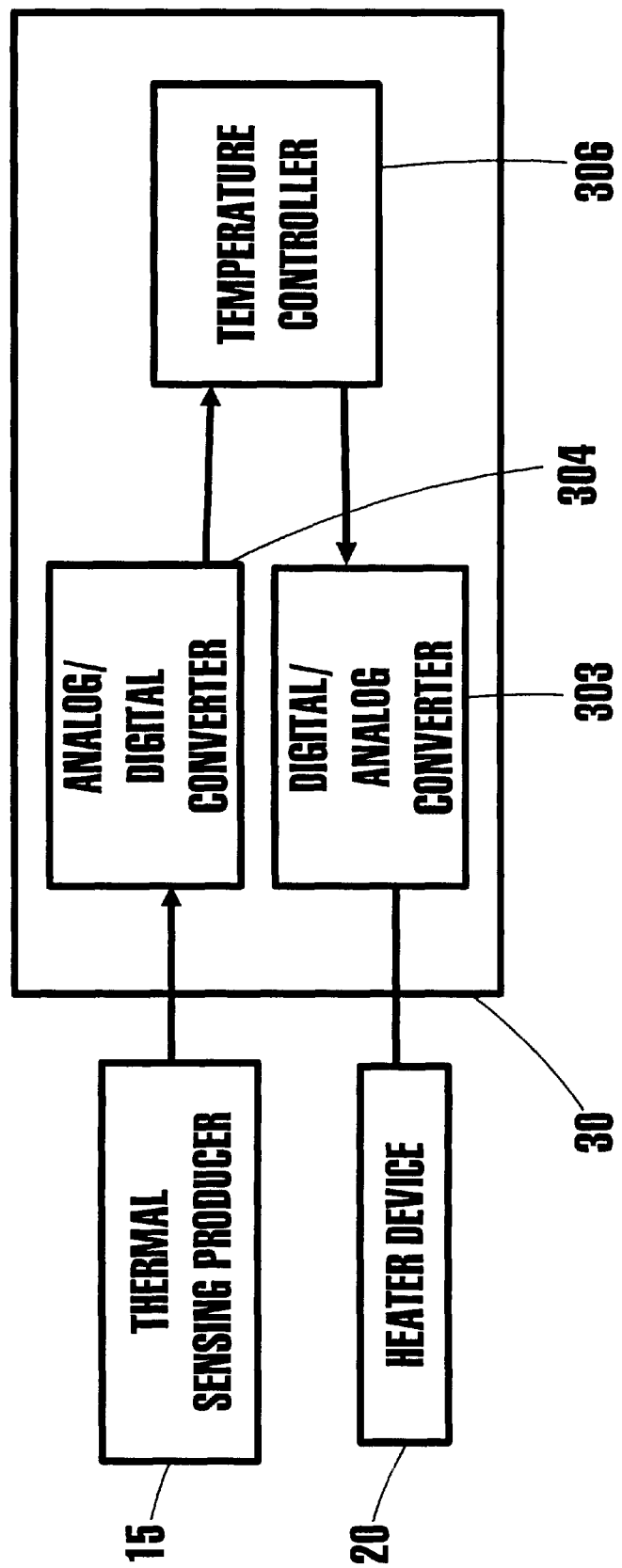
FIG. 8 is a block diagram illustrating a thermal processor for outputting analog voltage signals of the thermal sensing producer according to the above preferred embodiment of the present invention.

Referring to FIGS. 2 and 8, in order to achieve flexible adjustment of the thermal processor 30 for the thermal sensing producer device 15 with analog voltage output and the heater device 20 with analog input, the thermal processor 30 can be implemented in a digital feedback controlling loop as shown in FIG. 8.

The thermal processor 30, as shown in FIG. 8, comprises an analog/digital converter 304 connected to the thermal sensing producer device 15, a digital/analog converter 303 connected to the heater device 20, and a temperature controller 306 connected with both the analog/digital converter 304 and the digital/analog converter 303. The analog/digital converter 304 inputs the temperature voltage signals produced by the thermal sensing producer device 15, wherein the temperature voltage signals are sampled in the analog/digital converter 304 to sampled temperature voltage signals which are further digitized to digital signals and output to the temperature controller 306.

The temperature controller 306 computes digital temperature commands using the input digital signals from the analog/digital converter 304, a temperature sensor scale factor, and a pre-determined operating temperature of the angular rate producer and acceleration producer, wherein the digital temperature commands are fed back to the digital/analog converter 303.

The digital/analog converter 303 converts the digital temperature commands input from the temperature controller 306 into analog signals which are output to the heater device 20 to provide adequate heat for maintaining the predetermined operating temperature of the micro IMU of the present invention.

Figure 9:
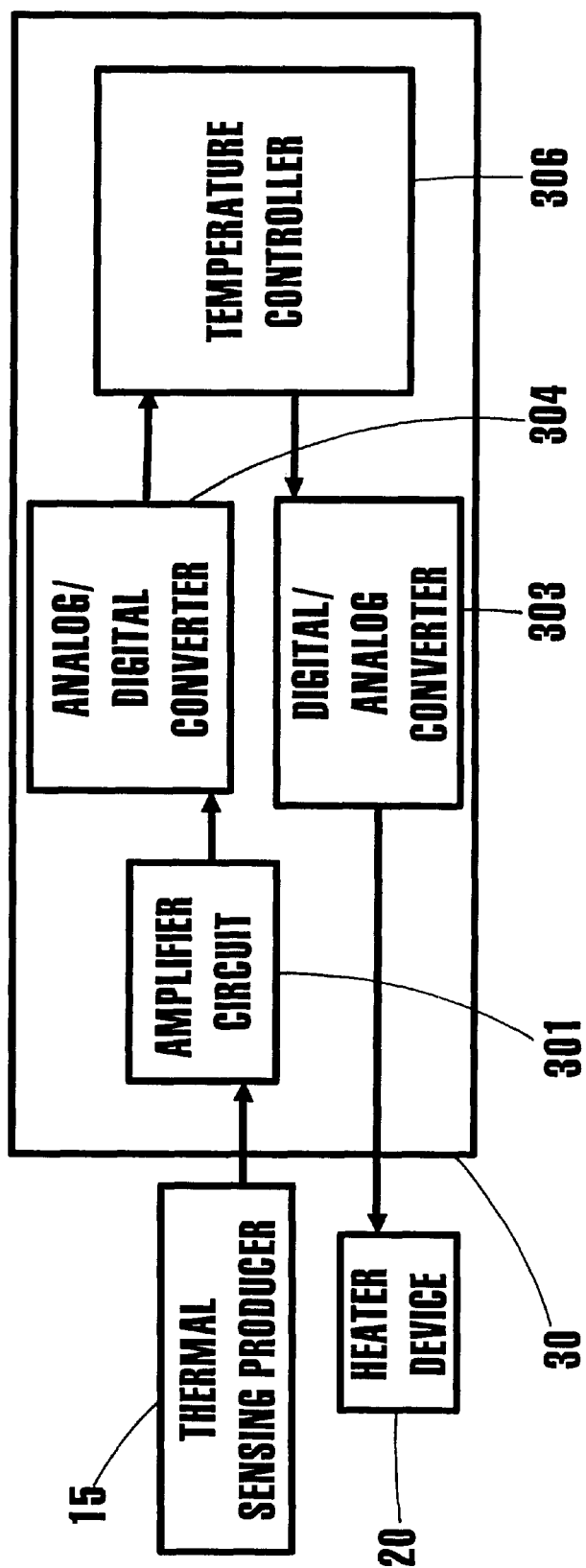
FIG. 9 is a block diagram illustrating another thermal processor for outputting analog voltage signals of the thermal sensing producer according to the above preferred embodiment of the present invention.

Moreover, as shown in FIG. 9, if the voltage signals produced by the thermal sensing producer device 15 are too weak for the analog/digital converter 304 to read, the thermal processor 30 further comprises a first amplifier circuit 301 between the thermal sensing producer device 15 and the digital/analog converter 303, wherein the voltage signals from the thermal sensing producer device 15 is first input into the first amplifier circuit 301 for amplifying the signals and suppressing the noise residing in the voltage signals and improving the signal-to-noise ratio, wherein the amplified voltage signals are then output to the analog/digital converter 304.

Figure 10:
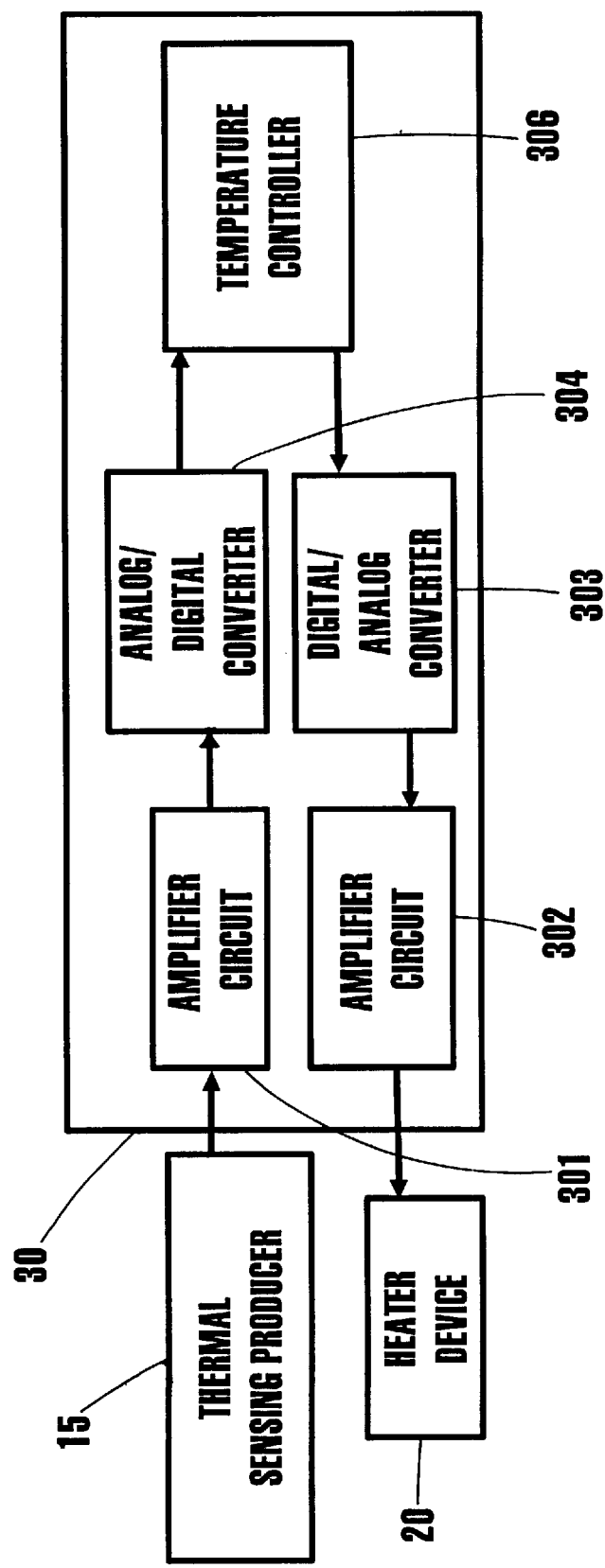
FIG. 10 is a block diagram illustrating another thermal processor for outputting analog voltage signals of the thermal sensing producer according to the above preferred embodiment of the present invention.

The heater device 20 requires a specific driving current signal. In this case, referring to FIG. 10, the thermal processor 30 can further comprise a second amplifier circuit 302 between the digital/analog converter 303 and heater device 20 for amplifying the input analog signals from the digital/analog converter 303 for driving the heater device 20.

In other words, the digital temperature commands input from the temperature controller 306 are converted in the digital/analog converter 303 into analog signals which are then output to the amplifier circuit 302.

Referring to FIG. 11, an input/output interface circuit 305 is required to connect the analog/digital converter 304 and digital/analog converter 303 with the temperature controller 306. In this case, as shown in FIG. 11, the voltage signals are sampled in the analog/digital converter 304 to form sampled voltage signals that are digitized into digital signals. The digital signals are output to the input/output interface circuit 305.

As mentioned above, the temperature controller 306 is adapted to compute the digital temperature commands using the input digital temperature voltage signals from the input/output interface circuit 305, the temperature sensor scale factor, and the pre-determined operating temperature of the angular rate producer and acceleration producer, wherein the digital temperature commands are fed back to the input/output interface circuit 305. Moreover, the digital/analog converter 303 further converts the digital temperature commands input from the input/output interface circuit 305 into analog signals which are output to the heater device 20 to provide adequate heat for maintaining the predetermined operating temperature of the micro IMU.

Figure 13:
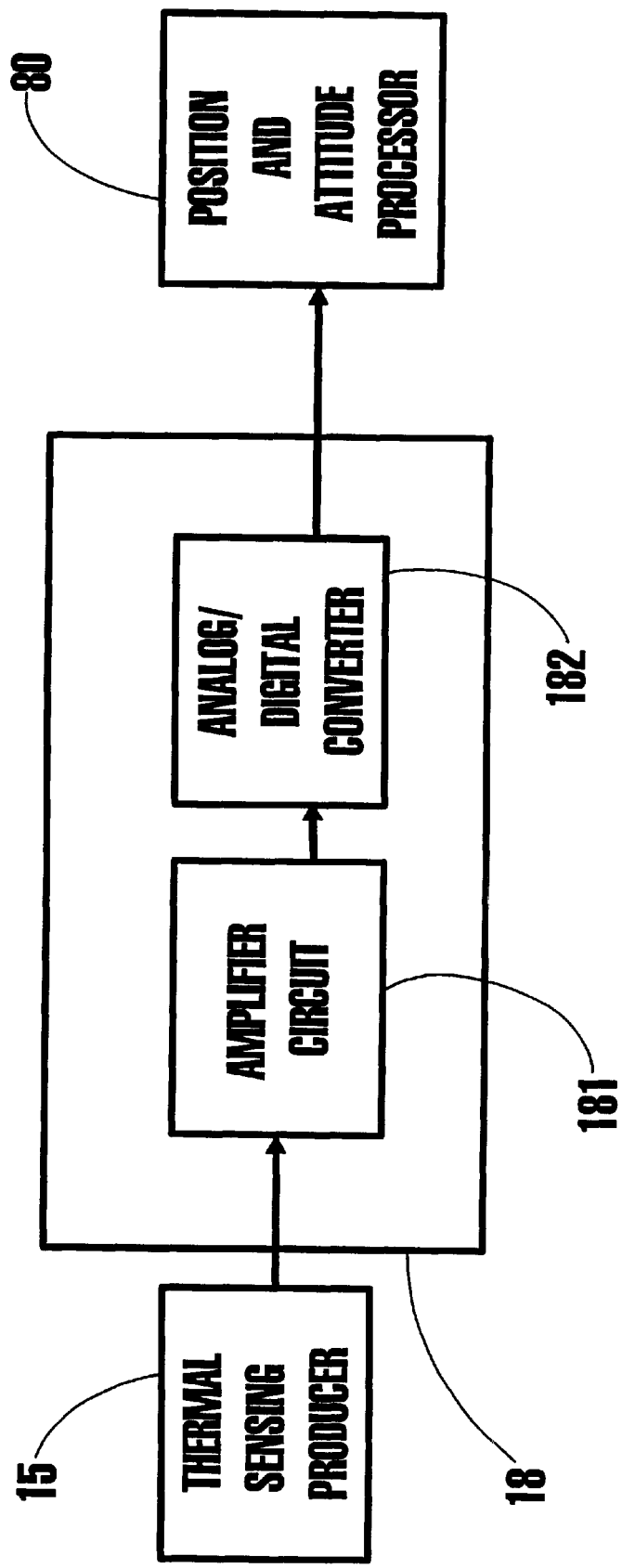
FIG. 13 is a block diagram illustrating a temperature digitizer for outputting analog voltage signals of the thermal sensing producer according to the above preferred embodiment of the present invention.

Referring to FIG. 12, as mentioned above, the thermal processor 30 and the heater device 20 as disclosed in FIGS. 2, 8, 9, 10, and 11 can alternatively be replaced by the analog/digital converter 182 connected to the thermal sensing producer device 15 to receive the analog voltage output from the thermal sensing producer device 15. If the voltage signals produced by the thermal sensing producer device 15 are too weak for the analog/digital converter 182 to read, referring to FIG. 13, an additional amplifier circuit 181 can be connected between the thermal sensing producer device 15 and the digital/analog converter 182 for amplifying the analog voltage signals and suppressing the noise residing in the voltage signals and improving the voltage signal-to-noise ratio, wherein the amplified voltage signals are output to the analog/digital converter 182 and sampled to form sampled voltage signals that are further digitized in the analog/digital converters 182 to form digital signals connected to the attitude and heading processor 80.

Alternatively, an input/output interface circuit 183 can be connected between the analog/digital converter 182 and the attitude and heading processor 80. In this case, referring to FIG. 14, the input amplified voltage signals are sampled to form sampled voltage signals that are further digitized in the analog/digital converters to form digital signals connected to the input/output interface circuit 183 before inputting into the attitude and heading processor 80.

Referring to FIG. 1, the digital three-axis angular increment voltage values or real values and three-axis digital velocity increment voltage values or real values are produced and outputted from the angular increment and velocity increment producer 6.

Figure 15:
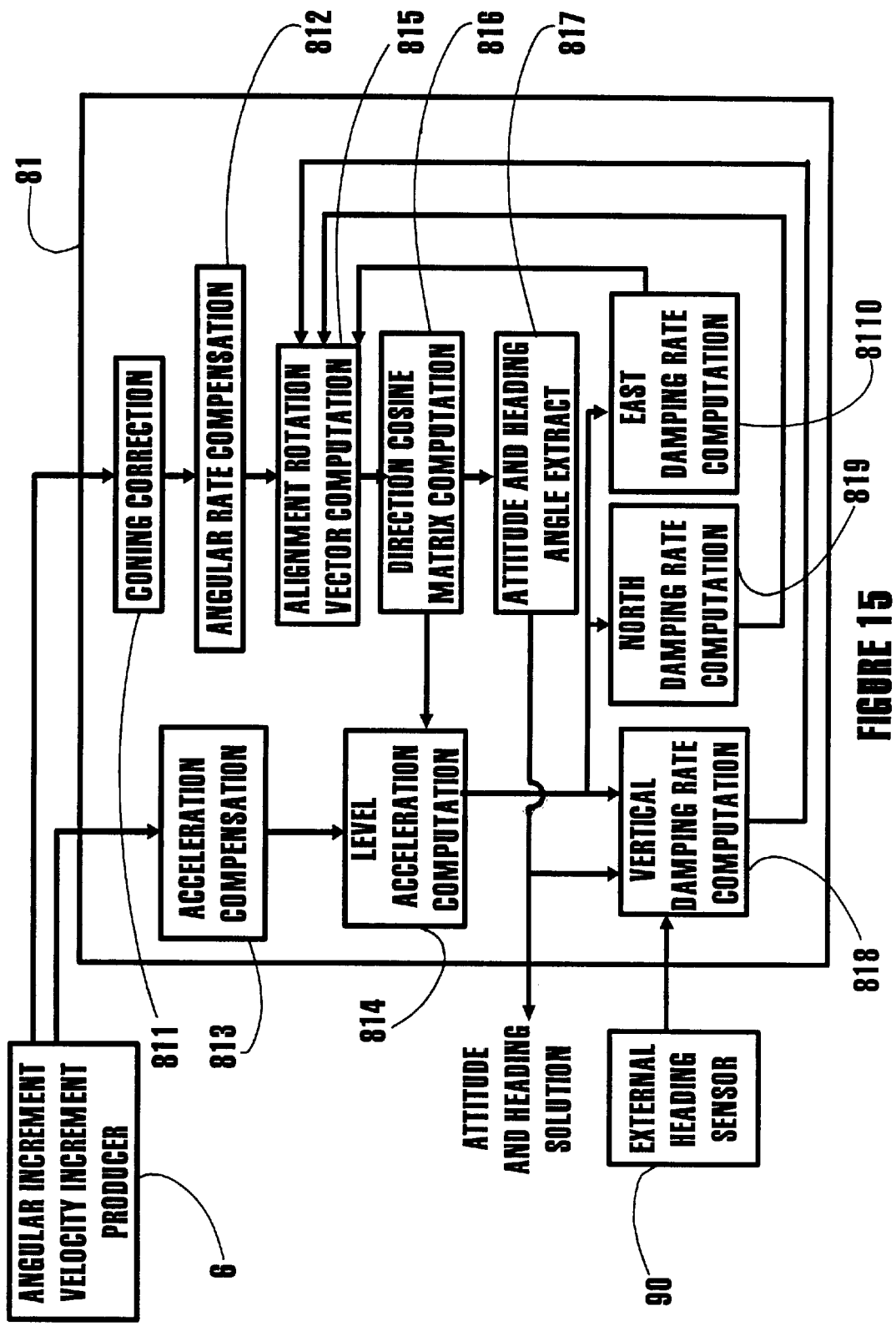
FIG. 15 is a block diagram illustrating the attitude and heading processing module according to the above preferred embodiment of the present invention.

In order to adapt to digital three-axis angular increment voltage value and three-axis digital velocity increment voltage values from the angular increment and velocity increment producer 6, the attitude and heading module 81, as shown in FIG. 15, comprises a coning correction module 811, wherein digital three-axis angular increment voltage values from the input/output interface circuit 65 of the angular increment and velocity increment producer 6 and coarse angular rate bias obtained from an angular rate producer and acceleration producer calibration procedure at a high data rate (short interval) are input into the coning correction module 801, which computes coning effect errors by using the input digital three-axis angular increment voltage values and coarse angular rate bias, and outputs three-axis coning effect terms and three-axis angular increment voltage values at a reduced data rate (long interval), which are called three-axis long-interval angular increment voltage values.

The attitude and heading module 81 further comprises an angular rate compensation module 812 and an alignment rotation vector computation module 815. In the angular rate compensation module 812, the coning effect errors and three-axis long-interval angular increment voltage values from the coning correction module 811 and angular rate device misalignment parameters, fine angular rate bias, angular rate device scale factor, and coning correction scale factor from the angular rate producer and acceleration producer calibration procedure are connected to the angular rate compensation module 812 for compensating definite errors in the three-axis long-interval angular increment voltage values using the coning effect errors, angular rate device misalignment parameters, fine angular rate bias, and coning correction scale factor, and transforming the compensated three-axis long-interval angular increment voltage values to real three-axis long-interval angular increments using the angular rate device scale factor. Moreover, the real three-axis angular increments are output to the alignment rotation vector computation module 815.

The attitude and heading module 81 further comprises an accelerometer compensation module 813 and a level acceleration computation module 814, wherein the three-axis velocity increment voltage values from the angular increment and velocity increment producer 6 and acceleration device misalignment, acceleration device bias, and acceleration device scale factor from the angular rate producer and acceleration producer calibration procedure are connected to the accelerometer compensation module 813 for transforming the three-axis velocity increment voltage values into real three-axis velocity increments using the acceleration device scale factor, and compensating the definite errors in three-axis velocity increments using the acceleration device misalignment, accelerometer bias, wherein the compensated three-axis velocity increments are connected to the level acceleration computation module 814.

By using the compensated three-axis angular increments from the angular rate compensation module 812, an east damping rate increment from an east damping rate computation module 8110, a north damping rate increment from a north damping rate computation module 819, and vertical damping rate increment from a vertical damping rate computation module 818, a quatenion, which is a vector representing rotation angle of the carrier, is updated, and the updated quaternion is connected to a direction cosine matrix computation module 816 for computing the direction cosine matrix, by using the updated quaternion.

The computed direction cosine matrix is connected to the level acceleration computation module 814 and an attitude and heading angle extract module 817 for extracting attitude and heading angle using the direction cosine matrix from the direction cosine matrix computation module 816.

The compensated three-axis velocity increments are connected to the level acceleration computation module 814 for computing level velocity increments using the compensated three-axis velocity increments from the acceleration compensation module 814 and the direction cosine matrix from the direction cosine matrix computation module 816.

The level velocity increments are connected to the east damping rate computation module 8110 for computing east damping rate increments using the north velocity increment of the input level velocity increments from the level acceleration computation module 814.

The level velocity increments are connected to the north damping rate computation module 819 for computing north damping rate increments using the east velocity increment of the level velocity increments from the level acceleration computation module 814.

The heading angle from the attitude and heading angle extract module 817 and a measured heading angle from the external heading sensor 90 are connected to the vertical damping rate computation module 818 for computing vertical damping rate increments.

The east damping rate increments, north damping rate increments, and vertical damping rate are fed back to the alignment rotation vector computation module 815 to damp the drift of errors of the attitude and heading angles.

Alternatively, in order to adapt real digital three-axis angular increment values and real three-axis digital velocity increment values from the angular increment and velocity increment producer 6, referring to FIG. 15, the real digital three-axis angular increment values from the angular increment and velocity increment producer 6 and coarse angular rate bias obtained from an angular rate producer and acceleration producer calibration procedure at a high data rate (short interval) are connected to the coning correction module 811 for computing coning effect errors in the coning correction module 811 using the digital three-axis angular increment values and coarse angular rate bias and outputting three-axis coning effect terms and three-axis angular increment values at reduced data rate (long interval), which are called three-axis long-interval angular increment values, into the angular rate compensation module 802.

The coning effect errors and three-axis long-interval angular increment values from the coning correction module 811 and angular rate device misalignment parameters and fine angular rate bias from the angular rate producer and acceleration producer calibration procedure are connected to the angular rate compensation module 812 for compensating definite errors in the three-axis long-interval angular increment values using the coning effect errors, angular rate device misalignment parameters, fine angular rate bias, and coning correction scale factor, and outputting the real three-axis angular increments to the alignment rotation vector computation module 815.

The three-axis velocity increment values from the angular increment and velocity increment producer 6 and acceleration device misalignment, and acceleration device bias from the angular rate producer and acceleration producer calibration procedure are connected into the accelerometer compensation module 813 for compensating the definite errors in three-axis velocity increments using the acceleration device misalignment, and accelerometer bias; outputting the compensated three-axis velocity increments to the level acceleration computation module 814.

It is identical to the above mentioned processing that the following modules use the compensated three-axis angular increments from the angular rate compensation module 812 and compensated three-axis velocity increments from the acceleration compensation module 813 to produce attitude and heading angle.

Figure 14:
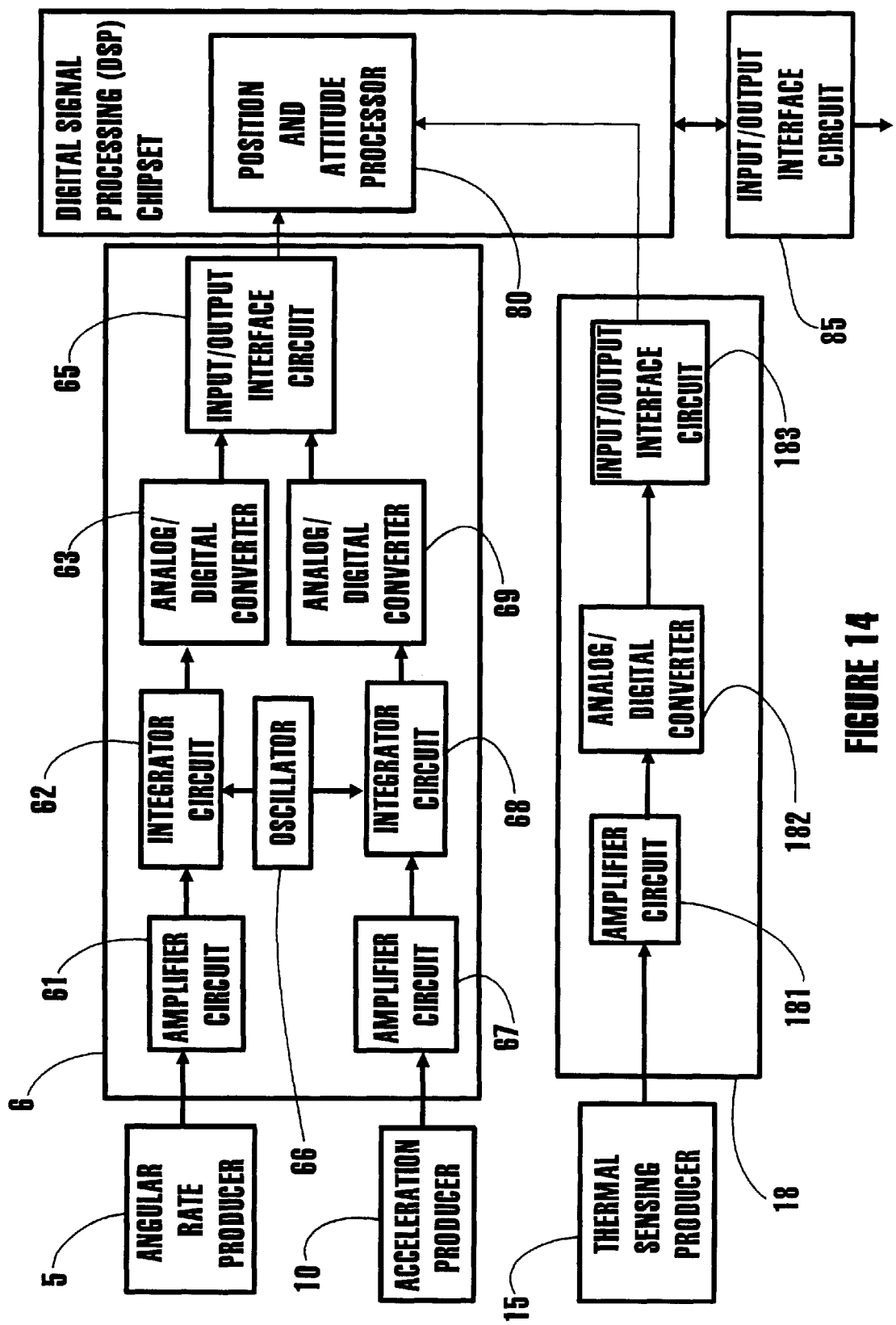
FIG. 14 is a block diagram illustrating a processing module with thermal compensation processing for the micro inertial measurement unit according to the above preferred embodiment of the present invention.

Referring to FIGS. 3, 14, and 15, which use the temperature compensation method by means of the temperature digitizer 18, in order to adapt to digital three-axis angular increment voltage value and three-axis digital velocity increment voltage values from the angular increment and velocity increment producer 6, the digital three-axis angular increment voltage values from the angular increment and velocity increment producer 6 and coarse angular rate bias obtained from an angular rate producer and acceleration producer calibration procedure at a high data rate (short interval) are connected to the coning correction module 811 for computing coning effect errors in the coning correction module 811 using the digital three-axis angular increment voltage values and coarse angular rate bias, and outputting three-axis coning effect terms and three-axis angular increment voltage values at a reduced data rate (long interval), which are called three-axis long-interval angular increment voltage values, into the angular rate compensation module 812.

The coning effect errors and three-axis long-interval angular increment voltage values from the coning correction module 811 and angular rate device misalignment parameters, fine angular rate bias, angular rate device scale factor, coning correction scale factor from the angular rate producer and acceleration producer calibration procedure, the digital temperature signals from input/output interface circuit 183, and temperature sensor scale factor are connected to the angular rate compensation module 812 for computing current temperature of the angular rate producer, accessing angular rate producer temperature characteristic parameters using the current temperature of the angular rate producer, compensating definite errors in the three-axis long-interval angular increment voltage values using the coning effect errors, angular rate device misalignment parameters, fine angular rate bias, and coning correction scale factor, transforming the compensated three-axis long-interval angular increment voltage values to real three-axis long-interval angular increments, compensating temperature-induced errors in the real three-axis long-interval angular increments using the angular rate producer temperature characteristic parameters, and outputting the real three-axis angular increments to the alignment rotation vector computation module 805.

The three-axis velocity increment voltage values from the angular increment and velocity increment producer 6 and acceleration device misalignment, acceleration bias, acceleration device scale factor from the angular rate producer and acceleration producer calibration procedure, the digital temperature signals from the input/output interface circuit 183 of the temperature digitizer 18, and temperature sensor scale factor are connected to the acceleration compensation module 813 for computing current temperature of the acceleration producer, accessing acceleration producer temperature characteristic parameters using the current temperature of the acceleration producer, transforming the three-axis velocity increment voltage values into real three-axis velocity increments using the acceleration device scale factor, compensating the definite errors in the three-axis velocity increments using the acceleration device misalignment and acceleration bias, compensating temperature-induced errors in the real three-axis velocity increments using the acceleration producer temperature characteristic parameters, and outputting the compensated three-axis velocity increments to the level acceleration computation module 814.

It is identical to the above mentioned processing that the following modules use the compensated three-axis angular increments from the angular rate compensation module 812 and compensated three-axis velocity increments from the acceleration compensation module 813 to produce the attitude and heading angles.

Alternatively, referring to FIGS. 3, 14, and 15, which use the temperature compensation method, in order to adapt real digital three-axis angular increment values and real three-axis digital velocity increment values from the angular increment and velocity increment producer 6, the attitude and heading module 81 can be further modified to accept the digital three-axis angular increment values from the angular increment and velocity increment producer 6 and coarse angular rate bias obtained from an angular rate producer and acceleration producer calibration procedure at a high data rate (short interval) into the coning correction module 811 for computing coning effect errors in the coning correction module 811 using the input digital three-axis angular increment values and coarse angular rate bias, and outputting three-axis coning effect data and three-axis angular increment data at a reduced data rate (long interval), which are called three-axis long-interval angular increment values, into the angular rate compensation module 812.

The coning effect errors and three-axis long-interval angular increment values from the coning correction module 811 and angular rate device misalignment parameters and fine angular rate bias from the angular rate producer and acceleration producer calibration procedure, the digital temperature signals from the input/output interface circuit 183 and temperature sensor scale factor are connected to the angular rate compensation module 812 for computing current temperature of the angular rate producer, accessing angular rate producer temperature characteristic parameters using the current temperature of the angular rate producer, compensating definite errors in the three-axis long-interval angular increment values using the coning effect errors, angular rate device misalignment parameters, fine angular rate bias, and coning correction scale factor, compensating temperature-induced errors in the real three-axis long-interval angular increments using the angular rate producer temperature characteristic parameters, and outputting the real three-axis angular increments to an alignment rotation vector computation module 815.

The three-axis velocity increment values from the input/output interface circuit 65 and acceleration device misalignment and acceleration bias from the angular rate producer and acceleration producer calibration procedure, the digital temperature signals from the input/output interface circuit 183 and temperature sensor scale factor are input into the acceleration compensation module 803 for computing current temperature of the acceleration producer, accessing the acceleration producer temperature characteristic parameters using the current temperature of the acceleration producer, compensating the definite errors in the three-axis velocity increments using the input acceleration device misalignment, acceleration bias, compensating temperature-induced errors in the real three-axis velocity increments using the acceleration producer temperature characteristic parameters, and outputting the compensated three-axis velocity increments to the level acceleration computation module 804.

It is identical to the above mentioned processing that the following modules use the compensated three-axis angular increments from the angular rate compensation module 812 and compensated three-axis velocity increments from the acceleration compensation module 813 to produce the attitude and heading angles.

Figure 16:
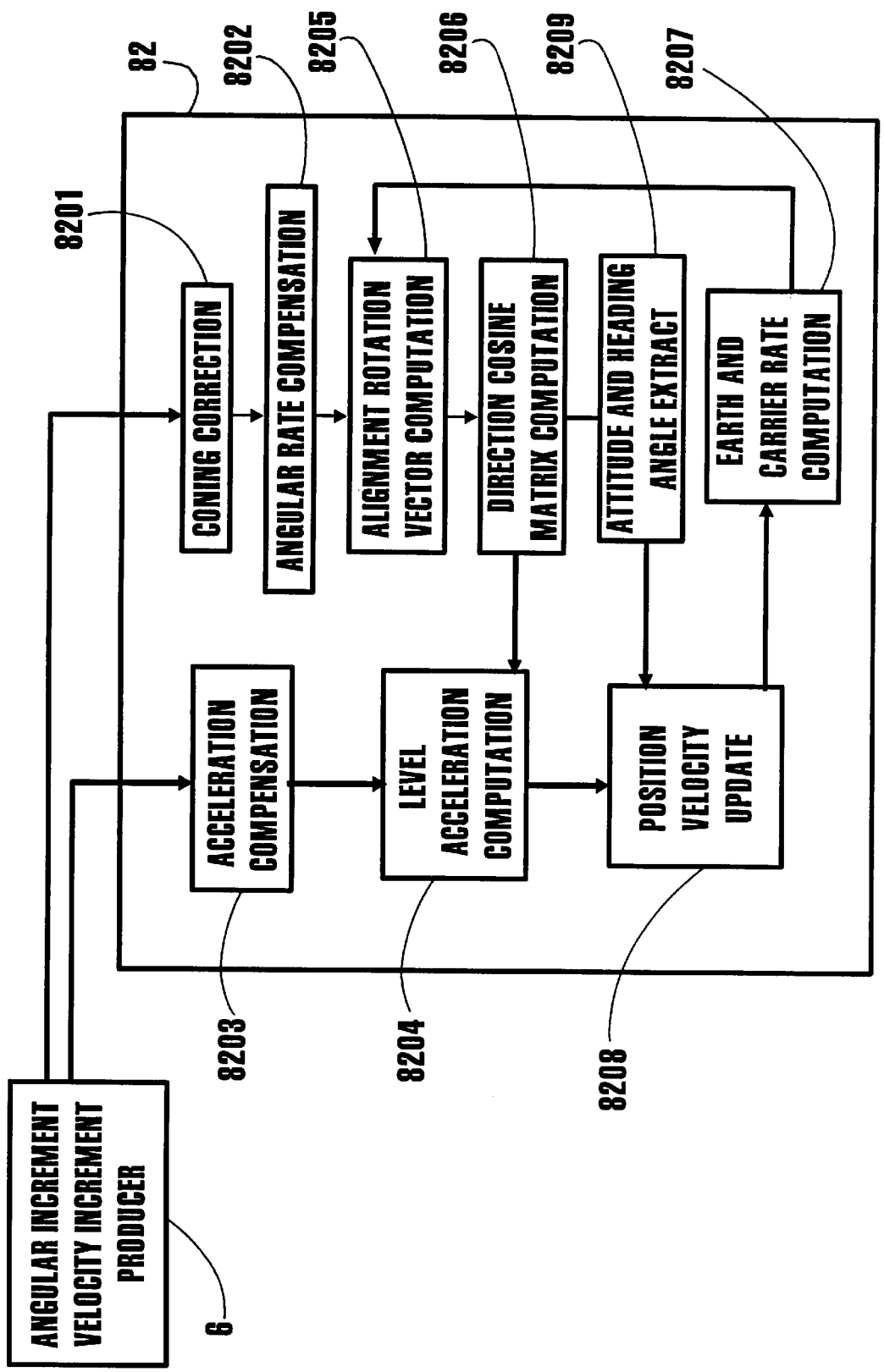
FIG. 16 is a functional block diagram illustrating the position velocity attitude and heading module according to the above preferred embodiment of the present invention.

Referring to FIG. 16, the Position, velocity, and attitude Module 82 comprises:

a coning correction module 8201, which is same as the coning correction module 811 of the attitude and heading module 81;

an angular rate compensation module 8202, which is same as the angular rate compensation module 812 of the attitude and heading module 81;

an alignment rotation vector computation module 8205, which is same as the alignment rotation vector computation module 815 of the attitude and heading module 81;

a direction cosine matrix computation module 8206, which is same as the Direction cosine matrix computation module 816 of the attitude and heading module 81;

an acceleration compensation module 8203, which is same as the acceleration compensation module 813 of the attitude and heading module 81;

a level acceleration computation module 8204, which is same as the acceleration compensation module 814 of the attitude and heading module 81; and an attitude and heading angle extract module 8209, which is same as the attitude and heading angle extract module 817 of the attitude and heading module 81.

A position and velocity update module 8208 accepts the level velocity increments from the level acceleration computation module 8204 and computes position and velocity solution.

An earth and carrier rate computation module 8207 accepts the position and velocity solution from the position and velocity update module 8208 and computes the rotation rate vector of the local navigation frame (n frame) of the carrier relative to the inertial frame (i frame), which is connected to the alignment rotation vector computation module 8205.

In order to meet the diverse requirements of application systems, referring to FIGS. 11 and 14, the digital three-axis angular increment voltage values, the digital three-axis velocity increment, and digital temperature signals in the input/output interface circuit 65 and the input/output interface circuit 305 can be ordered with a specific format required by an external user system, such as RS-232 serial communication standard, RS-422 serial communication standard, the popular PCI/ISA bus standard, and 1553 bus standard, etc.

In order to meet diverse requirements of application systems, referring to FIGS. 1, 11 and 14, the digital three-axis angular increment values, the digital three-axis velocity increment, and attitude and heading data in the input/output interface circuit 85 are ordered with a specific format required by an external user system, such as RS-232 serial communication standard, RS-422 serial communication standard, PCI/ISA bus standard, and 1553 bus standard, etc.

As mentioned above, one of the key technologies of the present invention to achieve the micro IMU with a high degree of performance is to utilize a micro size angular rate producer, wherein the micro-size angular rate producer with MEMS technologies and associated mechanical supporting structure and circuitry board deployment of the micro IMU of the present invention are disclosed in the following description.

Another of the key technologies of the present invention to achieve the micro IMU with low power consumption is to design a micro size circuitry with small power consumption, wherein the conventional AISC (Application Specific Integrated Circuit) technologies can be utilized to shrink a complex circuitry into a silicon chip.

Existing MEMS technologies, which are employed into the micro size angular rate producer, use vibrating inertial elements (a micromachine) to sense vehicle angular rate via the Coriolis Effect. The angular rate sensing principle of Coriolis Effect is the inspiration behind the practical vibrating angular rate sensors.

The Coriolis Effect can be explained by saying that when an angular rate is applied to a translating or vibrating inertial element, a Coriolis force is generated. When this angular rate is applied to the axis of an oscillating inertial element, its tines receive a Coriolis force, which then produces torsional forces about the sensor axis. These forces are proportional to the applied angular rate, which then can be measured.

The force (or acceleration), Coriolis force (or Coriolis acceleration) or Coriolis effect, is originally named from a French physicist and mathematician, Gaspard de Coriolis (1792–1843), who postulated his acceleration in 1835 as a correction for the earth's rotation in ballistic trajectory calculations. The Coriolis acceleration acts on a body that is moving around a point with a fixed angular velocity and moving radially as well.

The basic equation defining Coriolis force is expressed as follows:

$$\vec{F}_{Coriolis} = m\vec{a}_{Coriolis} = 2m(\vec{\omega} \times \vec{V}_{Oscillation})$$

where $\vec{F}_{Coriolis}$ is the detected Coriolis force;
m is the mass of the inertial element;

$\vec{a}_{Coriolis}$ is the generated Coriolis acceleration;

$\vec{\omega}$ is the applied (input) angular rotation rate;

$\vec{V}_{Oscillation}$ is the oscillation velocity in a rotating frame.

The Coriolis force produced is proportional to the product of the mass of the inertial element, the input rotation rate, and the oscillation velocity of the inertial element that is perpendicular to the input rotation rate.

The major problems with micromachined vibrating type angular rate producer are insufficient accuracy, sensitivity, and stability. Unlike MEMS acceleration producers that are passive devices, micromachined vibrating type angular rate producer are active devices. Therefore, associated high performance electronics and control should be invented to effectively use hands-on micromachined vibrating type angular rate producers to achieve high performance angular rate measurements in order to meet the requirement of the micro IMU.

Therefore, in order to obtain angular rate sensing signals from a vibrating type angular rate detecting unit, a dither drive signal or energy must be fed first into the vibrating type angular rate detecting unit to drive and maintain the oscillation of the inertial elements with a constant momentum. The performance of the dither drive signals is critical for the whole performance of a MEMS angular rate producer.

Figure 17:
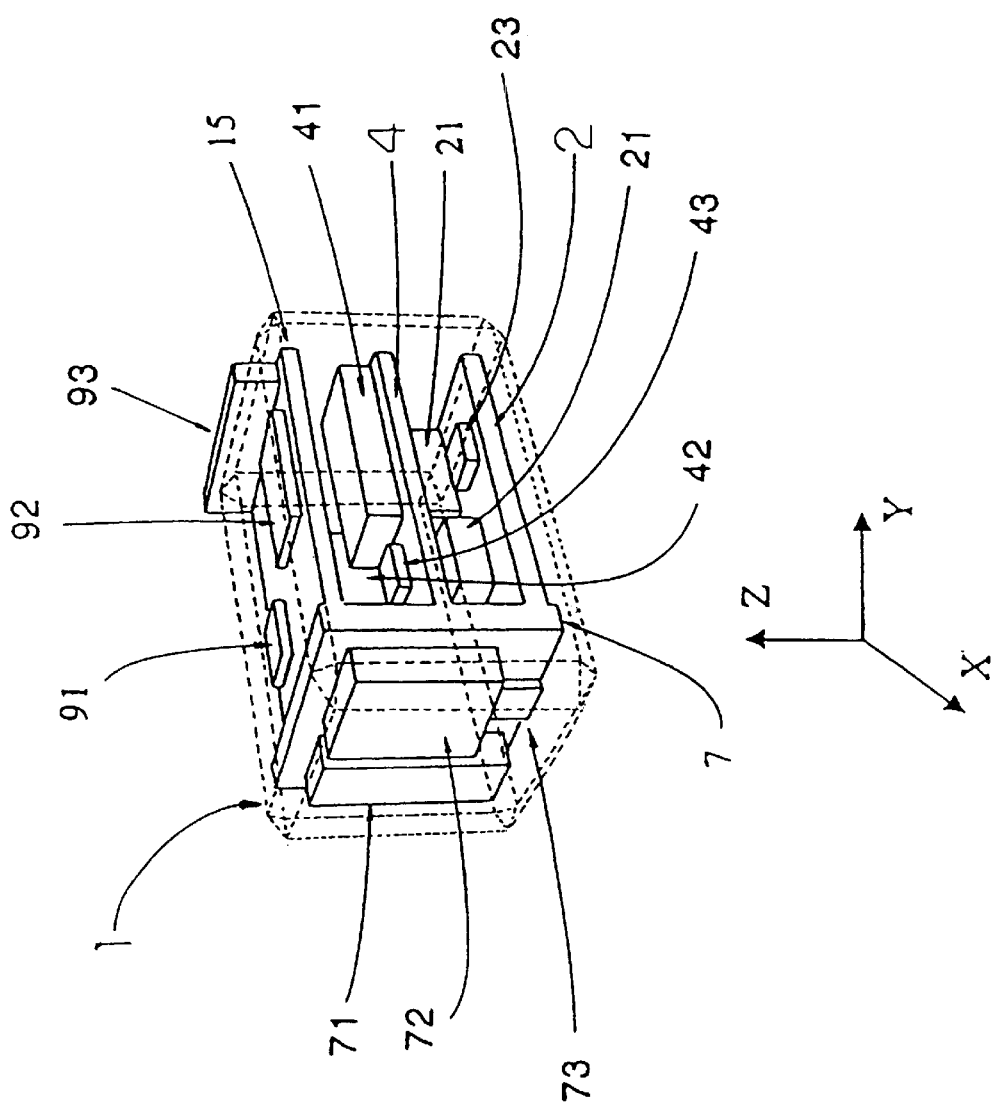
FIG. 17 is a perspective view illustrating the inside mechanical structure and circuit board deployment in the micro IMU according to the above preferred embodiment of the present invention.
Figure 18:
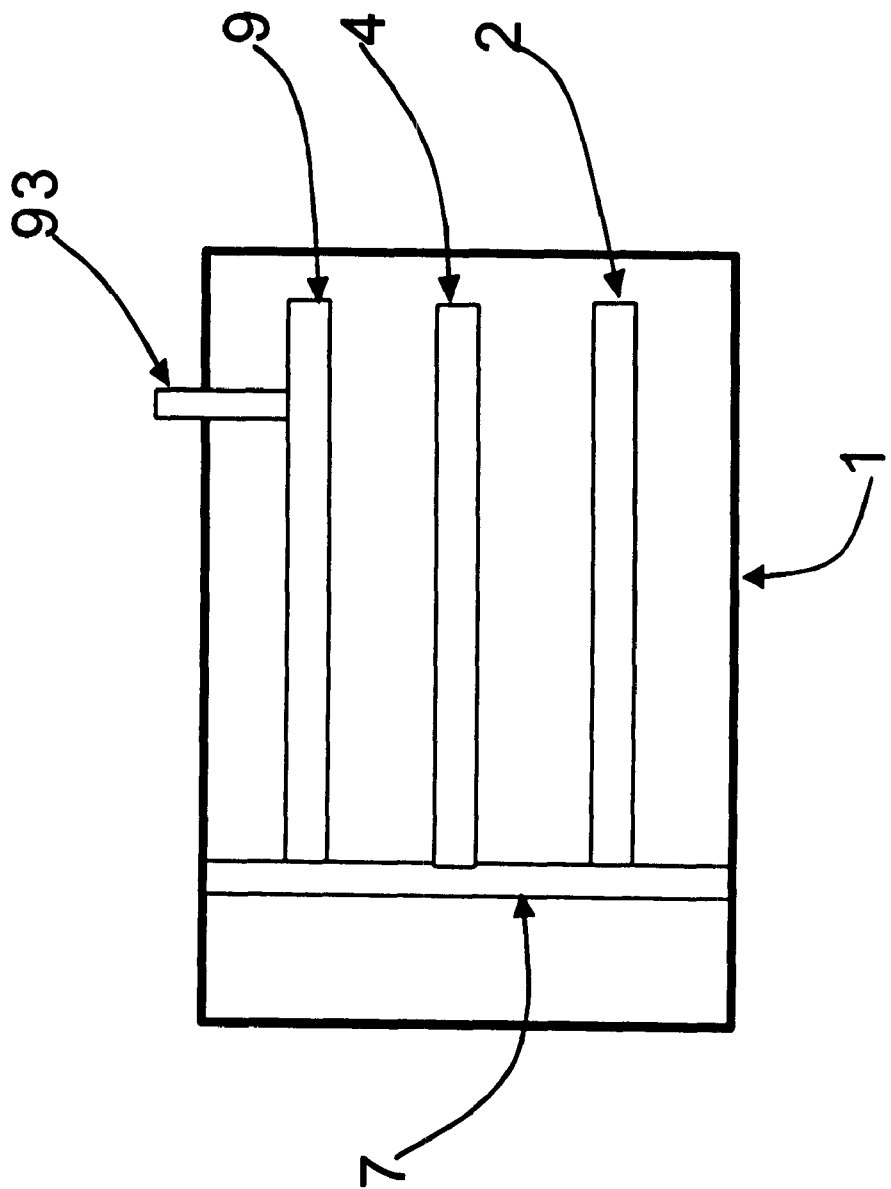
FIG. 18 is a sectional side view of the micro IMU according to the above preferred embodiment of the present invention.

As shown in FIG. 17 and FIG. 18, which are a perspective view and a sectional view of the micro IMU of the present invention as shown in the block diagram of FIG. 1, the micro IMU comprises a first circuit board 2, a second circuit board 4, a third circuit board 7, and a control circuit board 9 arranged inside a metal cubic case 1.

The first circuit board 2 is connected with the third circuit board 7 for producing X axis angular sensing signal and Y axis acceleration sensing signal to the control circuit board 9.

The second circuit board 4 is connected with the third circuit board 7 for producing Y axis angular sensing signal and X axis acceleration sensing signal to the control circuit board 9.

The third circuit board 7 is connected with the control circuit board 9 for producing Z axis angular sensing signal and Z axis acceleration sensing signals to the control circuit board 9.

The control circuit board 9 is connected with the first circuit board 2 and then the second circuit board 4 through the third circuit board 7 for processing the X axis, Y axis and Z axis angular sensing signals and the X axis, Y axis and Z axis acceleration sensing signals from the first, second and control circuit board to produce digital angular increments and velocity increments, position, velocity, and attitude solution.

Figure 19:
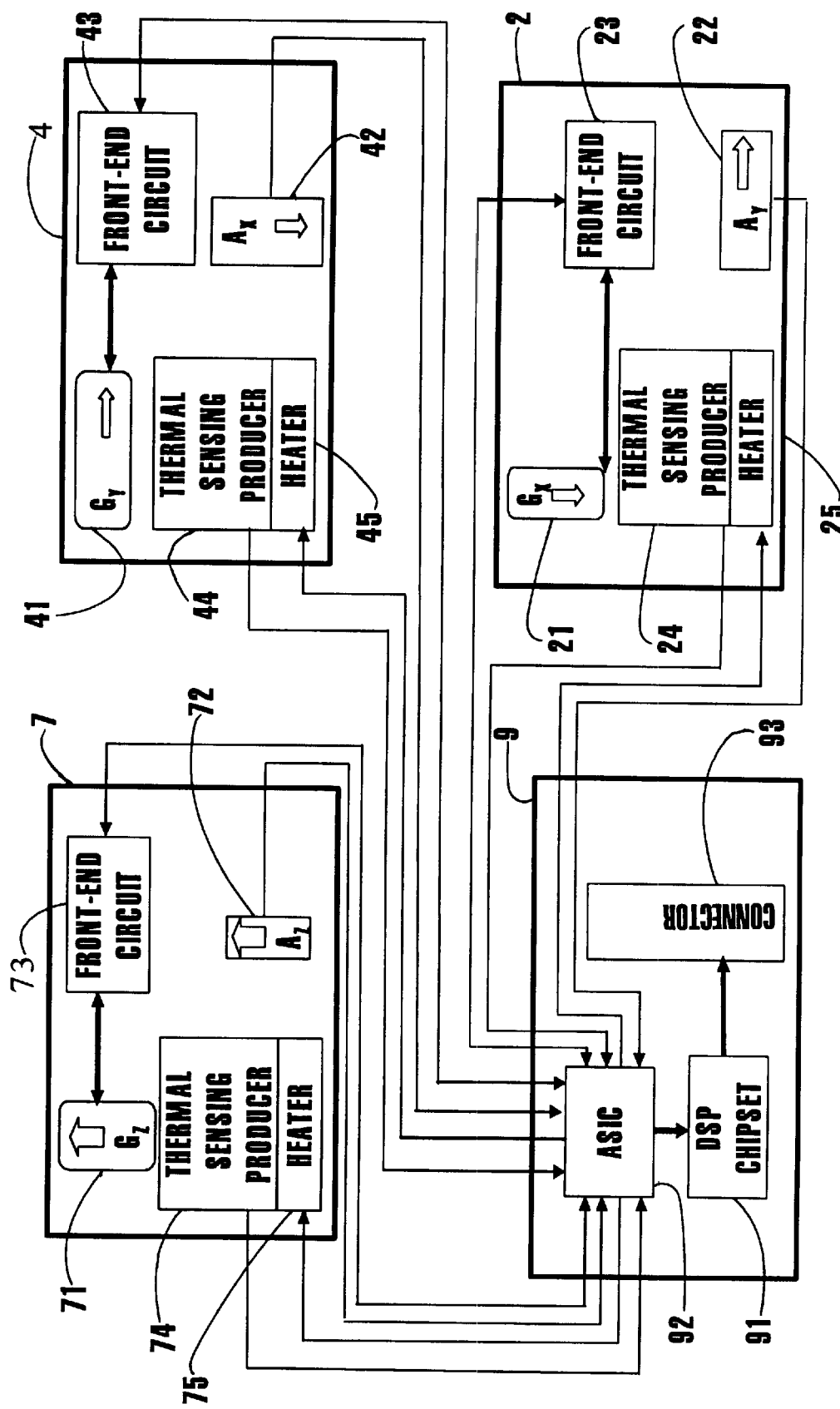
FIG. 19 is a block diagram illustrating the connection among the four circuit boards inside the micro IMU according to the above preferred embodiment of the present invention.
Figure 20:
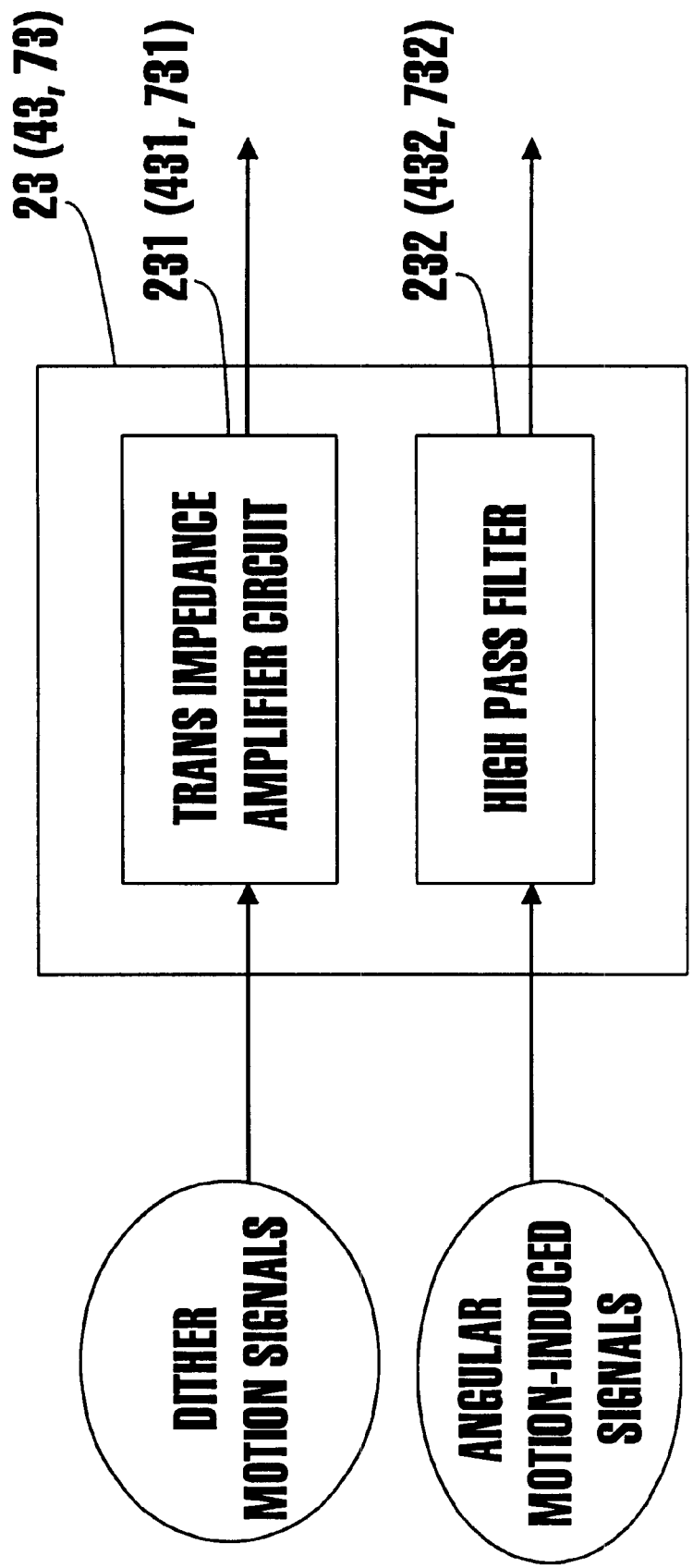
FIG. 20 is a block diagram of the front-end circuit in each of the first, second, and fourth circuit boards of the micro IMU according to the above preferred embodiment of the present invention.
Figure 21:
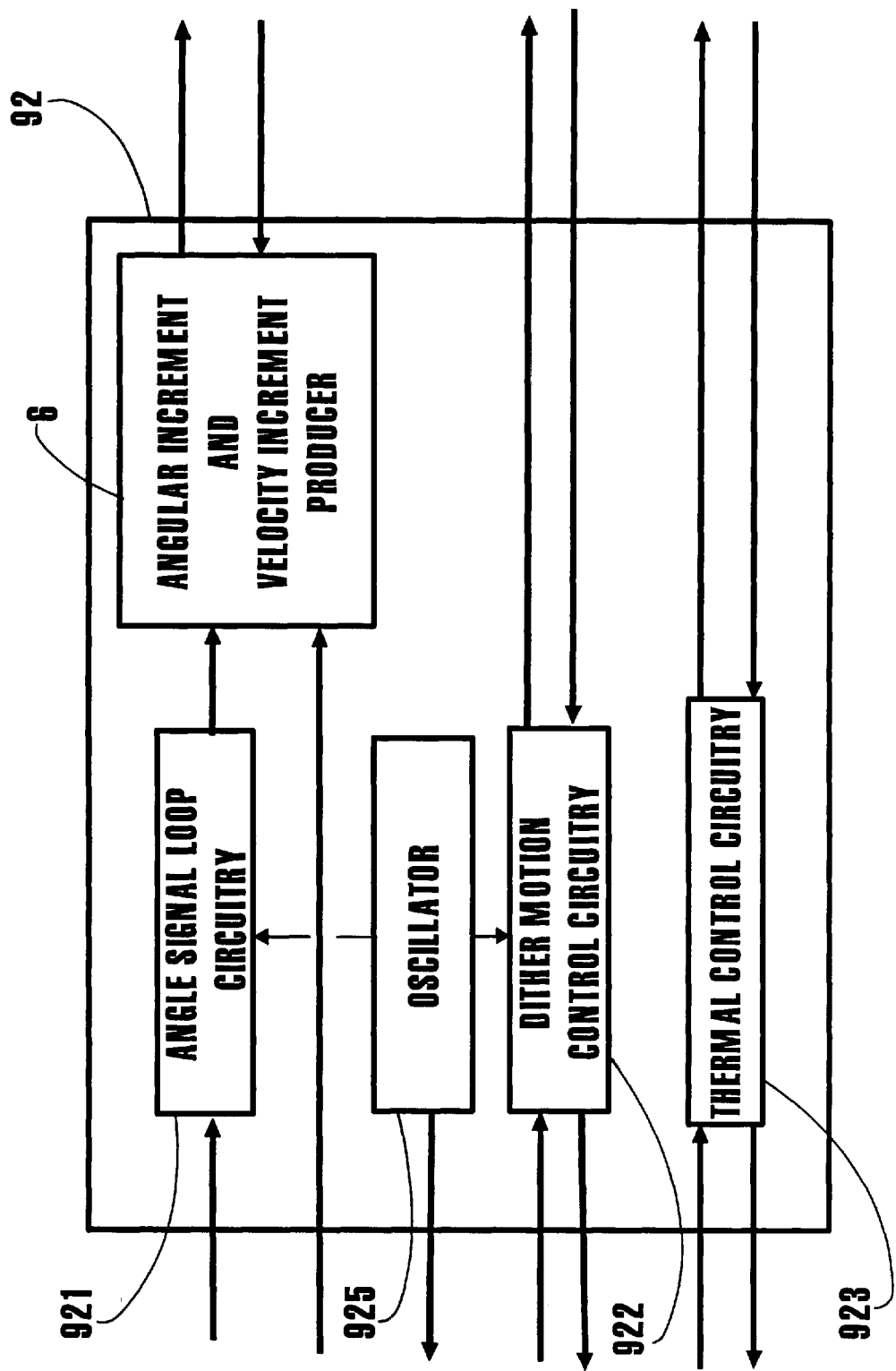
FIG. 21 is a block diagram of the ASIC chip in the third circuit board of the micro IMU according to the above preferred embodiment of the present invention.
Figure 22:
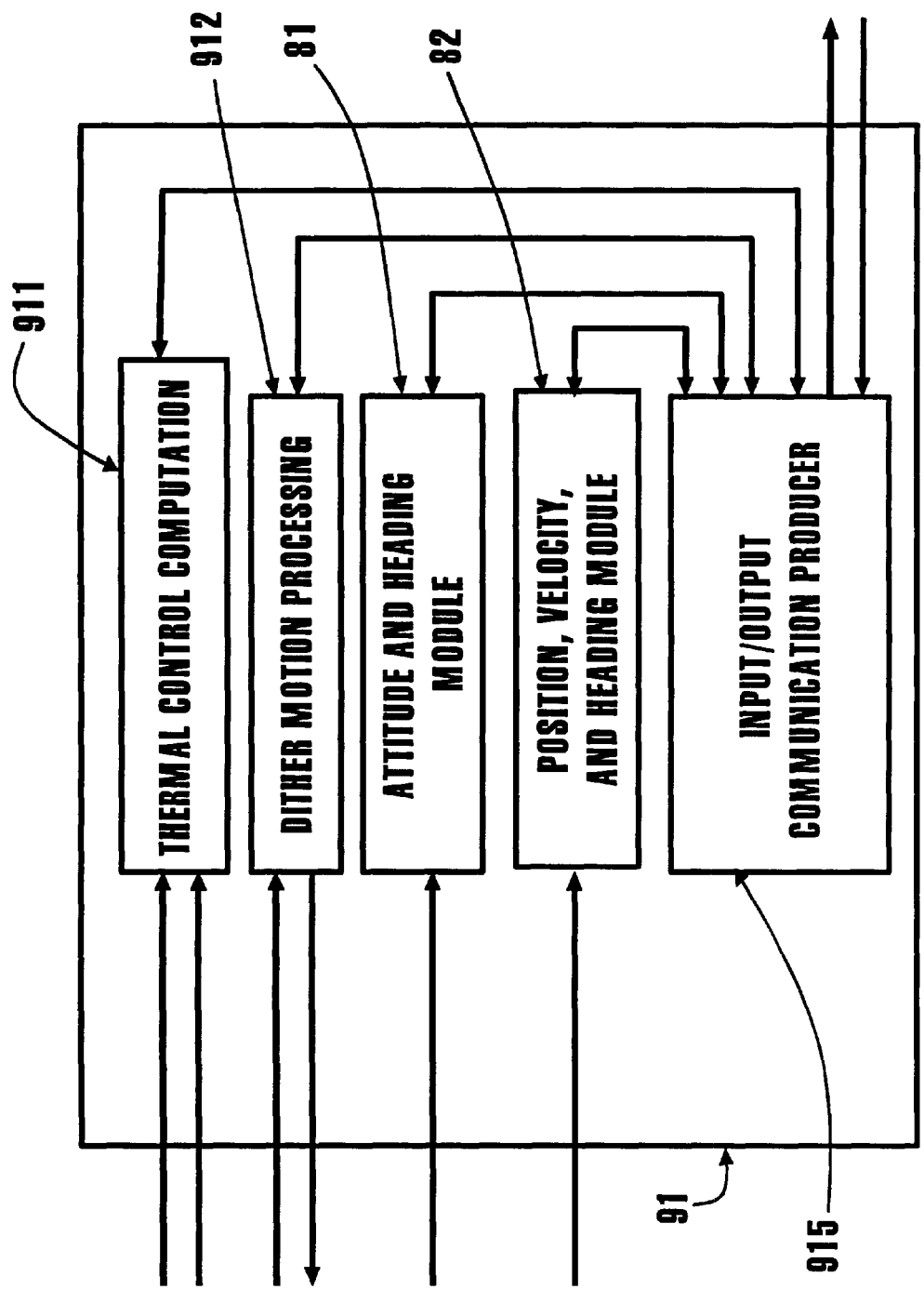
FIG. 22 is a block diagram of processing modules running in the DSP chipset in the third circuit board of the micro IMU according to the above preferred embodiment of the present invention.

As shown in FIG. 19, the angular producer 5 of the preferred embodiment of the present invention comprises:

a X axis vibrating type angular rate detecting unit 21 and a first front-end circuit 23 connected on the first circuit board 2;

a Y axis vibrating type angular rate detecting unit 41 and a second front-end circuit 43 connected on the second circuit board 4;

a Z axis vibrating type angular rate detecting unit 71 and a third front-end circuit 73 connected on the third circuit board 7;

three angular signal loop circuitries 921, which are provided in a ASIC chip 92 connected on the control circuit board 9, for the first, second and third circuit boards 2, 4, 7 respectively;

three dither motion control circuitries 922, which are provided in the ASIC chip 92 connected on the control circuit board 9, for the first, second and third circuit boards 2, 4, 7 respectively;

an oscillator 925 adapted for providing reference pickoff signals for the X axis vibrating type angular rate detecting unit 21, the Y axis vibrating type angular rate detecting unit 41, the Z axis vibrating type angular rate detecting unit 71, the angle signal loop circuitry 921, and the dither motion control circuitry 922; and three dither motion processing modules 912, which run in a DSP (Digital Signal Processor) chipset 91 connected on the control circuit board 9, for the first, second and third circuit boards 2, 4, 7 respectively.

The first, second and third front-end circuits 23, 43, 73, each of which is structurally identical, are used to condition the output signal of the X axis, Y axis and Z axis vibrating type angular rate detecting units 21, 41, 71 respectively and each further comprises:

a trans impedance amplifier circuit 231, 431, 731, which is connected to the respective X axis, Y axis or Z axis vibrating type angular rate detecting unit 21, 41, 71 for changing the output impedance of the dither motion signals from a very high level, greater than 100 million ohms, to a low level, less than 100 ohms to achieve two dither displacement signals, which are A/C voltage signals representing the displacement between the inertial elements and the anchor combs. The two dither displacement signals are output to the dither motion control circuitry 922; and a high-pass filter circuit 232, 432, 732, which is connected with the respective X axis, Y axis or Z axis vibrating type angular rate detecting units 21, 41, 71 for removing residual dither drive signals and noise from the dither displacement differential signal to form a filtered dither displacement differential signal to the angular signal loop circuitry 921.

Each of the X axis, Y axis and Z axis angular rate detecting units 21, 41, and 71 is structurally identical except that sensing axis of each angular rate detecting unit is placed in an orthogonal direction. The X axis angular rate detecting unit 21 is adapted to detect the angular rate of the vehicle along X axis. The Y axis angular rate detecting unit 21 is adapted to detect the angular rate of the vehicle along Y axis. The Z axis angular rate detecting unit 21 is adapted to detect the angular rate of the vehicle along Z axis.

Each of the X axis, Y axis and Z axis angular rate detecting units 21, 41 and 71 is a vibratory device, which comprises at least one set of vibrating inertial elements, including tuning forks, and associated supporting structures and means, including capacitive readout means, and uses Coriolis effects to detect vehicle angular rate.

Each of the X axis, Y axis and Z axis vibrating type angular rate detecting units 21, 41, 71 receives signals as follows:

1) dither drive signals from the respective dither motion control circuitry 922, keeping the inertial elements oscillating; and 2) carrier reference oscillation signals from the oscillator 925, including capacitive pickoff excitation signals.

Each of the X axis, Y axis and Z axis vibrating type angular rate detecting units 21, 41, 71 detects the angular motion in X axis, Y axis and Z axis respectively of a vehicle in accordance with the dynamic theory (Coriolis force), and outputs signals as follows:

1) angular motion-induced signals, including rate displacement signals which may be modulated carrier reference oscillation signals to a trans Impedance amplifier circuit 231, 431, 731 of the first, second, and third front-end circuit 23; and 2) its inertial element dither motion signals, including dither displacement signals, to the high-pass filter 232, 432,732 of the first, second, and third front-end circuit 23.

The three dither motion control circuitries 922 receive the inertial element dither motion signals from the X axis, Y axis and Z axis vibrating type angular rate detecting units 21, 41, 71 respectively, reference pickoff signals from the oscillator 925, and produce digital inertial element displacement signals with known phase.

Figure 24:
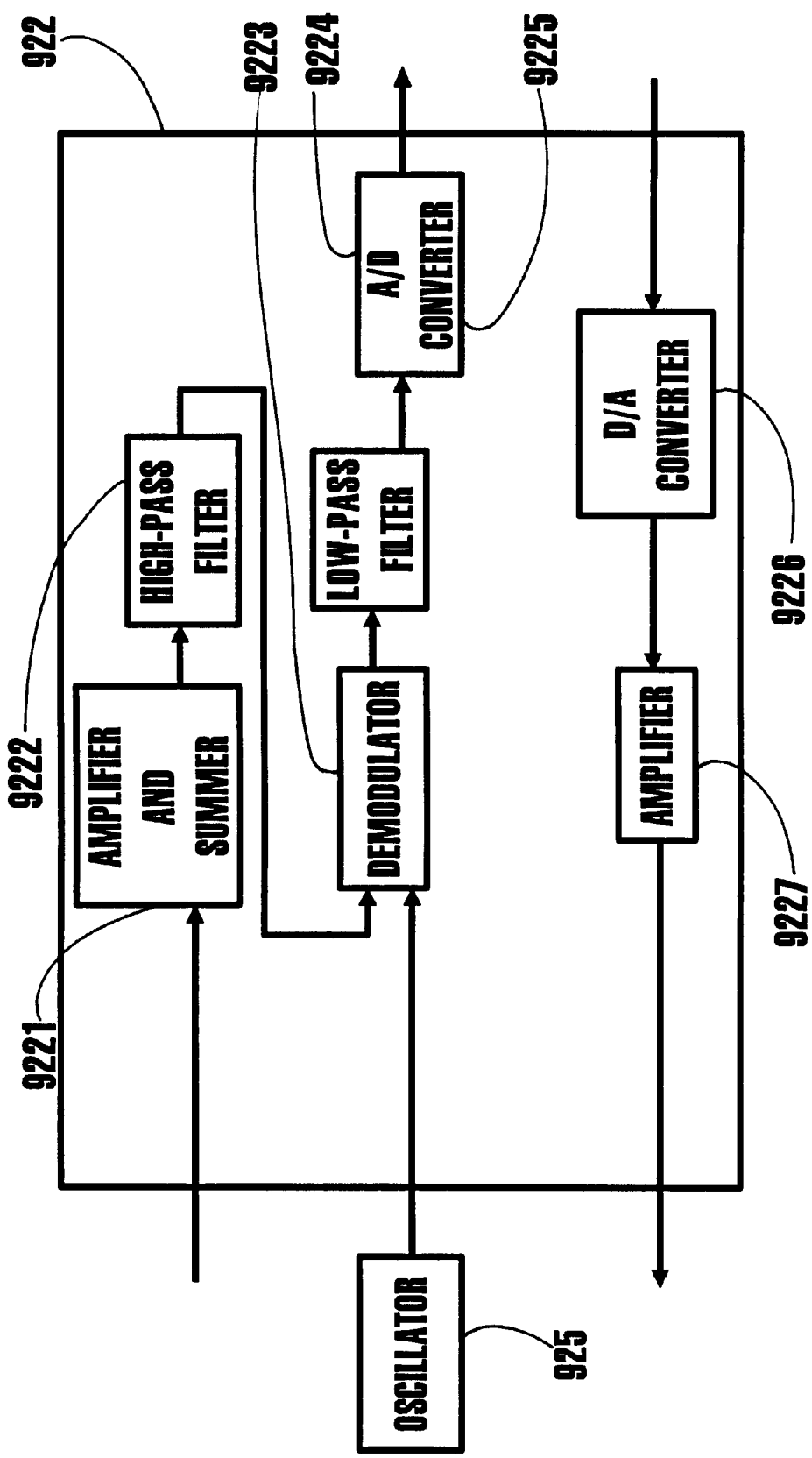
FIG. 24 is block diagram of the dither motion control circuitry of the ASIC chip in the third circuit board of the micro IMU according to the above preferred embodiment of the present invention.

In order to convert the inertial element dither motion signals from the X axis, Y axis and Z axis vibrating type angular rate detecting units 21, 41, 71 to processible inertial element dither motion signals, referring to FIG. 24, each of the dither motion control circuitries 922 comprises:

an amplifier and summer circuit 9221 connected to the trans impedance amplifier circuit 231, 431, 731 of the respective first, second or third front-end circuit 23, 43, 73 for amplifying the two dither displacement signals for more than ten times and enhancing the sensitivity for combining the two dither displacement signals to achieve a dither displacement differential signal by subtracting a center anchor comb signal with a side anchor comb signal;

a high-pass filter circuit 9222 connected to the amplifier and summer circuit 9221 for removing residual dither drive signals and noise from the dither displacement differential signal to form a filtered dither displacement differential signal;

a demodulator circuit 9223 connected to the high-pass filter circuit 2225 for receiving the capacitive pickoff excitation signals as phase reference signals from the oscillator 925 and the filtered dither displacement differential signal from the high-pass filter 9222 and extracting the in-phase portion of the filtered dither displacement differential signal to produce an inertial element displacement signal with known phase;

a low-pass filter 9225 connected to the demodulator circuit 9223 for removing high frequency noise from the inertial element displacement signal input thereto to form a low frequency inertial element displacement signal;

an analog/digital converter 9224 connected to the low-pass filter 9225 for converting the low frequency inertial element displacement analog signal to produce a digitized low frequency inertial element displacement signal to the dither motion processing module 912 (disclosed in the following text) running the DSP chipset 91;

a digital/analog converter 9226 processing the selected amplitude from the dither motion processing module 912 to form a dither drive signal with the correct amplitude; and an amplifier 9227 which generates and amplifies the dither drive signal to the respective X axis, Y axis or Z axis vibrating type angular rate detecting unit 21, 41, 71 based on the dither drive signal with the selected frequency and correct amplitude.

The oscillation of the inertial elements residing inside each of the X axis, Y axis and Z axis vibrating type angular rate detecting units 21, 41, 71 is generally driven by a high frequency sinusoidal signal with precise amplitude. It is critical to provide the X axis, Y axis and Z axis vibrating type angular rate detecting units 21, 41, 71 with high performance dither drive signals to achieve keen sensitivity and stability of X-axis, Y-axis and Z axis angular rate measurements.

The dither motion processing module 912 receives digital inertial element displacement signals with known phase from the analog/digital converter 9224 of the dither motion control circuitry 922 for:

(1) finding the frequencies which have the highest Quality Factor (Q) Values, (2) locking the frequency, and (3) locking the amplitude to produce a dither drive signal, including high frequency sinusoidal signals with a precise amplitude, to the respective X axis, Y axis or Z axis vibrating type angular rate detecting unit 21, 41, 71 to keep the inertial elements oscillating at the pre-determined resonant frequency.

The three dither motion processing modules 912 is to search and lock the vibrating frequency and amplitude of the inertial elements of the respective X axis, Y axis or Z axis vibrating type angular rate detecting unit 21, 41, 71. Therefore, the digitized low frequency inertial element displacement signal is first represented in terms of its spectral content by using discrete Fast Fourier Transform (FFT).

Discrete Fast Fourier Transform (FFT) is an efficient algorithm for computing discrete Fourier transform (DFT), which dramatically reduces the computation load imposed by the DFT. The DFT is used to approximate the Fourier transform of a discrete signal. The Fourier transform, or spectrum, of a continuous signal is defined as:

$$X(j\omega) = \int_{-\infty}^{\infty} x(t) e^{-j\omega t} dt$$

The DFT of N samples of a discrete signals X(nT) is given by:

$$X_s(k\omega) = \sum_{n=0}^{N-1} x(nT) e^{-j\omega Tnk}$$

where $\omega = 2\pi/NT$, T is the inter-sample time interval. The basic property of FFT is its ability to distinguish waves of different frequencies that have been additively combined.

After the digitized low frequency inertial element displacement signals are represented in terms of their spectral content by using discrete Fast Fourier Transform (FFT), Q (Quality Factor) Analysis is applied to their spectral content to determine the frequency with global maximal Q value. The vibration of the inertial elements of the respective X axis, Y axis or Z axis vibrating type angular rate detecting unit 21, 41, 71 at the frequency with global maximal Q value can result in minimal power consumption and cancel many of the terms that affect the excited mode. The Q value is a function of basic geometry, material properties, and ambient operating conditions.

A phase-locked loop and digital/analog converter is further used to control and stabilize the selected frequency and amplitude.

Figure 26:
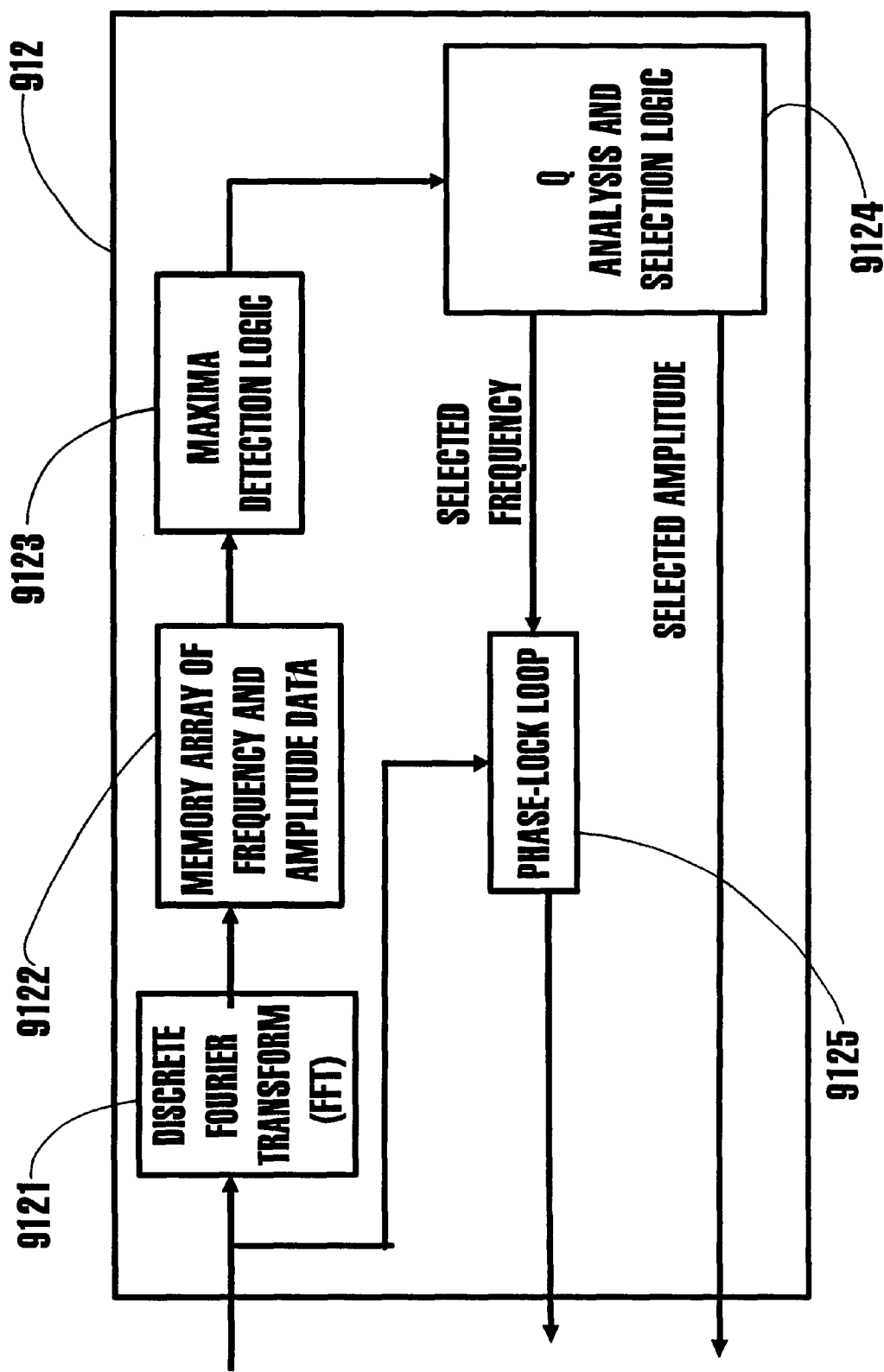
FIG. 26 is a block diagram of the dither motion processing module running in the DSP chipset of the third circuit board of the micro IMU according to the above preferred embodiment of the present invention.

Referring to FIG. 26, the dither motion processing module 912 further includes a discrete Fast Fourier Transform (FFT) module 9121, a memory array of frequency and amplitude data module 9122, a maxima detection logic module 9123, and a Q analysis and selection logic module 9124 to find the frequencies which have the highest Quality Factor (Q) Values.

The discrete Fast Fourier Transform (FFT) module 9121 is arranged for transforming the digitized low frequency inertial element displacement signal from the analog/digital converter 9224 of the dither motion control circuitry 922 to form amplitude data with the frequency spectrum of the input inertial element displacement signal.

The memory array of frequency and amplitude data module 9122 receives the amplitude data with frequency spectrum to form an array of amplitude data with frequency spectrum.

The maxima detection logic module 9123 is adapted for partitioning the frequency spectrum from the array of the amplitude data with frequency into plural spectrum segments, and choosing those frequencies with the largest amplitudes in the local segments of the frequency spectrum.

The Q analysis and selection logic module 9124 is adapted for performing Q analysis on the chosen frequencies to select frequency and amplitude by computing the ratio of amplitude/bandwidth, wherein the range for computing bandwidth is between +−1/2 of the peek for each maximum frequency point.

Moreover, the dither motion processing module 912 further includes a phase-lock loop 9125 to reject noise of the selected frequency to form a dither drive signal with the selected frequency, which serves as a very narrow bandpass filter, locking the frequency.

Figure 23:
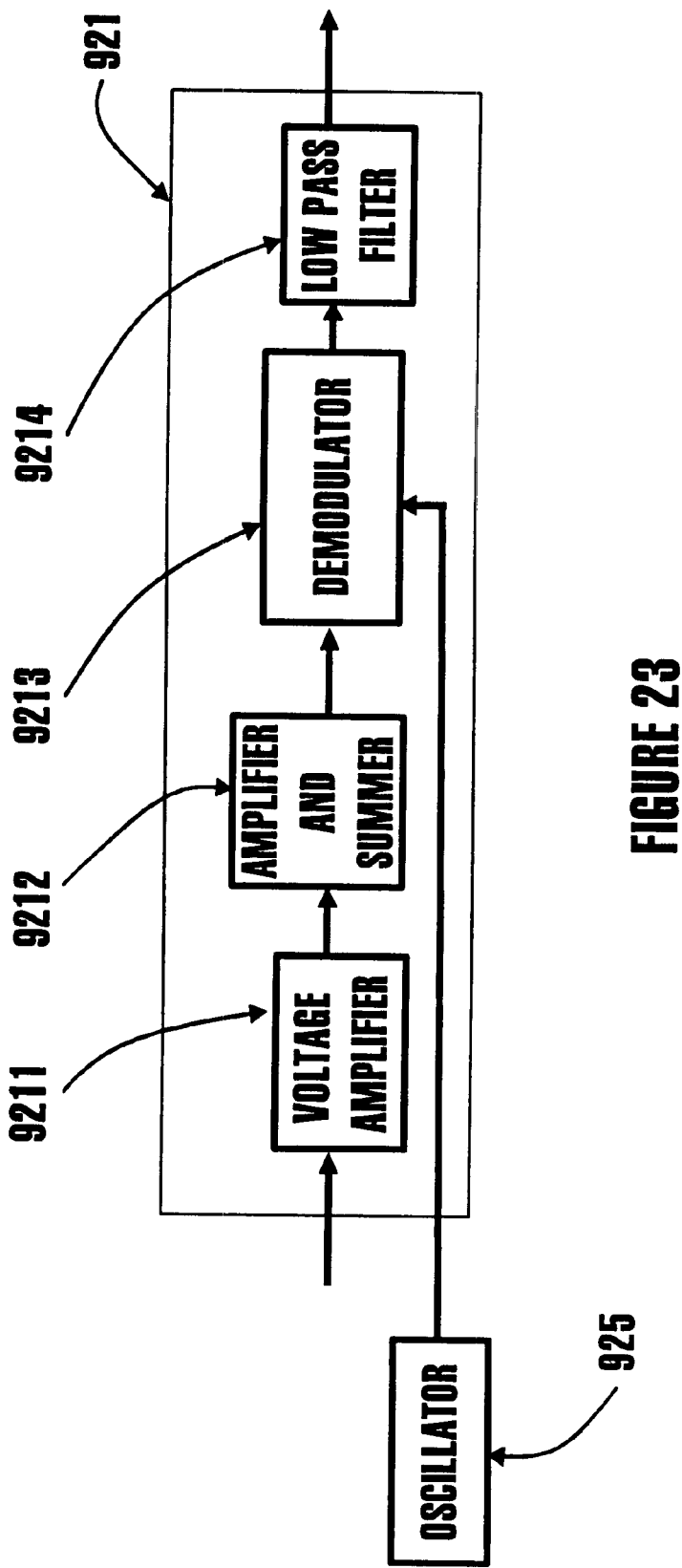
FIG. 23 is a block diagram of the angle signal loop circuitry of the ASIC chip in the third circuit board of the micro IMU according to the above preferred embodiment of the present invention.

The three angle signal loop circuitries 921 receive the angular motion-induced signals from the X axis, Y axis and Z axis vibrating type angular rate detecting units 21, 41, 71 respectively, reference pickoff signals from the oscillator 925, and transform the angular motion-induced signals into angular rate signals. Referring to FIG. 23, each of the angle signal loop circuitries 921 for the respective first, second or third circuit board 2, 4, 7 comprises:

a voltage amplifier circuit 9211, which amplifies the filtered angular motion-induced signals from the high-pass filter circuit 232 of the respective first, second or third front-end circuit 23, 43, 73 to an extent of at least 100 milivolts to form amplified angular motion-induced signals;

an amplifier and summer circuit 9212, which subtracts the difference between the angle rates of the amplified angular motion-induced signals to produce a differential angle rate signal;

a demodulator 9213, which is connected to the amplifier and summer circuit 9212, extracting the amplitude of the in-phase differential angle rate signal from the differential angle rate signal and the capacitive pickoff excitation signals from the oscillator 925;

a low-pass filter 9214, which is connected to the demodulator 9213, removing the high frequency noise of the amplitude signal of the in-phase differential angle rate signal to form the angular rate signal output to the angular increment and velocity increment producer 6.

Referring to FIGS. 17 to 19, the acceleration producer 10 of the preferred embodiment of the present invention comprises:

a X axis accelerometer 42, which is provided on the second circuit board 4 and connected with the angular increment and velocity increment producer 6 provided in the AISC chip 92 of the control circuit board 9;

a Y axis accelerometer 22, which is provided on the first circuit board 2 and connected with angular increment and velocity increment producer 6 provided in the AISC chip 92 of the control circuit board 9; and a Z axis accelerometer 72, which is provided on the third circuit board 7 and connected with angular increment and velocity increment producer 6 provided in the AISC chip 92 of the control circuit board 9.

Referring to FIGS. 2, 18 and FIG. 19, thermal sensing producer device 15 of the preferred embodiment of the present invention further comprises:

a first thermal sensing producing unit 24 for sensing the temperature of the X axis angular rate detecting unit 21 and the Y axis accelerometer 22;

a second thermal sensing producer 44 for sensing the temperature of the Y axis angular rate detecting unit 41 and the X axis accelerometer 42; and a third thermal sensing producer 74 for sensing the temperature of the Z axis angular rate detecting unit 71 and the Z axis accelerometer 72.

Referring to FIGS. 2 and 19, the heater device 20 of the preferred embodiment of the present invention further comprises:

a first heater 25, which is connected to the X axis angular rate detecting unit 21, the Y axis accelerometer 22, and the first front-end circuit 23, for maintaining the predetermined operational temperature of the X axis angular rate detecting unit 21, the Y axis accelerometer 22, and the first front-end circuit 23;

a second heater 45, which is connected to the Y axis angular rate detecting unit 41, the X axis accelerometer 42, and the second front-end circuit 43, for maintaining the predetermined operational temperature of the X axis angular rate detecting unit 41, the X axis accelerometer 42, and the second front-end circuit 43; and a third heater 75, which is connected to the Z axis angular rate detecting unit 71, the Z axis accelerometer 72, and the third front-end circuit 73, for maintaining the predetermined operational temperature of the Z axis angular rate detecting unit 71, the Z axis accelerometer 72, and the third front-end circuit 73.

Referred to FIGS. 2, 18, 19, 21, and 25, the thermal processor 30 of the preferred embodiment of the present invention further comprises three identical thermal control circuitries 923 and the thermal control computation modules 911 running the DSP chipset 91.

Figure 25:
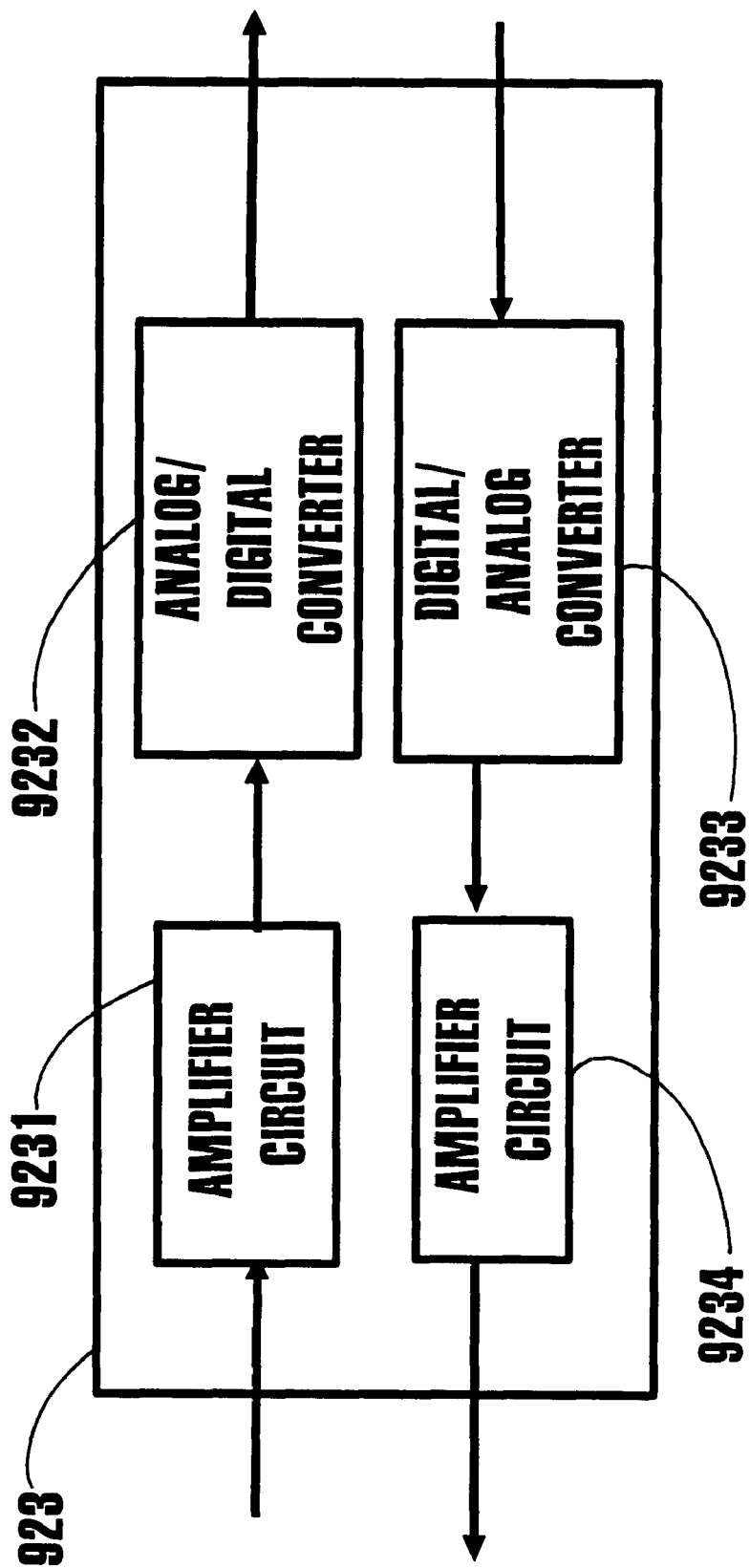
FIG. 25 is a block diagram of the thermal control circuit of the ASIC chip in the third circuit board of the micro IMU according to the above preferred embodiment of the present invention.

As shown in FIGS. 19 and 25, each of the thermal control circuitries 923 further comprises:

a first amplifier circuit 9231, which is connected with the respective X axis, Y axis or Z axis thermal sensing producer 24, 44, 74, for amplifying the signals and suppressing the noise residing in the temperature voltage signals from the respective X axis, Y axis or Z axis thermal sensing producer 24, 44, 74 and improving the signal-to-noise ratio;

an analog/digital converter 9232, which is connected with the amplifier circuit 9231, for sampling the temperature voltage signals and digitizing the sampled temperature voltage signals to digital signals, which are output to the thermal control computation module 911;

a digital/analog converter 9233 which converts the digital temperature commands input from the thermal control computation module 911 into analog signals; and a second amplifier circuit 9234, which receives the analog signals from the digital/analog converter 9233, amplifying the input analog signals from the digital/analog converter 9233 for driving the respective first, second or third heater 25, 45, 75; and closing the temperature controlling loop.

The thermal control computation module 911 computes digital temperature commands using the digital temperature voltage signals from the analog/digital converter 9232, the temperature sensor scale factor, and the pre-determined operating temperature of the angular rate producer and acceleration producer, wherein the digital temperature commands are connected to the digital/analog converter 9233.

In order to achieve a high degree of full functional performance for the micro IMU, a specific package of the first circuit board 2, the second circuit board 4, the third circuit board 7, and the control circuit board 9 of the preferred embodiment of the present invention is provided and disclosed as follows:

In the preferred embodiment of the present invention, as shown in FIGS. 17, 18, and 19, the third circuit board 7 is bonded to a supporting structure by means of a conductive epoxy, and the first circuit board 2, the second circuit board 4, and the control circuit board 9 are arranged parallelly to bond to the third circuit board 7 perpendicularly by a non conductive epoxy.

In other words, the first circuit board 2, the second circuit board 4, and the control circuit board 9 are soldered to the third circuit board 7 in such a way as to use the third circuit board 7 as an interconnect board, thereby avoiding the necessity to provide interconnect wiring, so as to minimize the small size.

The first, second, third, and control circuit boards 2, 4, 7, and 9 are constructed using ground planes which are brought out to the perimeter of each circuit board 2, 4, 7, 9, so that the conductive epoxy can form a continuous ground plane with the supporting structure. In this way the electrical noise levels are minimized and the thermal gradients are reduced. Moreover, the bonding process also reduces the change in misalignments due to structural bending caused by acceleration of the IMU.

What is claimed is:

1. A micro inertial measurement unit, comprising:

an angular rate producer for producing X axis, Y axis and Z axis angular rate electrical signals;

an acceleration producer for producing X axis, Y axis and Z axis acceleration electrical signals;

an angular increment and velocity increment producer for converting said X axis, Y axis and Z axis angular rate electrical signals into digital angular increments and converting said input X axis, Y axis and Z axis acceleration electrical signals into digital velocity increments; and a thermal controlling means comprising a thermal sensing producer device, a heater device and a thermal processor for maintaining a predetermined operating temperature of said angular rate producer, said acceleration producer and said angular increment and velocity increment producer, wherein said thermal sensing producer device, which produces temperature signals, is processed in parallel with said angular rate producer and said acceleration producer for maintaining a predetermined operating temperature of said angular rate producer and said acceleration producer and angular increment and velocity increment producer, wherein said predetermined operating temperature is a constant designated temperature selected between 150° F. and 185° F., wherein said temperature signals produced from said thermal sensing producer device are input to said thermal processor for computing temperature control commands using said temperature signals, a temperature scale factor, and a predetermined operating temperature of said angular rate producer and said acceleration producer, and produce driving signals to said heater device using said temperature control commands for controlling said heater device to provide adequate heat for maintaining said predetermined operating temperature in said micro inertial measurement unit.

2. A micro inertial measurement unit, as recited in claim 1, wherein said X axis, Y axis and Z axis angular rate electrical signals produced from said angular producer are analog angular rate voltage signals directly proportional to angular rates of a carrier carrying said micro inertial measurement unit, and said X axis, Y axis and Z axis acceleration electrical signals produced from said acceleration producer are analog acceleration voltage signals directly proportional to accelerations of said vehicle.

3. A micro inertial measurement unit, as recited in claim 2, wherein said angular increment and velocity increment producer comprises:

an angular integrating means and an acceleration integrating means, which are adapted for respectively integrating said X axis, Y axis and Z axis analog angular rate voltage signals and said X axis, Y axis and Z axis analog acceleration voltage signals for a predetermined time interval to accumulate said X axis, Y axis and Z axis analog angular rate voltage signals and said X axis, Y axis and Z axis analog acceleration voltage signals as a raw X axis, Y axis and Z axis angular increment and a raw X axis, Y axis and Z axis velocity increment for a predetermined time interval to achieve accumulated angular increments and accumulated velocity increments, wherein said integration is performed to remove noise signals that are non-directly proportional to said carrier angular rate and acceleration within said X axis, Y axis and Z axis analog angular rate voltage signals and said X axis, Y axis and Z axis analog acceleration voltage signals, to improve signal-to-noise ratio, and to remove said high frequency signals in said X axis, Y axis and Z axis analog angular rate voltage signals and said X axis, Y axis and Z axis analog acceleration voltage signals;

a resetting means which forms an angular reset voltage pulse and a velocity reset voltage pulse as an angular scale and a velocity scale which are input into said angular integrating means and said acceleration integrating means respectively; and an angular increment and velocity increment measurement means which is adapted for measuring said voltage values of said X axis, Y axis and Z axis accumulated angular increments and said X axis, Y axis and Z axis accumulated velocity increments with said angular reset voltage pulse and said velocity reset voltage pulse respectively to acquire angular increment counts and velocity increment counts as a digital form of angular increment and velocity increment measurements respectively.

4. A micro inertial measurement unit, as recited in claim 3, wherein said angular increment and velocity increment measurement means also scales said voltage values of said X axis, Y axis and Z axis accumulated angular and velocity increments into real X axis, Y axis and Z axis angular and velocity increment voltage values, wherein in said angular integrating means and said accelerating integrating means, said X axis, Y axis and Z axis analog angular voltage signals and said X axis, Y axis and Z axis analog acceleration voltage signals are each reset to accumulate from a zero value at an initial point of every said predetermined time interval.

5. A micro inertial measurement unit, as recited in claim 4, wherein said resetting means comprises an oscillator, wherein said angular reset voltage pulse and said velocity reset voltage pulse are implemented by producing a timing pulse by said oscillator.

6. A micro inertial measurement unit, as recited in claim 5, wherein said angular increment and velocity increment measurement means, which is adapted for measuring said voltage values of said X axis, Y axis and Z axis accumulated angular and velocity increments, comprises an analog/digital converter to substantially digitize said raw X axis, Y axis and Z axis angular increment and velocity increment voltage values into digital X axis, Y axis and Z axis angular increment and velocity increments.

7. A micro inertial measurement unit, as recited in one of claims 3 to 5, said angular increment and velocity increment producer further comprises an angular amplifying circuit for amplifying said X axis, Y axis and Z axis analog angular rate voltage signals to form amplified X axis, Y axis and Z axis analog angular rate signals and an acceleration amplifying circuit for amplifying said X axis, Y axis and Z axis analog acceleration voltage signals to form amplified X axis, Y axis and Z axis analog acceleration signals.

8. A micro inertial measurement unit, as recited in claim 7, wherein said angular integrating means of said angular increment and velocity increment producer comprises an angular integrator circuit for receiving said amplified X axis, Y axis and Z axis analog angular rate signals from said angular amplifier circuit and integrating to form said accumulated angular increments, and said acceleration integrating means of said angular increment and velocity increment producer comprises an acceleration integrator circuit for receiving said amplified X axis, Y axis and Z axis analog acceleration signals from said acceleration amplifier circuit and integrating to form said accumulated velocity increments.

9. A micro inertial measurement unit, as recited in claim 3, wherein said resetting means comprises an oscillator, wherein said angular reset voltage pulse and said velocity reset voltage pulse are implemented by producing a timing pulse by said oscillator.

10. A micro inertial measurement unit, as recited in claim 9, wherein said angular increment and velocity increment measurement means, which is adapted for measuring said voltage values of said X axis, Y axis and Z axis accumulated angular and velocity increments, comprises an analog/digital converter to substantially digitize said raw X axis, Y axis and Z axis angular increment and velocity increment voltage values into digital X axis, Y axis and Z axis angular increment and velocity increments.

11. A micro inertial measurement unit, as recited in claim 10 or 6, said angular increment and velocity increment producer further comprises an angular amplifying circuit for amplifying said X axis, Y axis and Z axis analog angular rate voltage signals to form amplified X axis, Y axis and Z axis analog angular rate signals and an acceleration amplifying circuit for amplifying said X axis, Y axis and Z axis analog acceleration voltage signals to form amplified X axis, Y axis and Z axis analog acceleration signals.

12. A micro inertial measurement unit, as recited in claim 11, wherein said angular integrating means of said angular increment and velocity increment producer comprises an angular integrator circuit for receiving said amplified X axis, Y axis and Z axis analog angular rate signals from said angular amplifier circuit and integrating to form said accumulated angular increments, and said acceleration integrating means of said angular increment and velocity increment producer comprises an acceleration integrator circuit for receiving said amplified X axis, Y axis and Z axis analog acceleration signals from said acceleration amplifier circuit and integrating to form said accumulated velocity increments.

13. A micro inertial measurement unit, as recited in claim 12, wherein said analog/digital converter of said angular increment and velocity increment producer further includes an angular analog/digital converter, a velocity analog/digital converter and an input/output interface circuit, wherein said accumulated angular increments output from said angular integrator circuit and said accumulated velocity increments output from said acceleration integrator circuit are input into said angular analog/digital converter and said velocity analog/digital converter respectively, wherein said accumulated angular increments is digitized by said angular analog/digital converter by measuring said accumulated angular increments with said angular reset voltage pulse to form a digital angular measurements of voltage in terms of said angular increment counts which is output to said input/output interface circuit to generate digital X axis, Y axis and Z axis angular increment voltage values, wherein said accumulated velocity increments are digitized by said velocity analog/digital converter by measuring said accumulated velocity increments with said velocity reset voltage pulse to form digital velocity measurements of voltage in terms of said velocity increment counts which is output to said input/output interface circuit to generate digital X axis, Y axis and Z axis velocity increment voltage values.

14. A micro inertial measurement unit, as recited in one of claims 1 to 6, wherein said thermal processor comprises an analog/digital converter connected to said thermal sensing producer device, a digital/analog converter connected to said heater device, and a temperature controller connected with both said analog/digital converter and said digital/analog converter, wherein said analog/digital converter inputs said temperature voltage signals produced by said thermal sensing producer device, wherein said temperature voltage signals are sampled in said analog/digital converter to sampled temperature voltage signals which are further digitized to digital signals and output to said temperature controller which computes digital temperature commands using said input digital signals from said analog/digital converter, a temperature sensor scale factor, and a pre-determined operating temperature of said angular rate producer and acceleration producer, wherein said digital temperature commands are fed back to said digital/analog converter, wherein said digital/analog converter converts said digital temperature commands input from said temperature controller into analog signals which are output to said heater device to provide adequate heat for maintaining said predetermined operating temperature of said micro inertial measurement unit.

15. A micro inertial measurement unit, as recited in claim 14, wherein said thermal processor further comprises:

a first amplifier circuit between said thermal sensing producer device and said digital/analog converter, wherein said voltage signals from said thermal sensing producer device is first input into said first amplifier circuit for amplifying said signals and suppressing said noise residing in said voltage signals and improving said signal-to-noise ratio, wherein said amplified voltage signals are then output to said analog/digital converter; and a second amplifier circuit between said digital/analog converter and heater device for amplifying said input analog signals from said digital/analog converter for driving said heater device.

16. A micro inertial measurement unit, as recited in claim 15, said thermal processor further comprises an input/output interface circuit connected said analog/digital converter and digital/analog converter with said temperature controller, wherein said voltage signals are sampled in said analog/digital converter to form sampled voltage signals that are digitized into digital signals, and said digital signals are output to said input/output interface circuit, wherein said temperature controller is adapted to compute said digital temperature commands using said input digital temperature voltage signals from said input/output interface circuit, said temperature sensor scale factor, and said pre-determined operating temperature of said angular rate producer and acceleration producer, wherein said digital temperature commands are fed back to said input/output interface circuit, moreover said digital/analog converter further converts said digital temperature commands input from said input/output interface circuit into analog signals which are output to said heater device to provide adequate heat for maintaining said predetermined operating temperature of said micro inertial measurement unit.

17. A micro inertial measurement unit, comprising:

an angular rate producer for producing X axis, Y axis and Z axis angular rate electrical signals, wherein said X axis, Y axis and Z axis angular rate electrical signals produced from said angular producer are analog angular rate voltage signals directly proportional to angular rates of a carrier carrying said micro inertial measurement unit;

an acceleration producer for producing X axis, Y axis and Z axis acceleration electrical signals, wherein said X axis, Y axis and Z axis acceleration electrical signals produced from said acceleration producer are analog acceleration voltage signals directly proportional to accelerations of said vehicle; and an angular increment and velocity increment producer for converting said X axis, Y axis and Z axis angular rate electrical signals into digital angular increments and converting said input X axis, Y axis and Z axis acceleration electrical signals into digital velocity increments, wherein said angular increment and velocity increment producer comprises:

an angular integrating means and an acceleration integrating means, which are adapted for respectively integrating said X axis, Y axis and Z axis analog angular rate voltage signals and said X axis, Y axis and Z axis analog acceleration voltage signals for a predetermined time interval to accumulate said X axis, Y axis and Z axis analog angular rate voltage signals and said X axis, Y axis and Z axis analog acceleration voltage signals as a raw X axis, Y axis and Z axis angular increment and a raw X axis, Y axis and Z axis velocity increment for a predetermined time interval to achieve accumulated angular increments and accumulated velocity increments, wherein said integration is performed to remove noise signals that are non-directly proportional to said carrier angular rate and acceleration within said X axis, Y axis and Z axis analog angular rate voltage signals and said X axis, Y axis and Z axis analog acceleration voltage signals, to improve signal-to-noise ratio, and to remove said high frequency signals in said X axis, Y axis and Z axis analog angular rate voltage signals and said X axis, Y axis and Z axis analog acceleration voltage signals;

a resetting means which forms an angular reset voltage pulse and a velocity reset voltage pulse as an angular scale and a velocity scale which are input into said angular integrating means and said acceleration integrating means respectively; and an angular increment and velocity increment measurement means which is adapted for measuring said voltage values of said X axis, Y axis and Z axis accumulated angular increments and said X axis, Y axis and Z axis accumulated velocity increments with said angular reset voltage pulse and said velocity reset voltage pulse respectively to acquire angular increment counts and velocity increment counts as a digital form of angular increment and velocity increment measurements respectively.

18. A micro inertial measurement unit, as recited in claim 17, wherein said angular increment and velocity increment measurement means also scales said voltage values of said X axis, Y axis and Z axis accumulated angular and velocity increments into real X axis, Y axis and Z axis angular and velocity increment voltage values, wherein in said angular integrating means and said accelerating integrating means, said X axis, Y axis and Z axis analog angular voltage signals and said X axis, Y axis and Z axis analog acceleration voltage signals are each reset to accumulate from a zero value at an initial point of every said predetermined time interval.

19. A micro inertial measurement unit, as recited in claim 18, wherein said resetting means comprises an oscillator, wherein said angular reset voltage pulse and said velocity reset voltage pulse are implemented by producing a timing pulse by said oscillator.

20. A micro inertial measurement unit, as recited in claim 19, wherein said angular increment and velocity increment measurement means, which is adapted for measuring said voltage values of said X axis, Y axis and Z axis accumulated angular and velocity increments, comprises an analog/digital converter to substantially digitize said raw X axis, Y axis and Z axis angular increment and velocity increment voltage values into digital X axis, Y axis and Z axis angular increment and velocity increments.

21. A micro inertial measurement unit, as recited in claim 17, wherein said resetting means comprises an oscillator, wherein said angular reset voltage pulse and said velocity reset voltage pulse are implemented by producing a timing pulse by said oscillator.

22. A micro inertial measurement unit, as recited in claim 21, wherein said angular increment and velocity increment measurement means, which is adapted for measuring said voltage values of said X axis, Y axis and Z axis accumulated angular and velocity increments, comprises an analog/digital converter to substantially digitize said raw X axis, Y axis and Z axis angular increment and velocity increment voltage values into digital X axis, Y axis and Z axis angular increment and velocity increments.

23. A micro inertial measurement unit, as recited in claim 22 or 20, said angular increment and velocity increment producer further comprises an angular amplifying circuit for amplifying said X axis, Y axis and Z axis analog angular rate voltage signals to form amplified X axis, Y axis and Z axis analog angular rate signals and an acceleration amplifying circuit for amplifying said X axis, Y axis and Z axis analog acceleration voltage signals to form amplified X axis, Y axis and Z axis analog acceleration signals.

24. A micro inertial measurement unit, as recited in claim 23, wherein said angular integrating means of said angular increment and velocity increment producer comprises an angular integrator circuit for receiving said amplified X axis, Y axis and Z axis analog angular rate signals from said angular amplifier circuit and integrating to form said accumulated angular increments, and said acceleration integrating means of said angular increment and velocity increment producer comprises an acceleration integrator circuit for receiving said amplified X axis, Y axis and Z axis analog acceleration signals from said acceleration amplifier circuit and integrating to form said accumulated velocity increments.

25. A micro inertial measurement unit, as recited in claim 24, wherein said analog/digital converter of said angular increment and velocity increment producer further includes an angular analog/digital converter, a velocity analog/digital converter and an input/output interface circuit, wherein said accumulated angular increments output from said angular integrator circuit and said accumulated velocity increments output from said acceleration integrator circuit are input into said angular analog/digital converter and said velocity analog/digital converter respectively, wherein said accumulated angular increments is digitized by said angular analog/digital converter by measuring said accumulated angular increments with said angular reset voltage pulse to form a digital angular measurements of voltage in terms of said angular increment counts which is output to said input/output interface circuit to generate digital X axis, Y axis and Z axis angular increment voltage values, wherein said accumulated velocity increments are digitized by said velocity analog/digital converter by measuring said accumulated velocity increments with said velocity reset voltage pulse to form digital velocity measurements of voltage in terms of said velocity increment counts which is output to said input/output interface circuit to generate digital X axis, Y axis and Z axis velocity increment voltage values.

26. A micro inertial measurement unit, as recited in one of claims 17 to 19, said angular increment and velocity increment producer further comprises an angular amplifying circuit for amplifying said X axis, Y axis and Z axis analog angular rate voltage signals to form amplified X axis, Y axis and Z axis analog angular rate signals and an acceleration amplifying circuit for amplifying said X axis, Y axis and Z axis analog acceleration voltage signals to form amplified X axis, Y axis and Z axis analog acceleration signals.

27. A micro inertial measurement unit, as recited in claim 26, wherein said angular integrating means of said angular increment and velocity increment producer comprises an angular integrator circuit for receiving said amplified X axis, Y axis and Z axis analog angular rate signals from said angular amplifier circuit and integrating to form said accumulated angular increments, and said acceleration integrating means of said angular increment and velocity increment producer comprises an acceleration integrator circuit for receiving said amplified X axis, Y axis and Z axis analog acceleration signals from said acceleration amplifier circuit and integrating to form said accumulated velocity increments.

28. A micro inertial measurement unit, comprising:

an angular rate producer for producing X axis, Y axis and Z axis angular rate electrical signals, wherein said X axis, Y axis and Z axis angular rate electrical signals produced from said angular producer are analog angular rate voltage signals directly proportional to angular rates of a carrier carrying said micro inertial measurement unit;

an acceleration producer for producing X axis, Y axis and Z axis acceleration electrical signals, wherein said X axis, Y axis and Z axis acceleration electrical signals produced from said acceleration producer are analog acceleration voltage signals directly proportional to accelerations of said vehicle;

an angular increment and velocity increment producer for converting said X axis, Y axis and Z axis angular rate electrical signals into digital angular increments and converting said input X axis, Y axis and Z axis acceleration electrical signals into digital velocity increments, wherein said angular increment and velocity increment producer comprises:

an angular integrating means and an acceleration integrating means, which are adapted for respectively integrating said X axis, Y axis and Z axis analog angular rate voltage signals and said X axis, Y axis and Z axis analog acceleration voltage signals for a predetermined time interval to accumulate said X axis, Y axis and Z axis analog angular rate voltage signals and said X axis, Y axis and Z axis analog acceleration voltage signals as a raw X axis, Y axis and Z axis angular increment and a raw X axis, Y axis and Z axis velocity increment for a predetermined time interval to achieve accumulated angular increments and accumulated velocity increments, wherein said integration is performed to remove noise signals that are non-directly proportional to said carrier angular rate and acceleration within said X axis, Y axis and Z axis analog angular rate voltage signals and said X axis, Y axis and Z axis analog acceleration voltage signals, to improve signal-to-noise ratio, and to remove said high frequency signals in said X axis, Y axis and Z axis analog angular rate voltage signals and said X axis, Y axis and Z axis analog acceleration voltage signals;

a resetting means which forms an angular reset voltage pulse and a velocity reset voltage pulse as an angular scale and a velocity scale which are input into said angular integrating means and said acceleration integrating means respectively; and an angular increment and velocity increment measurement means which is adapted for measuring said voltage values of said X axis, Y axis and Z axis accumulated angular increments and said X axis, Y axis and Z axis accumulated velocity increments with said angular reset voltage pulse and said velocity reset voltage pulse respectively to acquire angular increment counts and velocity increment counts as a digital form of angular increment and velocity increment measurements respectively; and a thermal controlling means for maintaining a predetermined operating temperature of said angular rate producer, said acceleration producer and said angular increment and velocity increment producer.

29. A micro inertial measurement unit, as recited in claim 28, wherein said angular increment and velocity increment measurement means also scales said voltage values of said X axis, Y axis and Z axis accumulated angular and velocity increments into real X axis, Y axis and Z axis angular and velocity increment voltage values, wherein in said angular integrating means and said accelerating integrating means, said X axis, Y axis and Z axis analog angular voltage signals and said X axis, Y axis and Z axis analog acceleration voltage signals are each reset to accumulate from a zero value at an initial point of every said predetermined time interval.

30. A micro inertial measurement unit, as recited in claim 29, wherein said resetting means comprises an oscillator, wherein said angular reset voltage pulse and said velocity reset voltage pulse are implemented by producing a timing pulse by said oscillator.

31. A micro inertial measurement unit, as recited in claim 30, wherein said angular increment and velocity increment measurement means, which is adapted for measuring said voltage values of said X axis, Y axis and Z axis accumulated angular and velocity increments, comprises an analog/digital converter to substantially digitize said raw X axis, Y axis and Z axis angular increment and velocity increment voltage values into digital X axis, Y axis and Z axis angular increment and velocity increments.

32. A micro inertial measurement unit, as recited in claim 31, said angular increment and velocity increment producer further comprises an angular amplifying circuit for amplifying said X axis, Y axis and Z axis analog angular rate voltage signals to form amplified X axis, Y axis and Z axis analog angular rate signals and an acceleration amplifying circuit for amplifying said X axis, Y axis and Z axis analog acceleration voltage signals to form amplified X axis, Y axis and Z axis analog acceleration signals.

33. A micro inertial measurement unit, as recited in claim 32, wherein said angular integrating means of said angular increment and velocity increment producer comprises an angular integrator circuit for receiving said amplified X axis, Y axis and Z axis analog angular rate signals from said angular amplifier circuit and integrating to form said accumulated angular increments, and said acceleration integrating means of said angular increment and velocity increment producer comprises an acceleration integrator circuit for receiving said amplified X axis, Y axis and Z axis analog acceleration signals from said acceleration amplifier circuit and integrating to form said accumulated velocity increments.

34. A micro inertial measurement unit, as recited in claim 33, wherein said analog/digital converter of said angular increment and velocity increment producer further includes an angular analog/digital converter, a velocity analog/digital converter and an input/output interface circuit, wherein said accumulated angular increments output from said angular integrator circuit and said accumulated velocity increments output from said acceleration integrator circuit are input into said angular analog/digital converter and said velocity analog/digital converter respectively, wherein said accumulated angular increments is digitized by said angular analog/digital converter by measuring said accumulated angular increments with said angular reset voltage pulse to form a digital angular measurements of voltage in terms of said angular increment counts which is output to said input/output interface circuit to generate digital X axis, Y axis and Z axis angular increment voltage values, wherein said accumulated velocity increments are digitized by said velocity analog/digital converter by measuring said accumulated velocity increments with said velocity reset voltage pulse to form digital velocity measurements of voltage in terms of said velocity increment counts which is output to said input/output interface circuit to generate digital X axis, Y axis and Z axis velocity increment voltage values.

35. A micro inertial measurement unit, as recited in claim 28, wherein said resetting means comprises an oscillator, wherein said angular reset voltage pulse and said velocity reset voltage pulse are implemented by producing a timing pulse by said oscillator.

36. A micro inertial measurement unit, as recited in claim 35, wherein said angular increment and velocity increment measurement means, which is adapted for measuring said voltage values of said X axis, Y axis and Z axis accumulated angular and velocity increments, comprises an analog/digital converter to substantially digitize said raw X axis, Y axis and Z axis angular increment and velocity increment voltage values into digital X axis, Y axis and Z axis angular increment and velocity increments.

37. A micro inertial measurement unit, as recited in one of claims 28 to 36, said angular increment and velocity increment producer further comprises an angular amplifying circuit for amplifying said X axis, Y axis and Z axis analog angular rate voltage signals to form amplified X axis, Y axis and Z axis analog angular rate signals and an acceleration amplifying circuit for amplifying said X axis, Y axis and Z axis analog acceleration voltage signals to form amplified X axis, Y axis and Z axis analog acceleration signals.

38. A micro inertial measurement unit, as recited in claim 37, wherein said angular integrating means of said angular increment and velocity increment producer comprises an angular integrator circuit for receiving said amplified X axis, Y axis and Z axis analog angular rate signals from said angular amplifier circuit and integrating to form said accumulated angular increments, and said acceleration integrating means of said angular increment and velocity increment producer comprises an acceleration integrator circuit for receiving said amplified X axis, Y axis and Z axis analog acceleration signals from said acceleration amplifier circuit and integrating to form said accumulated velocity increments.

39. A micro inertial measurement unit, comprising:
   an angular rate producer for producing X axis, Y axis and Z axis angular rate electrical signals;
   an acceleration producer for producing X axis, Y axis and Z axis acceleration electrical signals; and
   an angular increment and velocity increment producer for converting said X axis, Y axis and Z axis angular rate electrical signals into digital angular increments and converting said input X axis, Y axis and Z axis acceleration electrical signals into digital velocity increments;
   wherein said micro IMU further comprises a first circuit board, a second circuit board, a third circuit board, and a control circuit board arranged inside a case, said first circuit board being connected with said third circuit board for producing X axis angular sensing signal and Y axis acceleration sensing signal to said control circuit board, said second circuit board being connected with said third circuit board for producing Y axis angular sensing signal and X axis acceleration sensing signal to said control circuit board, said third circuit board being connected with said control circuit board for producing Z axis angular sensing signal and Z axis acceleration sensing signals to said control circuit board, wherein said control circuit board is connected with said first circuit board and then said second circuit board through said third circuit board for processing said X axis, Y axis and Z axis angular sensing signals and said X axis, Y axis and Z axis acceleration sensing signals from said first, second and control circuit board to produce digital angular increments and velocity increments, position, velocity, and attitude solution.

40. A micro inertial measurement unit, as recited in claim 39, wherein said angular producer comprises:

a X axis vibrating type angular rate detecting unit and a first front-end circuit connected on said first circuit board;

a Y axis vibrating type angular rate detecting unit and a second front-end circuit connected on said second circuit board;

a Z axis vibrating type angular rate detecting unit and a third front-end circuit connected on said third circuit board;

three angular signal loop circuitries which are provided on said control circuit board for said first, second and third circuit boards respectively;

three dither motion control circuitries which are provided on in said control circuit board for said first, second and third circuit boards respectively;

an oscillator adapted for providing reference pickoff signals for said X axis vibrating type angular rate detecting unit, said Y axis vibrating type angular rate detecting unit, said Z axis vibrating type angular rate detecting unit, said angle signal loop circuitry, and said dither motion control circuitry; and three dither motion processing modules provided on said control circuit board, for said first, second and third circuit boards respectively.

41. A micro inertial measurement unit, as recited in claim 40, wherein said third circuit board is bonded to a supporting structure by means of a conductive epoxy, and said first circuit board, said second circuit board, and said control circuit board are arranged parallelly to bond to said third circuit board perpendicularly by a non conductive epoxy, wherein said first circuit board, said second circuit board, and said control circuit board are soldered to said third circuit board in such a manner as to use said third circuit board as an interconnect board.

42. A micro inertial measurement unit, as recited in claim 40, wherein said acceleration producer comprises:

a X axis accelerometer, which is provided on said second circuit board and connected with said angular increment and velocity increment producer provided on said control circuit board;

a Y axis accelerometer, which is provided on said first circuit board and connected with said angular increment and velocity increment producer provided on said control circuit board; and a Z axis accelerometer, which is provided on said third circuit board and connected with said angular increment and velocity increment producer provided on said control circuit board.

43. A micro inertial measurement unit, as recited in claim 42, wherein said first, second and third front-end circuits are used to condition said output signal of said X axis, Y axis and Z axis vibrating type angular rate detecting units respectively and each further comprises:

a trans impedance amplifier circuit, which is connected to said respective X axis, Y axis or Z axis vibrating type angular rate detecting unit for changing said output impedance of said dither motion signals from a very high level, greater than 100 million ohms, to a low level, less than 100 ohms to achieve two dither displacement signals, which are A/C voltage signals representing said displacement between said inertial elements and said anchor combs, wherein said two dither displacement signals are output to said dither motion control circuitry; and a high-pass filter circuit, which is connected with said respective X axis, Y axis or Z axis vibrating type angular rate detecting unit for removing residual dither drive signals and noise from said dither displacement differential signal to form a filtered dither displacement differential signal to said angular signal loop circuitry.

44. A micro inertial measurement unit, as recited in claim 43, wherein each of said X axis, Y axis and Z axis angular rate detecting units is a vibratory device, which comprises at least one set of vibrating inertial elements, including tuning forks and associated supporting structures and means, including capacitive readout means, and uses Coriolis effects to detect angular rates of said carrier, wherein each of said X axis, Y axis and Z axis vibrating type angular rate detecting units receives dither drive signals from said respective dither motion control circuitry, keeping said inertial elements oscillating; and carrier reference oscillation signals from said oscillator, including capacitive pickoff excitation signals, wherein each of said X axis, Y axis and Z axis vibrating type angular rate detecting units detects said angular motion in X axis, Y axis and Z axis respectively of said carrier in accordance with said dynamic theory, wherein each of said X axis, Y axis and Z axis vibrating type angular rate detecting units outputs angular motion-induced signals, including rate displacement signals which may be modulated carrier reference oscillation signals to said trans Impedance amplifier circuit of said respective first, second or third front-end circuits; and inertial element dither motion signals thereof, including dither displacement signals, to said high-pass filter of said respective first, second or third front-end circuit.

45. A micro inertial measurement unit, as recited in claim 44, wherein said three dither motion control circuitries receive said inertial element dither motion signals from said X axis, Y axis and Z axis vibrating type angular rate detecting units respectively, reference pickoff signals from said oscillator, and produce digital inertial element displacement signals with known phase, wherein each said dither motion control circuitries comprises:

an amplifier and summer circuit connected to said trans impedance amplifier circuit of said respective first, second or third front-end circuit for amplifying said two dither displacement signals for more than ten times and enhancing said sensitivity for combining said two dither displacement signals to achieve a dither displacement differential signal by subtracting a center anchor comb signal with a side anchor comb signal;

a high-pass filter circuit connected to said amplifier and summer circuit for removing residual dither drive signals and noise from said dither displacement differential signal to form a filtered dither displacement differential signal;

a demodulator circuit connected to said high-pass filter circuit for receiving said capacitive pickoff excitation signals as phase reference signals from said oscillator and said filtered dither displacement differential signal from said high-pass filter and extracting said in-phase portion of said filtered dither displacement differential signal to produce an inertial element displacement signal with known phase;

a low-pass filter connected to said demodulator circuit for removing high frequency noise from said inertial element displacement signal input thereto to form a low frequency inertial element displacement signal;

an analog/digital converter connected to said low-pass filter for converting said low frequency inertial element displacement signal that is an analog signal to produce a digitized low frequency inertial element displacement signal to said respective dither motion processing module;

a digital/analog converter processing said selected amplitude from said respective dither motion processing module to form a dither drive signal with correct amplitude; and an amplifier which generates and amplifies said dither drive signal to said respective X axis, Y axis or Z axis vibrating type angular rate detecting unit based on said dither drive signal with said selected frequency and correct amplitude.

46. A micro inertial measurement unit, as recited in claim 45, wherein said oscillation of said inertial elements residing inside each of said X axis, Y axis and Z axis vibrating type angular rate detecting units is generally driven by a high frequency sinusoidal signal with precise amplitude, wherein each of said dither motion processing module receives digital inertial element displacement signals with known phase from said analog/digital converter of said dither motion control circuitry for finding said frequencies which have highest Quality Factor (Q) Values, locking said frequency, and locking said amplitude to produce a dither drive signal, including high frequency sinusoidal signals with a precise amplitude, to said respective X axis, Y axis or Z axis vibrating type angular rate detecting unit to keep said inertial elements oscillating at said pre-determined resonant frequency.

47. A micro inertial measurement unit, as recited in claim 46, wherein said dither motion processing module further includes a discrete Fast Fourier Transform (FFT) module, a memory array of frequency and amplitude data module, a maxima detection logic module, and a Q analysis and selection logic module to find said frequencies which have highest Quality Factor (Q) Values;

wherein said discrete Fast Fourier Transform (FFT) module is arranged for transforming said digitized low frequency inertial element displacement signal from said analog/digital converter of said dither motion control circuitry to form amplitude data with said frequency spectrum of said input inertial element displacement signal;

wherein said memory array of frequency and amplitude data module receives said amplitude data with frequency spectrum to form an array of amplitude data with frequency spectrum;

wherein said maxima detection logic module is adapted for partitioning said frequency spectrum from said array of said amplitude data with frequency into plural spectrum segments, and choosing said frequencies with said largest amplitudes in said local segments of said frequency spectrum; and wherein said Q analysis and selection logic module is adapted for performing Q analysis on said chosen frequencies to select frequency and amplitude by computing said ratio of amplitude/bandwidth, wherein a range for computing bandwidth is between +−1/2 of said peek for each maximum frequency point.

48. A micro inertial measurement unit, as recited in claim 47, wherein said dither motion processing module further includes a phase-lock loop to reject noise of said selected frequency to form a dither drive signal with said selected frequency by, which serves as a very narrow bandpass filter, locking said frequency;

wherein said angle signal loop circuitries receive said angular motion-induced signals from said X axis, Y axis and Z axis vibrating type angular rate detecting units respectively, reference pickoff signals from said oscillator, and transform said angular motion-induced signals into angular rate signals, wherein each of said angle signal loop circuitries for said respective first, second or third circuit board comprises:

a voltage amplifier circuit, which amplifies said filtered angular motion-induced signals from said high-pass filter circuit of said respective first, second or third front-end circuit to an extent of at least 100 milivolts to form amplified angular motion-induced signals;

an amplifier and summer circuit, which subtracts said difference between said angle rates of said amplified angular motion-induced signals to produce a differential angle rate signal;

a demodulator, which is connected to said amplifier and summer circuit, extracting said amplitude of said in-phase differential angle rate signal from said differential angle rate signal and said capacitive pickoff excitation signals from said oscillator;

a low-pass filter, which is connected to said demodulator, removing said high frequency noise of said amplitude signal of said in-phase differential angle rate signal to form said angular rate signal output to said angular increment and velocity increment producer.

49. A micro inertial measurement unit, as recited in claim 39, wherein said acceleration producer comprises:

a X axis accelerometer, which is provided on said second circuit board and connected with said angular increment and velocity increment producer provided on said control circuit board;

a Y axis accelerometer, which is provided on said first circuit board and connected with said angular increment and velocity increment producer provided on said control circuit board; and a Z axis accelerometer, which is provided on said third circuit board and connected with said angular increment and velocity increment producer provided on said control circuit board.

50. A micro inertial measurement unit, as recited in claim 49, wherein said first, second and third front-end circuits are used to condition said output signal of said X axis, Y axis and Z axis vibrating type angular rate detecting units respectively and each further comprises:

a trans impedance amplifier circuit, which is connected to said respective X axis, Y axis or Z axis vibrating type angular rate detecting unit for changing said output impedance of said dither motion signals from a very high level, greater than 100 million ohms, to a low level, less than 100 ohms to achieve two dither displacement signals, which are A/C voltage signals representing said displacement between said inertial elements and said anchor combs, wherein said two dither displacement signals are output to said dither motion control circuitry; and a high-pass filter circuit, which is connected with said respective X axis, Y axis or Z axis vibrating type angular rate detecting unit for removing residual dither drive signals and noise from said dither displacement differential signal to form a filtered dither displacement differential signal to said angular signal loop circuitry.

51. A micro inertial measurement unit, as recited in claim 50, wherein each of said X axis, Y axis and Z axis angular rate detecting units is a vibratory device, which comprises at least one set of vibrating inertial elements, including tuning forks, and associated supporting structures and means, including capacitive readout means, and uses Coriolis effects to detect angular rates of said carrier, wherein each of said X axis, Y axis and Z axis vibrating type angular rate detecting units receives dither drive signals from said respective dither motion control circuitry, keeping said inertial elements oscillating; and carrier reference oscillation signals from said oscillator, including capacitive pickoff excitation signals, wherein each of said X axis, Y axis and Z axis vibrating type angular rate detecting units detects said angular motion in X axis, Y axis and Z axis respectively of said carrier in accordance with said dynamic theory, wherein each of said X axis, Y axis and Z axis vibrating type angular rate detecting units outputs angular motion-induced signals, including rate displacement signals which may be modulated carrier reference oscillation signals to said trans Impedance amplifier circuit of said respective first, second or third front-end circuits; and inertial element dither motion signals thereof, including dither displacement signals, to said high-pass filter of said respective first, second or third front-end circuit.

52. A micro inertial measurement unit, as recited in claim 51, wherein said three dither motion control circuitries receive said inertial element dither motion signals from said X axis, Y axis and Z axis vibrating type angular rate detecting units respectively, reference pickoff signals from said oscillator, and produce digital inertial element displacement signals with known phase, wherein each said dither motion control circuitries comprises:

an amplifier and summer circuit connected to said trans impedance amplifier circuit of said respective first, second or third front-end circuit for amplifying said two dither displacement signals for more than ten times and enhancing said sensitivity for combining said two dither displacement signals to achieve a dither displacement differential signal by subtracting a center anchor comb signal with a side anchor comb signal;

a high-pass filter circuit connected to said amplifier and summer circuit for removing residual dither drive signals and noise from said dither displacement differential signal to form a filtered dither displacement differential signal;

a demodulator circuit connected to said high-pass filter circuit for receiving said capacitive pickoff excitation signals as phase reference signals from said oscillator and said filtered dither displacement differential signal from said high-pass filter and extracting said in-phase portion of said filtered dither displacement differential signal to produce an inertial element displacement signal with known phase;

a low-pass filter connected to said demodulator circuit for removing high frequency noise from said inertial element displacement signal input thereto to form a low frequency inertial element displacement signal;

an analog/digital converter connected to said low-pass filter for converting said low frequency inertial element displacement signal that is an analog signal to produce a digitized low frequency inertial element displacement signal to said respective dither motion processing module;

a digital/analog converter processing said selected amplitude from said respective dither motion processing module to form a dither drive signal with correct amplitude; and an amplifier which generates and amplifies said dither drive signal to said respective X axis, Y axis or Z axis vibrating type angular rate detecting unit based on said dither drive signal with said selected frequency and correct amplitude.

53. A micro inertial measurement unit, as recited in claim 52, wherein said oscillation of said inertial elements residing inside each of said X axis, Y axis and Z axis vibrating type angular rate detecting units is generally driven by a high frequency sinusoidal signal with precise amplitude, wherein each of said dither motion processing module receives digital inertial element displacement signals with known phase from said analog/digital converter of said dither motion control circuitry for finding said frequencies which have highest Quality Factor (Q) Values, locking said frequency, and locking said amplitude to produce a dither drive signal, including high frequency sinusoidal signals with a precise amplitude, to said respective X axis, Y axis or Z axis vibrating type angular rate detecting unit to keep said inertial elements oscillating at said pre-determined resonant frequency.

54. A micro inertial measurement unit, as recited in claim 53, wherein said dither motion processing module further includes a discrete Fast Fourier Transform (FFT) module, a memory array of frequency and amplitude data module, a maxima detection logic module, and a Q analysis and selection logic module to find said frequencies which have highest Quality Factor (Q) Values;

wherein said discrete Fast Fourier Transform (FFT) module is arranged for transforming said digitized low frequency inertial element displacement signal from said analog/digital converter of said dither motion control circuitry to form amplitude data with said frequency spectrum of said input inertial element displacement signal;

wherein said memory array of frequency and amplitude data module receives said amplitude data with frequency spectrum to form an array of amplitude data with frequency spectrum;

wherein said maxima detection logic module is adapted for partitioning said frequency spectrum from said array of said amplitude data with frequency into plural spectrum segments, and choosing said frequencies with said largest amplitudes in said local segments of said frequency spectrum; and wherein said Q analysis and selection logic module is adapted for performing Q analysis on said chosen frequencies to select frequency and amplitude by computing said ratio of amplitude/bandwidth, wherein a range for computing bandwidth is between +−1/2 of said peek for each maximum frequency point.

55. A micro inertial measurement unit, as recited in claim 54 or 47, wherein a position and attitude processor is adapted to further connect with said micro inertial measurement unit for computing position, attitude and heading angle measurements using said X axis, Y axis and Z axis digital angular increments and X axis, Y axis and Z axis velocity increments, wherein said thermal controlling means comprises a thermal sensing producer and an analog/digital converter connected to said thermal sensing producer device to receive said analog voltage output from said thermal sensing producer device, wherein said position, attitude, and heading processor is adapted for accessing temperature characteristic parameters of said angular rate producer and said acceleration producer using a current temperature of said angular rate producer and said acceleration producer from said temperature digitizer, and compensating said errors induced by thermal effects in said input digital angular and velocity increments and computing attitude and heading angle measurements using said X axis, Y axis and Z axis digital angular increments and X axis, Y axis and Z axis velocity increments in said attitude and heading processor.

56. A micro inertial measurement unit, as recited in claim 55, wherein said thermal controlling means further comprises an additional amplifier circuit connected between said thermal sensing producer device and said digital/analog converter for amplifying said analog voltage signals and suppressing said noise residing in said voltage signals and improving said voltage signal-to-noise ratio, wherein said amplified voltage signals are output to said analog/digital converter and sampled to form sampled voltage signals that are further digitized in said analog/digital converters to form digital signals outputting to said attitude and heading processor.

57. A micro inertial measurement unit, as recited in claim 56, wherein an input/output interface circuit is connected between said analog/digital converter and said attitude and heading processor, wherein said input amplified voltage signals are sampled to form sampled voltage signals that are further digitized in said analog/digital converters to form digital signals outputting to said input/output interface circuit before inputting into said attitude and heading processor.

58. A micro inertial measurement unit, as recited in claim 54, wherein said dither motion processing module further includes a phase-lock loop to reject noise of said selected frequency to form a dither drive signal with said selected frequency by, which serves as a very narrow bandpass filter, locking said frequency;

wherein said angle signal loop circuitries receive said angular motion-induced signals from said X axis, Y axis and Z axis vibrating type angular rate detecting units respectively, reference pickoff signals from said oscillator, and transform said angular motion-induced signals into angular rate signals, wherein each of said angle signal loop circuitries for said respective first, second or third circuit board comprises:

a voltage amplifier circuit, which amplifies said filtered angular motion-induced signals from said high-pass filter circuit of said respective first, second or third front-end circuit to an extent of at least 100 milivolts to form amplified angular motion-induced signals;

an amplifier and summer circuit, which subtracts said difference between said angle rates of said amplified angular motion-induced signals to produce a differential angle rate signal;

a demodulator, which is connected to said amplifier and summer circuit, extracting said amplitude of said in-phase differential angle rate signal from said differential angle rate signal and said capacitive pickoff excitation signals from said oscillator;

a low-pass filter, which is connected to said demodulator, removing said high frequency noise of said amplitude signal of said in-phase differential angle rate signal to form said angular rate signal output to said angular increment and velocity increment producer.

59. A micro inertial measurement unit, as recited in one of claims 49, 42, 58, and 48, further comprising a thermal controlling means for maintaining a predetermined operating temperature of said angular rate producer, said acceleration producer and said angular increment and velocity increment producer, wherein said thermal controlling means comprises:

a thermal sensing producer device, comprising:

a first thermal sensing producing unit for sensing said temperature of said X axis angular rate detecting unit and said Y axis accelerometer, a second thermal sensing producer for sensing said temperature of said Y axis angular rate detecting unit and said X axis accelerometer, and a third thermal sensing producer for sensing said temperature of said Z axis angular rate detecting unit and said Z axis accelerometer;

a heater device, comprising:

a first heater, which is connected with said X axis angular rate detecting unit, said Y axis accelerometer, and said first front-end circuit, for maintaining said predetermined operational temperature of said X axis angular rate detecting unit, said Y axis accelerometer, and said first front-end circuit, a second heater, which is connected with said Y axis angular rate detecting unit, said X axis accelerometer, and said second front-end circuit, for maintaining said predetermined operational temperature of said X axis angular rate detecting unit, said X axis accelerometer, and said second front-end circuit, and a third heater, which is connected with said Z axis angular rate detecting unit, said Z axis accelerometer, and said third front-end circuit, for maintaining said predetermined operational temperature of said Z axis angular rate detecting unit, said Z axis accelerometer, and said third front-end circuit; and a thermal processor which comprises three identical thermal control circuitries and said thermal control computation module provided on said control circuit board, wherein each of said thermal control circuitries further comprises:

a first amplifier circuit, which is connected with said respective X axis, Y axis or Z axis thermal sensing producer, for amplifying said signals and suppressing said noise residing in said temperature voltage signals from said respective X axis, Y axis or Z axis thermal sensing producer and improving said signal-to-noise ratio, an analog/digital converter, which is connected with said amplifier circuit, for sampling said temperature voltage signals and digitizing said sampled temperature voltage signals to digital signals, which are output to said thermal control computation module, a digital/analog converter which converts said digital temperature commands input from said thermal control computation module into analog signals, and a second amplifier circuit, which receives said analog signals from said digital/analog converter, amplifying said input analog signals from said digital/analog converter for driving said respective first, second or third heater; and closing said temperature controlling loop, wherein said thermal control computation module computes digital temperature commands using said digital temperature voltage signals from said analog/digital converter, said temperature sensor scale factor, and said pre-determined operating temperature of said angular rate producer and acceleration producer, wherein said digital temperature commands are fed back to said digital/analog converter.

60. A micro inertial measurement unit, as recited in one of claims 49, 42, 58, and 48, further comprising a thermal controlling means for maintaining a predetermined operating temperature of said angular rate producer, said acceleration producer and said angular increment and velocity increment producer, wherein said thermal controlling means comprises a thermal sensing producer device, a heater device and a thermal processor, wherein said thermal sensing producer device, which produces temperature signals, is processed in parallel with said angular rate producer and said acceleration producer for maintaining a predetermined operating temperature of said angular rate producer and said acceleration producer and angular increment and velocity increment producer, wherein said predetermined operating temperature is a constant designated temperature selected between 150° F. and 185° F., wherein said temperature signals produced from said thermal sensing producer device are inputted to said thermal processor for computing temperature control commands using said temperature signals, a temperature scale factor, and a predetermined operating temperature of said angular rate producer and said acceleration producer, and produce driving signals to said heater device using said temperature control commands for controlling said heater device to provide adequate heat for maintaining said predetermined operating temperature in said micro inertial measurement unit.

61. A micro inertial measurement unit, as recited in one of claims 49, 42, 58, and 48, wherein said angular increment and velocity increment producer comprises:

an angular integrating means and an acceleration integrating means, which are adapted for respectively integrating said X axis, Y axis and Z axis analog angular rate voltage signals and said X axis, Y axis and Z axis analog acceleration voltage signals for a predetermined time interval to accumulate said X axis, Y axis and Z axis analog angular rate voltage signals and said X axis, Y axis and Z axis analog acceleration voltage signals as a raw X axis, Y axis and Z axis angular increment and a raw X axis, Y axis and Z axis velocity increment for a predetermined time interval to achieve accumulated angular increments and accumulated velocity increments, wherein said integration is performed to remove noise signals that are non-directly proportional to said carrier angular rate and acceleration within said X axis, Y axis and Z axis analog angular rate voltage signals and said X axis, Y axis and Z axis analog acceleration voltage signals, to improve signal-to-noise ratio, and to remove said high frequency signals in said X axis, Y axis and Z axis analog angular rate voltage signals and said X axis, Y axis and Z axis analog acceleration voltage signals;

a resetting means which forms an angular reset voltage pulse and a velocity reset voltage pulse as an angular scale and a velocity scale which are input into said angular integrating means and said acceleration integrating means respectively; and an angular increment and velocity increment measurement means which is adapted for measuring said voltage values of said X axis, Y axis and Z axis accumulated angular increments and said X axis, Y axis and Z axis accumulated velocity increments with said angular reset voltage pulse and said velocity reset voltage pulse respectively to acquire angular increment counts and velocity increment counts as a digital form of angular increment and velocity increment measurements respectively.

62. A micro inertial measurement unit, as recited in claim 61, wherein said angular increment and velocity increment measurement means also scales said voltage values of said X axis, Y axis and Z axis accumulated angular and velocity increments into real X axis, Y axis and Z axis angular and velocity increment voltage values, wherein in said angular integrating means and said accelerating integrating means, said X axis, Y axis and Z axis analog angular voltage signals and said X axis, Y axis and Z axis analog acceleration voltage signals are each reset to accumulate from a zero value at an initial point of every said predetermined time interval.

63. A micro inertial measurement unit, as recited in claim 62, wherein said resetting means comprises an oscillator, wherein said angular reset voltage pulse and said velocity reset voltage pulse are implemented by producing a timing pulse by said oscillator.

64. A micro inertial measurement unit, as recited in claims 62, said angular increment and velocity increment producer further comprises an angular amplifying circuit for amplifying said X axis, Y axis and Z axis analog angular rate voltage signals to form amplified X axis, Y axis and Z axis analog angular rate signals and an acceleration amplifying circuit for amplifying said X axis, Y axis and Z axis analog acceleration voltage signals to form amplified X axis, Y axis and Z axis analog acceleration signals.

65. A micro inertial measurement unit, as recited in claim 64, wherein said angular increment and velocity increment measurement means, which is adapted for measuring said voltage values of said X axis, Y axis and Z axis accumulated angular and velocity increments, comprises an analog/digital converter to substantially digitize said raw X axis, Y axis and Z axis angular increment and velocity increment voltage values into digital X axis, Y axis and Z axis angular increment and velocity increments.

66. A micro inertial measurement unit, as recited in claim 65, wherein said analog/digital converter of said angular increment and velocity increment producer further includes an angular analog/digital converter, a velocity analog/digital converter and an input/output interface circuit, wherein said accumulated angular increments output from said angular integrator circuit and said accumulated velocity increments output from said acceleration integrator circuit are input into said angular analog/digital converter and said velocity analog/digital converter respectively, wherein said accumulated angular increments is digitized by said angular analog/digital converter by measuring said accumulated angular increments with said angular reset voltage pulse to form a digital angular measurements of voltage in terms of said angular increment counts which is output to said input/output interface circuit to generate digital X axis, Y axis and Z axis angular increment voltage values, wherein said accumulated velocity increments are digitized by said velocity analog/digital converter by measuring said accumulated velocity increments with said velocity reset voltage pulse to form digital velocity measurements of voltage in terms of said velocity increment counts which is output to said input/output interface circuit to generate digital X axis, Y axis and Z axis velocity increment voltage values.

67. A micro inertial measurement unit, as recited in claim 66, further comprising a thermal controlling means for maintaining a predetermined operating temperature of said angular rate producer, said acceleration producer and said angular increment and velocity increment producer, wherein said thermal controlling means comprises a thermal sensing producer device, a heater device and a thermal processor, wherein said thermal sensing producer device, which produces temperature signals, is processed in parallel with said angular rate producer and said acceleration producer for maintaining a predetermined operating temperature of said angular rate producer and said acceleration producer and angular increment and velocity increment producer, wherein said predetermined operating temperature is a constant designated temperature selected between 150° F. and 185° F., wherein said temperature signals produced from said thermal sensing producer device are inputted to said thermal processor for computing temperature control commands using said temperature signals, a temperature scale factor, and a predetermined operating temperature of said angular rate producer and said acceleration producer, and produce driving signals to said heater device using said temperature control commands for controlling said heater device to provide adequate heat for maintaining said predetermined operating temperature in said micro inertial measurement unit.

68. A micro inertial measurement unit, as recited in claim 49 or 42, wherein a position and attitude processor is adapted to further connect with said micro inertial measurement unit for computing position, attitude and heading angle measurements using said X axis, Y axis and Z axis digital angular increments and X axis, Y axis and Z axis velocity increments, wherein said thermal controlling means comprises a thermal sensing producer and an analog/digital converter connected to said thermal sensing producer device to receive said analog voltage output from said thermal sensing producer device, wherein said position, attitude, and heading processor is adapted for accessing temperature characteristic parameters of said angular rate producer and said acceleration producer using a current temperature of said angular rate producer and said acceleration producer from said temperature digitizer, and compensating said errors induced by thermal effects in said input digital angular and velocity increments and computing attitude and heading angle measurements using said X axis, Y axis and Z axis digital angular increments and X axis, Y axis and Z axis velocity increments in said attitude and heading processor.

69. A micro inertial measurement unit, as recited in claim 68, wherein said thermal controlling means further comprises an additional amplifier circuit connected between said thermal sensing producer device and said digital/analog converter for amplifying said analog voltage signals and suppressing said noise residing in said voltage signals and improving said voltage signal-to-noise ratio, wherein said amplified voltage signals are output to said analog/digital converter and sampled to form sampled voltage signals that are further digitized in said analog/digital converters to form digital signals ouputting to said attitude and heading processor.

70. A micro inertial measurement unit, as recited in claim 69, wherein an input/output interface circuit is connected between said analog/digital converter and said attitude and heading processor, wherein said input amplified voltage signals are sampled to form sampled voltage signals that are further digitized in said analog/digital converters to form digital signals outputting to said input/output interface circuit before inputting into said attitude and heading processor.

71. A micro inertial measurement unit, as recited in claim 39 or 40, further comprising a thermal controlling means for maintaining a predetermined operating temperature of said angular rate producer, said acceleration producer and said angular increment and velocity increment producer.

72. A micro inertial measurement unit, comprising:
an angular rate producer for producing X axis, Y axis and Z axis angular rate electrical signals;
an acceleration producer for producing X axis, Y axis and Z axis acceleration electrical signals; and
an angular increment and velocity increment producer for converting said X axis, Y axis and Z axis angular rate electrical signals into digital angular increments and converting said input X axis, Y axis and Z axis acceleration electrical signals into digital velocity increments;
wherein said angular producer comprises:
a X axis vibrating type angular rate detecting unit and a first front-end circuit connected on a first circuit board;
a Y axis vibrating type angular rate detecting unit and a second front-end circuit connected on a second circuit board;
a Z axis vibrating type angular rate detecting unit and a third front-end circuit connected on a third circuit board;
three angular signal loop circuitries which are provided on a control circuit board for said first, second and third circuit boards respectively;
three dither motion control circuitries which are provided on in said control circuit board for said first, second and third circuit boards respectively;
an oscillator adapted for providing reference pickoff signals for said X axis vibrating type angular rate detecting unit, said Y axis vibrating type angular rate detecting unit, said Z axis vibrating type angular rate detecting unit, said angle signal loop circuitry, and said dither motion control circuitry; and
three dither motion processing modules provided on said control circuit board, for said first, second and third circuit boards respectively.

73. A micro inertial measurement unit, as recited in claim 72, wherein said acceleration producer comprises:
a X axis accelerometer, which is provided on said second circuit board and connected with said angular increment and velocity increment producer provided on said control circuit board;
a Y axis accelerometer, which is provided on said first circuit board and connected With said angular increment and velocity increment producer provided on said control circuit board; and
a Z axis accelerometer, which is provided on said third circuit board and connected with said angular increment and velocity increment producer provided on said control circuit board.

74. A micro inertial measurement unit, as recited in claim 73, wherein said first, second and third front-end circuits are used to condition said output signal of said X axis, Y axis and Z axis vibrating type angular rate detecting units respectively and each further comprises:
a trans impedance amplifier circuit, which is connected to said respective X axis, Y axis or Z axis vibrating type angular rate detecting unit for changing said output impedance of said dither motion signals from a very high level, greater than 100 million ohms, to a low level, less than 100 ohms to achieve two dither displacement signals, which are A/C voltage signals representing said displacement between said inertial elements and said anchor combs, wherein said two dither displacement signals are output to said dither motion control circuitry; and
a high-pass filter circuit, which is connected with said respective X axis, Y axis or Z axis vibrating type angular rate detecting unit for removing residual dither drive signals and noise from said dither displacement differential signal to form a filtered dither displacement differential signal to said angular signal loop circuitry.

75. A micro inertial measurement unit, as recited in claim 74, wherein each of said X axis, Y axis and Z axis angular rate detecting units is a vibratory device, which comprises at least one set of vibrating inertial elements, including tuning forks, and associated supporting structures and means, including capacitive readout means, and uses Coriolis effects to detect angular rates of said carrier, wherein each of said X axis, Y axis and Z axis vibrating type angular rate detecting units receives dither drive signals from said respective dither motion control circuitry, keeping said inertial elements oscillating; and carrier reference oscillation signals from said oscillator, including capacitive pickoff excitation signals, wherein each of said X axis, Y axis and Z axis vibrating type angular rate detecting units detects said angular motion in X axis, Y axis and Z axis respectively of said carrier in accordance with said dynamic theory, wherein each of said X axis, Y axis and Z axis vibrating type angular rate detecting units outputs angular motion-induced signals, including rate displacement signals which may be modulated carrier reference oscillation signals to said trans Impedance amplifier circuit of said respective first, second or third front-end circuits; and inertial element dither motion signals thereof, including dither displacement signals, to said high-pass filter of said respective first, second or third front-end circuit.

76. A micro inertial measurement unit, as recited in claim 75, wherein said three dither motion control circuitries receive said inertial element dither motion signals from said X axis, Y axis and Z axis vibrating type angular rate detecting units respectively, reference pickoff signals from said oscillator, and produce digital inertial element displacement signals with known phase, wherein each said dither motion control circuitries comprises:

an amplifier and summer circuit connected to said trans impedance amplifier circuit of said respective first, second or third front-end circuit for amplifying said two dither displacement signals for more than ten times and enhancing said sensitivity for combining said two dither displacement signals to achieve a dither displacement differential signal by subtracting a center anchor comb signal with a side anchor comb signal;

a high-pass filter circuit connected to said amplifier and summer circuit for removing residual dither drive signals and noise from said dither displacement differential signal to form a filtered dither displacement differential signal;

a demodulator circuit connected to said high-pass filter circuit for receiving said capacitive pickoff excitation signals as phase reference signals from said oscillator and said filtered dither displacement differential signal from said high-pass filter and extracting said in-phase portion of said filtered dither displacement differential signal to produce an inertial element displacement signal with known phase;

a low-pass filter connected to said demodulator circuit for removing high frequency noise from said inertial element displacement signal input thereto to form a low frequency inertial element displacement signal;

an analog/digital converter connected to said low-pass filter for converting said low frequency inertial element displacement signal that is an analog signal to produce a digitized low frequency inertial element displacement signal to said respective dither motion processing module;

a digital/analog converter processing said selected amplitude from said respective dither motion processing module to form a dither drive signal with correct amplitude; and an amplifier which generates and amplifies said dither drive signal to said respective X axis, Y axis or Z axis vibrating type angular rate detecting unit based on said dither drive signal with said selected frequency and correct amplitude.

77. A micro inertial measurement unit, as recited in claim 76, wherein said oscillation of said inertial elements residing inside each of said X axis, Y axis and Z axis vibrating type angular rate detecting units is generally driven by a high frequency sinusoidal signal with precise amplitude, wherein each of said dither motion processing module receives digital inertial element displacement signals with known phase from said analog/digital converter of said dither motion control circuitry for finding said frequencies which have highest Quality Factor (Q) Values, locking said frequency, and locking said amplitude to produce a dither drive signal, including high frequency sinusoidal signals with a precise amplitude, to said respective X axis, Y axis or Z axis vibrating type angular rate detecting unit to keep said inertial elements oscillating at said pre-determined resonant frequency.

78. A micro inertial measurement unit, as recited in claim 77, wherein said dither motion processing module further includes a discrete Fast Fourier Transform (FFT) module, a memory array of frequency and amplitude data module, a maxima detection logic module, and a Q analysis and selection logic module to find said frequencies which have highest Quality Factor (Q) Values;

wherein said discrete Fast Fourier Transform (FFT) module is arranged for transforming said digitized low frequency inertial element displacement signal from said analog/digital converter of said dither motion control circuitry to form amplitude data with said frequency spectrum of said input inertial element displacement signal;

wherein said memory array of frequency and amplitude data module receives said amplitude data with frequency spectrum to form an array of amplitude data with frequency spectrum;

wherein said maxima detection logic module is adapted for partitioning said frequency spectrum from said array of said amplitude data with frequency into plural spectrum segments, and choosing said frequencies with said largest amplitudes in said local segments of said frequency spectrum; and wherein said Q analysis and selection logic module is adapted for performing Q analysis on said chosen frequencies to select frequency and amplitude by computing said ratio of amplitude/bandwidth, wherein a range for computing bandwidth is between +−1/2 of said peek for each maximum frequency point.

79. A micro inertial measurement unit, as recited in claim 78, wherein said dither motion processing module further includes a phase-lock loop to reject noise of said selected frequency to form a dither drive signal with said selected frequency by, which serves as a very narrow bandpass filter, locking said frequency;

wherein said angle signal loop circuitries receive said angular motion-induced signals from said X axis, Y axis and Z axis vibrating type angular rate detecting units respectively, reference pickoff signals from said oscillator, and transform said angular motion-induced signals into angular rate signals, wherein each of said angle signal loop circuitries for said respective first, second or third circuit board comprises:

a voltage amplifier circuit, which amplifies said filtered angular motion-induced signals from said high-pass filter circuit of said respective first, second or third front-end circuit to an extent of at least 100 milivolts to form amplified angular motion-induced signals;

an amplifier and summer circuit, which subtracts said difference between said angle rates of said amplified angular motion-induced signals to produce a differential angle rate signal;

a demodulator, which is connected to said amplifier and summer circuit, extracting said amplitude of said in-phase differential angle rate signal from said differential angle rate signal and said capacitive pickoff excitation signals from said oscillator;

a low-pass filter, which is connected to said demodulator, removing said high frequency noise of said amplitude signal of said in-phase differential angle rate signal to form said angular rate signal output to said angular increment and velocity increment producer.

80. A micro inertial measurement unit, as recited in claim 73 or 79, wherein said angular increment and velocity increment producer comprises:

an angular integrating means and an acceleration integrating means, which are adapted for respectively integrating said X axis, Y axis and Z axis analog angular rate voltage signals and said X axis, Y axis and Z axis analog acceleration voltage signals for a predetermined time interval to accumulate said X axis, Y axis and Z axis analog angular rate voltage signals and said X axis, Y axis and Z axis analog acceleration voltage signals as a raw X axis, Y axis and Z axis angular increment and a raw X axis, Y axis and Z axis velocity increment for a predetermined time interval to achieve accumulated angular increments and accumulated velocity increments, wherein said integration is performed to remove noise signals that are non-directly proportional to said carrier angular rate and acceleration within said X axis, Y axis and Z axis analog angular rate voltage signals and said X axis, Y axis and Z axis analog acceleration voltage signals, to improve signal-to-noise ratio, and to remove said high frequency signals in said X axis, Y axis and Z axis analog angular rate voltage signals and said X axis, Y axis and Z axis analog acceleration voltage signals;

a resetting means which forms an angular reset voltage pulse and a velocity reset voltage pulse as an angular scale and a velocity scale which are input into said angular integrating means and said acceleration integrating means respectively; and an angular increment and velocity increment measurement means which is adapted for measuring said voltage values of said X axis, Y axis and Z axis accumulated angular increments and said X axis, Y axis and Z axis accumulated velocity increments with said angular reset voltage pulse and said velocity reset voltage pulse respectively to acquire angular increment counts and velocity increment counts as a digital form of angular increment and velocity increment measurements respectively.

81. A micro inertial measurement unit, as recited in claim 80, wherein said angular increment and velocity increment measurement means also scales said voltage values of said X axis, Y axis and Z axis accumulated angular and velocity increments into real X axis, Y axis and Z axis angular and velocity increment voltage values, wherein in said angular integrating means and said accelerating integrating means, said X axis, Y axis and Z axis analog angular voltage signals and said X axis, Y axis and Z axis analog acceleration voltage signals are each reset to accumulate from a zero value at an initial point of every said predetermined time interval.

82. A micro inertial measurement unit, as recited in claim 81, wherein said resetting means comprises an oscillator, wherein said angular reset voltage pulse and said velocity reset voltage pulse are implemented by producing a timing pulse by said oscillator.

83. A micro inertial measurement unit, as recited in claim 81, said angular increment and velocity increment producer further comprises an angular amplifying circuit for amplifying said X axis, Y axis and Z axis analog angular rate voltage signals to form amplified X axis, Y axis and Z axis analog angular rate signals and an acceleration amplifying circuit for amplifying said X axis, Y axis and Z axis analog acceleration voltage signals to form amplified X axis, Y axis and Z axis analog acceleration signals.

84. A micro inertial measurement unit, as recited in claim 83, wherein said angular increment and velocity increment measurement means, which is adapted for measuring said voltage values of said X axis, Y axis and Z axis accumulated angular and velocity increments, comprises an analog/digital converter to substantially digitize said raw X axis, Y axis and Z axis angular increment and velocity increment voltage values into digital X axis, Y axis and Z axis angular increment and velocity increments.

85. A micro inertial measurement unit, as recited in claim 84, wherein said analog/digital converter of said angular increment and velocity increment producer further includes an angular analog/digital converter, a velocity analog/digital converter and an input/output interface circuit, wherein said accumulated angular increments output from said angular integrator circuit and said accumulated velocity increments output from said acceleration integrator circuit are input into said angular analog/digital converter and said velocity analog/digital converter respectively, wherein said accumulated angular increments is digitized by said angular analog/digital converter by measuring said accumulated angular increments with said angular reset voltage pulse to form a digital angular measurements of voltage in terms of said angular increment counts which is output to said input/output interface circuit to generate digital X axis, Y axis and Z axis angular increment voltage values, wherein said accumulated velocity increments are digitized by said velocity analog/digital converter by measuring said accumulated velocity increments with said velocity reset voltage pulse to form digital velocity measurements of voltage in terms of said velocity increment counts which is output to said input/output interface circuit to generate digital X axis, Y axis and Z axis velocity increment voltage values.

86. A micro inertial measurement unit, as recited in claim 85, further comprising a thermal controlling means for maintaining a predetermined operating temperature of said angular rate producer, said acceleration producer and said angular increment and velocity increment producer, wherein said thermal controlling means comprises a thermal sensing producer device, a heater device and a thermal processor, wherein said thermal sensing producer device, which produces temperature signals, is processed in parallel with said angular rate producer and said acceleration producer for maintaining a predetermined operating temperature of said angular rate producer and said acceleration producer and angular increment and velocity increment producer, wherein said predetermined operating temperature is a constant designated temperature selected between 150° F. and 185° F., wherein said temperature signals produced from said thermal sensing producer device are inputted to said thermal processor for computing temperature control commands using said temperature signals, a temperature scale factor, and a predetermined operating temperature of said angular rate producer and said acceleration producer, and produce driving signals to said heater device using said temperature control commands for controlling said heater device to provide adequate heat for maintaining said predetermined operating temperature in said micro inertial measurement unit.

87. A micro inertial measurement unit, as recited in claim 73 or 79, further comprising a thermal controlling means for maintaining a predetermined operating temperature of said angular rate producer, said acceleration producer and said angular increment and velocity increment producer, wherein said thermal controlling means comprises a thermal sensing producer device, a heater device and a thermal processor, wherein said thermal sensing producer device, which produces temperature signals, is processed in parallel with said angular rate producer and said acceleration producer for maintaining a predetermined operating temperature of said angular rate producer and said acceleration producer and angular increment and velocity increment producer, wherein said predetermined operating temperature is a constant designated temperature selected between 150° F. and 185° F., wherein said temperature signals produced from said thermal sensing producer device are inputted to said thermal processor for computing temperature control commands using said temperature signals, a temperature scale factor, and a predetermined operating temperature of said angular rate producer and said acceleration producer, and produce driving signals to said heater device using said temperature control commands for controlling said heater device to provide adequate heat for maintaining said predetermined operating temperature in said micro inertial measurement unit.

88. A micro inertial measurement unit, as recited in claim 73 or 79, further comprising a thermal controlling means for maintaining a predetermined operating temperature of said angular rate producer, said acceleration producer and said angular increment and velocity increment producer, wherein said thermal controlling means comprises:

a thermal sensing producer device, comprising:

a first thermal sensing producing unit for sensing said temperature of said X axis angular rate detecting unit and said Y axis accelerometer, a second thermal sensing producer for sensing said temperature of said Y axis angular rate detecting unit and said X axis accelerometer, and a third thermal sensing producer for sensing said temperature of said Z axis angular rate detecting unit and said Z axis accelerometer;

a heater device, comprising:

a first heater, which is connected with said X axis angular rate detecting unit, said Y axis accelerometer, and said first front-end circuit, for maintaining said predetermined operational temperature of said X axis angular rate detecting unit, said Y axis accelerometer, and said first front-end circuit, a second heater, which is connected with said Y axis angular rate detecting unit, said X axis accelerometer, and said second front-end circuit, for maintaining said predetermined operational temperature of said X axis angular rate detecting unit, said X axis accelerometer, and said second front-end circuit, and a third heater, which is connected with said Z axis angular rate detecting unit, said Z axis accelerometer, and said third front-end circuit, for maintaining said predetermined operational temperature of said Z axis angular rate detecting unit, said Z axis accelerometer, and said third front-end circuit; and a thermal processor which comprises three identical thermal control circuitries and said thermal control computation module provided on said control circuit board, wherein each of said thermal control circuitries further comprises:

a first amplifier circuit, which is connected with said respective X axis, Y axis or Z axis thermal sensing producer, for amplifying said signals and suppressing said noise residing in said temperature voltage signals from said respective X axis, Y axis or Z axis thermal sensing producer and improving said signal-to-noise ratio, an analog/digital converter, which is connected with said amplifier circuit, for sampling said temperature voltage signals and digitizing said sampled temperature voltage signals to digital signals, which are output to said thermal control computation module, a digital/analog converter which converts said digital temperature commands input from said thermal control computation module into analog signals, and a second amplifier circuit, which receives said analog signals from said digital/analog converter, amplifying said input analog signals from said digital/analog converter for driving said respective first, second or third heater; and closing said temperature controlling loop, wherein said thermal control computation module computes digital temperature commands using said digital temperature voltage signals from said analog/digital converter, said temperature sensor scale factor, and said pre-determined operating temperature of said angular rate producer and acceleration producer, wherein said digital temperature commands are fed back to said digital/analog converter.

89. A micro inertial measurement unit, as recited in claim 79, wherein a position and attitude processor is adapted to further connect with said micro inertial measurement unit for computing position, attitude and heading angle measurements using said X axis, Y axis and Z axis digital angular increments and X axis, Y axis and Z axis velocity increments, wherein said thermal controlling means comprises a thermal sensing producer and an analog/digital converter connected to said thermal sensing producer device to receive said analog voltage output from said thermal sensing producer device, wherein said position, attitude, and heading processor is adapted for accessing temperature characteristic parameters of said angular rate producer and said acceleration producer using a current temperature of said angular rate producer and said acceleration producer from said temperature digitizer, and compensating said errors induced by thermal effects in said input digital angular and velocity increments and computing attitude and heading angle measurements using said X axis, Y axis and Z axis digital angular increments and X axis, Y axis and Z axis velocity increments in said attitude and heading processor.

90. A micro inertial measurement unit, as recited in claim 89, wherein said thermal controlling means further comprises an additional amplifier circuit connected between said thermal sensing producer device and said digital/analog converter for amplifying said analog voltage signals and suppressing said noise residing in said voltage signals and improving said voltage signal-to-noise ratio, wherein said amplified voltage signals are output to said analog/digital converter and sampled to form sampled voltage signals that are further digitized in said analog/digital converters to form digital signals outputting to said attitude and heading processor.

91. A micro inertial measurement unit, as recited in claim 90, wherein an input/output interface circuit is connected between said analog/digital converter and said attitude and heading processor, wherein said input amplified voltage signals are sampled to form sampled voltage signals that are further digitized in said analog/digital converters to form digital signals ouputting to said input/output interface circuit before inputting into said attitude and heading processor.

92. A micro inertial measurement unit, as recited in claim 73, wherein a position and attitude processor is adapted to further connect with said micro inertial measurement unit for computing position, attitude and heading angle measurements using said X axis, Y axis and Z axis digital angular increments and X axis, Y axis and Z axis velocity increments, wherein said thermal controlling means comprises a thermal sensing producer and an analog/digital converter connected to said thermal sensing producer device to receive said analog voltage output from said thermal sensing producer device, wherein said position, attitude, and heading processor is adapted for accessing temperature characteristic parameters of said angular rate producer and said acceleration producer using a current temperature of said angular rate producer and said acceleration producer from said temperature digitizer, and compensating said errors induced by thermal effects in said input digital angular and velocity increments and computing attitude and heading angle measurements using said X axis, Y axis and Z axis digital angular increments and X axis, Y axis and Z axis velocity increments in said attitude and heading processor.

93. A micro inertial measurement unit, as recited in claim 92, wherein said thermal controlling means further comprises an additional amplifier circuit connected between said thermal sensing producer device and said digital/analog converter for amplifying said analog voltage signals and suppressing said noise residing in said voltage signals and improving said voltage signal-to-noise ratio, wherein said amplified voltage signals are output to said analog/digital converter and sampled to form sampled voltage signals that are further digitized in said analog/digital converters to form digital signals outputting to said attitude and heading processor.

94. A micro inertial measurement unit, as recited in claim 93, wherein an input/output interface circuit is connected between said analog/digital converter and said attitude and heading processor, wherein said input amplified voltage signals are sampled to form sampled voltage signals that are further digitized in said analog/digital converters to form digital signals outputting to said input/output interface circuit before inputting into said attitude and heading processor.

95. A micro inertial measurement unit, as recited in claim 72, further comprising a thermal controlling means for maintaining a predetermined operating temperature of said angular rate producer, said acceleration producer and said angular increment and velocity increment producer.

96. A micro inertial measurement unit, comprising:

an angular rate producer for producing X axis, Y axis and Z axis angular rate electrical signals;

an acceleration producer for producing X axis, Y axis and Z axis acceleration electrical signals;

an angular increment and velocity increment producer for converting said X axis, Y axis and Z axis angular rate electrical signals into digital angular increments and converting said input X axis, Y axis and Z axis acceleration electrical signals into digital velocity increments; and a position and attitude processor connecting with said micro inertial measurement unit for computing position, attitude and heading angle measurements using said X axis, Y axis and Z axis digital angular increments and X axis, Y axis and Z axis velocity increments.

97. A micro inertial measurement unit, comprising:

an angular rate producer for producing X axis, Y axis and Z axis angular rate electrical signals;

an acceleration producer for producing X axis, Y axis and Z axis acceleration electrical signals;

an angular increment and velocity increment producer for converting said X axis, Y axis and Z axis angular rate electrical signals into digital angular increments and converting said input X axis, Y axis and Z axis acceleration electrical signals into digital velocity increments;

a thermal controlling means for maintaining a predetermined operating temperature of said angular rate producer, said acceleration producer and said angular increment and velocity increment producer; and a position and attitude processor connected with said micro inertial measurement unit for computing position, attitude and heading angle measurements using said X axis, Y axis and Z axis digital angular increments and X axis, Y axis and Z axis velocity increments, wherein said thermal controlling means comprises a thermal sensing producer and an analog/digital converter connected to said thermal sensing producer device to receive said analog voltage output from said thermal sensing producer device, wherein said position, attitude, and heading processor is adapted for accessing temperature characteristic parameters of said angular rate producer and said acceleration producer using a current temperature of said angular rate producer and said acceleration producer from said temperature digitizer, and compensating said errors induced by thermal effects in said input digital angular and velocity increments and computing attitude and heading angle measurements using said X axis, Y axis and Z axis digital angular increments and X axis, Y axis and Z axis velocity increments in said attitude and heading processor.

98. A micro inertial measurement unit, as recited in claim 97, wherein said thermal controlling means further comprises an additional amplifier circuit connected between said thermal sensing producer device and said digital/analog converter for amplifying said analog voltage signals and suppressing said noise residing in said voltage signals and improving said voltage signal-to-noise ratio, wherein said amplified voltage signals are output to said analog/digital converter and sampled to form sampled voltage signals that are further digitized in said analog/digital converters to form digital signals outputting to said attitude and heading processor.

99. A micro inertial measurement unit, as recited in claim 98, wherein an input/output interface circuit is connected between said analog/digital converter and said attitude and heading processor, wherein said input amplified voltage signals are sampled to form sampled voltage signals that are further digitized in said analog/digital converters to form digital signals outputting to said input/output interface circuit before inputting into said attitude and heading processor.

* * * * *